United States Patent [19]

Fischer et al.

[11] Patent Number: 5,262,383
[45] Date of Patent: Nov. 16, 1993

[54] 3-ARYL-4-HYDROXY-Δ³-DIHYDROFURA-NONE AND 3-ARYL-4-HYDROXY-Δ³-DIHYDROTHI-OPHENONE DERIVATIVES AND PESTICIDAL USE

[75] Inventors: Reiner Fischer, Monheim; Thomas Bretschneider, Siegburg; Bernd-Wieland Krüger, Bergisch Gladbach; Jürgen Bachmann, Leverkusen; Christoph Erdelen, Leichlingen; Ulrike Wachendorff-Neumann, Monheim; Hans-Joachim Santel, Leverkusen; Klaus Lürssen; Robert R. Schmidt, both of Bergisch Gladbach, all of Fed. Rep. of Germany

[73] Assignee: Bayer Aktiengesellschaft, Leverkusen, Fed. Rep. of Germany

[21] Appl. No.: 909,939

[22] Filed: Jul. 7, 1992

[30] Foreign Application Priority Data

Jul. 16, 1991 [DE] Fed. Rep. of Germany ....... 4123532
May 21, 1992 [DE] Fed. Rep. of Germany ....... 4216814

[51] Int. Cl.⁵ .................... A01N 43/08; A01N 43/10; C07D 307/32; C07D 333/32
[52] U.S. Cl. .................... 504/195; 504/251; 504/266; 504/272; 504/275; 504/280; 504/283; 504/289; 504/299; 514/95; 514/99; 514/336; 514/365; 514/383; 514/397; 514/406; 514/414; 514/445; 514/471; 514/473; 546/283; 546/284; 548/203; 548/266.2; 548/315.1; 548/315.4; 548/365.7; 548/466; 549/9; 549/59; 549/60; 549/62; 549/65; 549/66; 549/222; 549/265; 549/313; 549/318; 549/319
[58] Field of Search ............... 504/289, 299, 251, 266, 504/272, 275, 280, 283, 195; 549/61, 265, 317, 315, 318, 319, 313, 59, 60, 6, 62, 65, 222; 514/445, 462, 471, 473, 95, 99, 336, 365, 383, 397, 406, 414; 548/203, 266.2, 315.1, 315.4, 365.7, 466

[56] References Cited

U.S. PATENT DOCUMENTS 5,087,288  2/1992  Welter ................................. 549/64
5,094,681  3/1992  Kramer et al. ................... 549/313

FOREIGN PATENT DOCUMENTS 0299694  1/1989  European Pat. Off. .
0423482  4/1991  European Pat. Off. .
4014420  5/1990  Fed. Rep. of Germany .
2054514  4/1971  France .

OTHER PUBLICATIONS a. 94792j: K. Sakurai et al, "Antifungal studies on drugs." Pharmacodynamics Chem. Abstr., vol. 69, (1968), p. 8861.
Alexander C. Campbell, "Synthesis of (E)-and (Z)-Pulvinones," Journal Chem. Soc., 1985, pp. 1567-1577.
W. Foye, "Principles of Medicinal Chemistry," pp. 79-81, Lea & Febiger, Philadelphia (1981).

*Primary Examiner*—Richard L. Raymond
*Attorney, Agent, or Firm*—Sprung Horn Kramer & Woods

[57] ABSTRACT

The present invention relates to new 3-aryl-4-hydroxy-Δ³-dihydrofuranone and 3-aryl-4-hydroxy-Δ³-dihydrothiophenone derivatives, to a plurality of processes for their preparation, and to their use as insecticides, acaricides, herbicides and fungicides.

The new 3-aryl-4-hydroxy-Δ³-dihydrofuranone and 3-aryl-4-hydroxy-Δ³-dihydrothiophenone derivatives have the general formula I

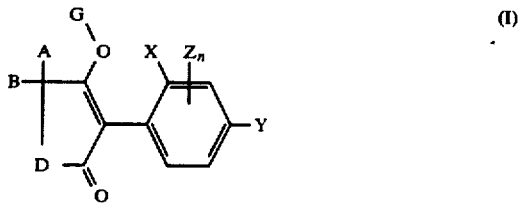

in which
X represents alkyl, halogen, alkoxy or halogenoalkyl,
(Abstract continued on next page.)

G represents hydrogen (a) or the groups

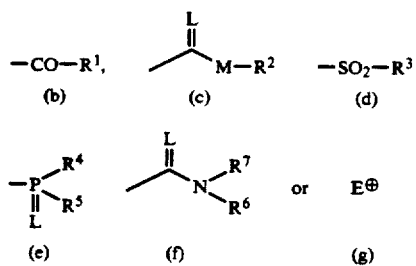

D represents oxygen or sulphur, $E^{\oplus}$ represents a metal ion equivalent or an ammonium ion, L and M represent oxygen and/or sulphur, and the other variables have the meaning given in the text of the application, with the exception of the following compounds:

3-(2-methoxyphenyl)-4-hydroxy-$\Delta^3$-dihydrofuran-2-one, 3-(2-chlorophenyl)-4-hydroxy-$\Delta^3$-dihydrofuran-2-one, 3-(2-methoxyphenyl)-4-hydroxy-$\Delta^3$-dihydrofuran-2-one, 3-(2-fluorophenyl)-4-hydroxy-$\Delta^3$-dihydrofuran-2-one.

8 Claims, No Drawings

3-ARYL-4-HYDROXY-Δ³-DIHYDROFURANONE AND 3-ARYL-4-HYDROXY-Δ³-DIHYDROTHIOPHENONE DERIVATIVES AND PESTICIDAL USE

The present invention relates to new 3-aryl-4-hydroxy-Δ³-dihydrofuranone and 3-aryl-4-hydroxy-Δ³-dihydrothiophenone derivatives, to a plurality of processes for their preparation, and to their use as insecticides, acaricides, herbicides and fungicides.

It is known that certain substituted Δ³-dihydrofuran-2-one derivatives have herbicidal properties (cf. DE-A 4,014,420). The synthesis of the tetronic acid derivatives which are used as starting compounds (such as, for example, 3-(2-methyl-phenyl)-4-hydroxy-5-(4-fluorophenyl)-Δ³-dihydrofuran-2-one) is also described in DE-A 4,014,420. Compounds which have a similar structure are known from the publication by Campbell et al. J. Chem. Soc., Perkin Trans. 1 1985, (8) 1567-76, but nothing is mentioned about an insecticidal and/or acaricidal activity.

New 3-aryl-4-hydroxy-Δ³-dihydrofuranone and 3-aryl-4-hydroxy-Δ³-dihydrothiophenone derivatives of the general formula (I)

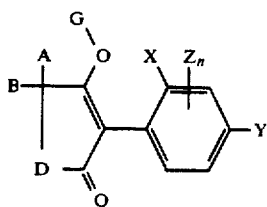

have now been found,
in which

X represents alkyl, halogen, alkoxy or halogenoalkyl,

Y represents hydrogen, alkyl, halogen, alkoxy or halogenoalkyl,

Z represents alkyl, halogen or alkoxy, n represents a number from 0-3, or the radicals X and Z together with the phenyl radical to which they are bonded form the naphthalene radical of the formula

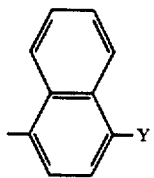

in which Y has the abovementioned meaning,
G represents hydrogen (a) or the groups

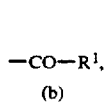 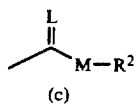 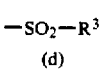
(b)　　(c)　　(d)

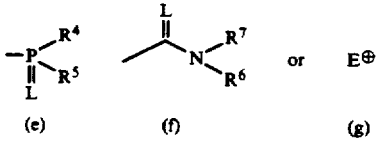

A and B can be identical or different and represent hydrogen, or alkyl, alkenyl, alkinyl, alkoxyalkyl or alkylthioalkyl, each of which is optionally substituted by halogen, or cycloalkyl which is optionally interrupted by hetero atoms, or aryl, aralkyl or hetaryl, each of which is optionally substituted by halogen, alkyl, halogenoalkyl, alkoxy, halogenoalkoxy or nitro, or A and B together with the carbon atom to which they are bonded form a saturated or unsaturated cycle which is optionally interrupted by hetero atoms and optionally substituted, D represents oxygen or sulphur, E⊕ represents a metal ion equivalent or an ammonium ion, L and M represent oxygen and/or sulphur, R¹ represents in each case optionally halogen-substituted alkyl, alkenyl, alkoxyalkyl, alkylthioalkyl, polyalkoxyalkyl or cycloalkyl which can be interrupted by hetero atoms, optionally substituted phenyl, optionally substituted phenylalkyl, substituted hetaryl, substituted phenoxyalkyl or substituted hetaryloxyalkyl and R² represents alkyl, alkenyl, alkoxyalkyl or polyalkoxyalkyl, each of which is optionally substituted by halogen, or in each case optionally substituted phenyl or benzyl, R³, R⁴ and R⁵ independently of one another represent alkyl, alkoxy, alkylamino, dialkylamino, alkylthio, alkenylthio, alkinylthio or cycloalkylthio, each of which is optionally substituted by halogen, or represent phenyl, phenoxy or phenylthio, each of which is optionally substituted, R⁶ and R⁷ independently of one another represent hydrogen, or alkyl, alkenyl, alkoxy or alkoxyalkyl, each of which is optionally substituted by halogen, or represent optionally substituted phenyl or optionally substituted benzyl, or R⁶ and R⁷ together represent an alkylene radical which is optionally interrupted by oxygen, with the exception of the following compounds:
3-(2-methoxyphenyl)-4-hydroxy-Δ³-dihydrofuran-2-one,
3-(2-chlorophenyl)-4-hydroxy-Δ³-dihydrofuran-2-one,
3-(2-methoxyphenyl)-4-hydroxy-Δ³-dihydrofuran-2-one,
3-(2-fluorophenyl)-4-hydroxy-Δ³-dihydrofuran-2-one,
and the enantiomerically pure forms of compounds of the formula (I). Taking into account the various meanings (a), (b), (c), (d), (e), (f) and (g) of group G of the general formula (I), the following main structures (Ia) to (Ig) result:

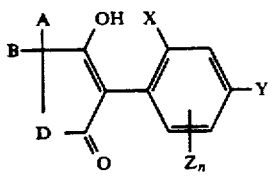 (Ia)

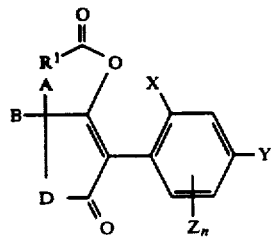 (Ib)

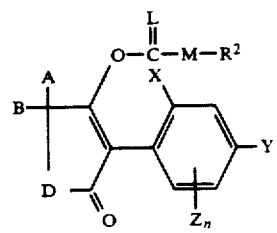 (Ic)

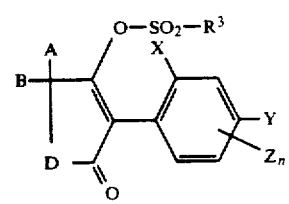 (Id)

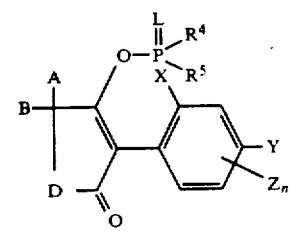 (Ie)

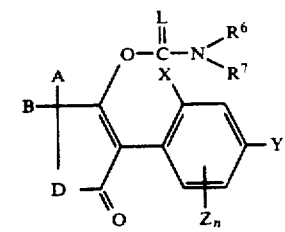 (If)

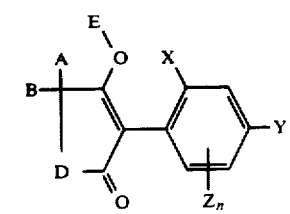 (Ig)

in which
A, B, D, E, L, M, X, Y, $Z_n$, $R^1$, $R^2$, $R^3$, $R^4$, $R^5$, $R^6$ and $R^7$ have the abovementioned meanings.

Furthermore, it has been found that 3-aryl-4-hydroxy-$\Delta^3$-dihydrofuranone and 3-aryl-4-hydroxy-$\Delta^3$-dihydrothiophenone derivatives of the formula (Ia)

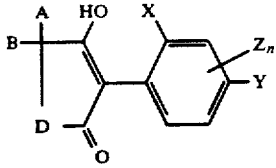 (Ia)

in which
A, B, D, X, Y, Z and n have the abovementioned meaning,
are obtained when (A)

carboxylic acid esters of the formula (II)

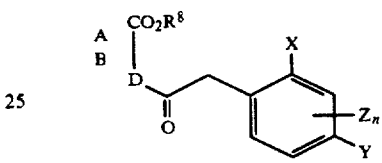 (II)

in which
A, B, D, X, Y, Z and n have the abovementioned meaning, and
$R^8$ represents alkyl,
are subjected to intramolecular condensation in the presence of a diluent and in the presence of a base.

(B)

Furthermore, it has been found that compounds of the formula (Ib)

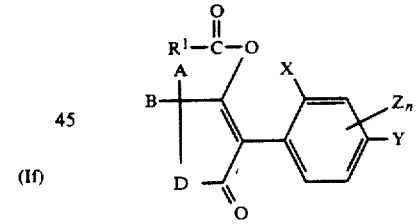 (Ib)

in which
A, B, D, X, Y, Z, $R^1$ and n have the abovementioned meanings,
are obtained when compounds of the formula (Ia)

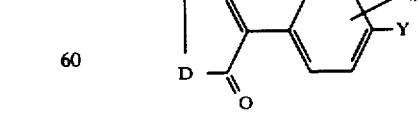 (Ia)

in which
A, B, D, X, Y, Z and n have the abovementioned meaning,
α) are reacted with acid halides of the general formula (III)

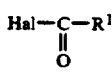 (III)

in which
R¹ has the abovementioned meaning and
Hal represents halogen, in particular chlorine and bromine,
if appropriate in the presence of a diluent and if appropriate in the presence of an acid-binding agent β) are reacted with carboxylic anhydrides of the general formula (IV)

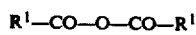 (IV)

in which
R¹ has the abovementioned meaning,
if appropriate in the presence of a diluent and if appropriate in the presence of an acid-binding agent.

(C)

Furthermore, it has been found that compounds of the formula (Ic)

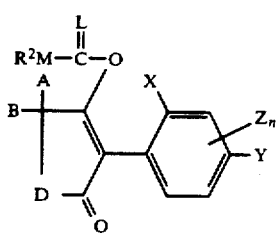 (Ic)

in which
A, B, D, X, Y, Z, R² and n have the abovementioned meaning,
L represents oxygen
and
M represents oxygen or sulphur,
are obtained when compounds of the formula (Ia)

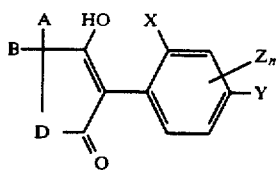 (Ia)

in which
A, B, D, X, Y, Z and n have the abovementioned meaning,
are reacted with chloroformic acid esters or chloroformic acid thioesters of the general formula (V)

 (V)

in which
R² and M have the abovementioned meaning,
if appropriate in the presence of a diluent and if appropriate in the presence of an acid-binding agent.

D)

Furthermore, it has been found that compounds of the formula (Ic)

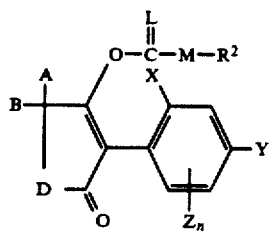 (Ic)

in which
A, B, D, R², X, Y, Z and n have the abovementioned meaning,
L represents sulphur and
M represents oxygen or sulphur,
are obtained when compounds of the formula (Ia)

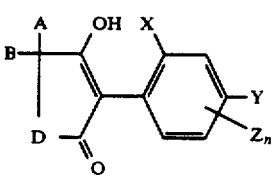 (Ia)

in which
A, B, D, X, Y, Z and n have the abovementioned meaning,
α) are reacted with chloromonothioformic acid esters or chlorodithioformic acid esters of the general formula (VI)

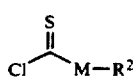 (VI)

in which
M and R² have the abovementioned meaning,
if appropriate in the presence of a diluent and if appropriate in the presence of an acid-binding agent,
or
β) are reacted with carbon disulphide and subsequently with alkyl halides of the general formula (VII)

 (VII)

in which
R² has the abovementioned meaning
and
Hal represents chlorine, bromine or iodine.

E)

Furthermore, it has been found that compounds of the formula (Id)

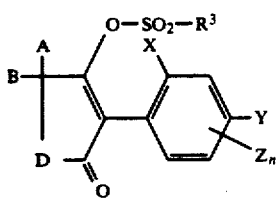
(Id)

in which
A, B, D, X, Y, Z, $R^3$ and n have the abovementioned meaning,
are obtained when compounds of the formula (Ia)

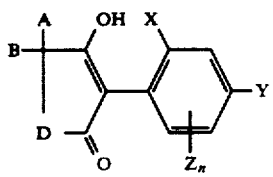
(Ia)

in which
A, B, D, X, Y, Z and n have the abovementioned meaning,
are reacted with sulphonyl chlorides of the general formula (VIII)

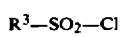
(VIII)

in which
$R^3$ has the abovementioned meaning, if appropriate in the presence of a diluent and if appropriate in the presence of an acid-binding agent.

F)

Furthermore, it has been found that compounds of the formula (Ie)

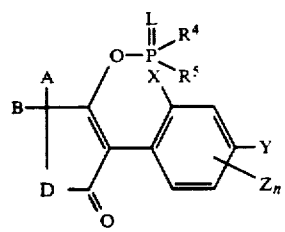
(Ie)

in which
A, B, D, L, X, Y, Z, $R^4$, $R^5$ and n have the abovementioned meaning,
are obtained when compounds of the formula (Ia)

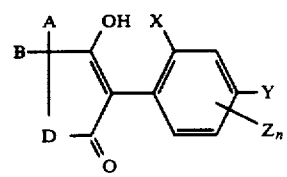
(Ia)

in which
A, B, D, X, Y, Z and n have the abovementioned meaning, are reacted with phosphorus compounds of the general formula (IX)

(IX)

in which
L, $R^4$ and $R^5$ have the abovementioned meaning
and
Hal represents halogen, in particular chlorine and bromine,
if appropriate in the presence of a diluent and if appropriate in the presence of an acid-binding agent.

G)

Furthermore, it has been found that compounds of the formula (If)

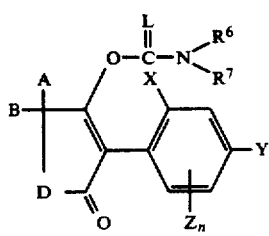
(If)

in which
A, B, D, L, X, Y, Z, $R^6$, $R^7$ and n have the abovementioned meaning,
are obtained when compounds of the formula (Ia)

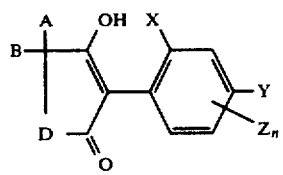
(Ia)

in which
A, B, D, X, Y, Z and n have the abovementioned meaning,
α) are reacted with isocyanates of the general formula (X)

(X)

in which
$R^6$ has the abovementioned meaning,
if appropriate in the presence of a diluent and
if appropriate in the presence of a catalyst,
or
β) are reacted with carbamoyl chlorides or thiocarbamoyl chlorides of the general formula (XI)

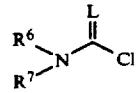
(XI)

in which
L, $R^6$ and $R^7$ have the abovementioned meaning,
if appropriate in the presence of a diluent and if appropriate in the presence of an acid-binding agent.

H)

Furthermore, it has been found that compounds of the formula (Ig)

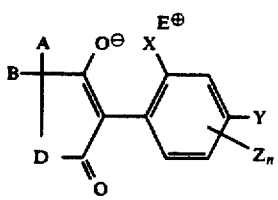

in which

X, Y, Z, A, B, D and n have the abovementioned meaning, and $E^{\oplus}$ represents a metal ion equivalent or an ammonium ion, are obtained when compounds of the formula (Ia)

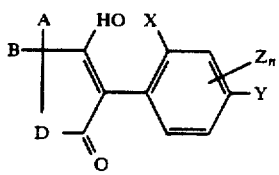

in which

X, Y, Z, A, B, D and n have the abovementioned meaning, are reacted with metal hydroxides or amines of the general formulae (XII) and (XIII)

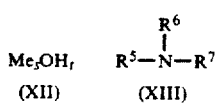

in which

Me represents mono- or divalent metal ions, s and t represent the number 1 or 2 and $R^5$, $R^6$ and $R^7$ independently of one another represent hydrogen or alkyl, if appropriate in the presence of a diluent.

Furthermore, it has been found that the new 3-aryl-4-hydroxy-$\Delta^3$-dihydrofuranone and 3-aryl-4-hydroxy-$\Delta^3$-dihydrothiophenone derivatives of the formula (I) are distinguished by outstanding acaricidal, insecticidal, herbicidal and fungicidal activity.

Preferred compounds of the formula (I) are those in which represents $C_1$-$C_6$-alkyl, halogen, $C_1$-$C_6$-alkoxy or $C_1$-$C_3$-halogenoalkyl, Y represents hydrogen, $C_1$-$C_6$-alkyl, halogen, $C_1$-$C_6$-alkoxy or $C_1$-$C_3$-halogenoalkyl, Z represents $C_1$-$C_6$-alkyl, halogen or $C_1$-$C_6$-alkoxy, n represents a number from 0 to 3, or the radicals X and Z together with the phenyl radical to which they are bonded form the naphthalene radical of the formula

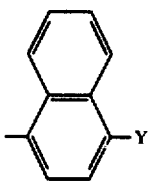

in which Y has the abovementioned meaning,

A and B are identical or different and represent hydrogen, or represent optionally halogen-substituted straight-chain or branched $C_1$-$C_{12}$-alkyl, $C_3$-$C_8$-alkenyl, $C_3$-$C_8$-alkinyl, $C_1$-$C_{10}$-alkoxy-$C_2$-$C_8$-alkyl, $C_1$-$C_8$-polyalkoxy-$C_2$-$C_8$-alkyl, $C_1$-$C_{10}$-alkylthio-$C_2$-$C_8$-alkyl or cycloalkyl which has 3 to 8 ring atoms and which can be interrupted by oxygen and/or sulphur, or represent aryl, hetaryl or aryl-$C_1$-$C_6$-alkyl, each of which is optionally substituted by halogen, $C_1$-$C_6$-alkyl $C_1$-$C_6$-halogenoalkyl, $C_1$-$C_6$-alkoxy, $C_1$-$C_6$-halogenoalkoxy or nitro, or A and B together with the carbon atom to which they are bonded form a saturated or unsaturated 3- to 8-membered ring which is optionally interrupted by oxygen and/or sulphur and optionally substituted by halogen, $C_1$-$C_6$-alkyl, $C_1$-$C_6$-alkoxy, $C_1$-$C_4$-halogenoalkyl, $C_1$-$C_4$-halogenoalkoxy, $C_1$-$C_4$-alkylthio or optionally substituted aryl, G represents hydrogen (a) or the groups

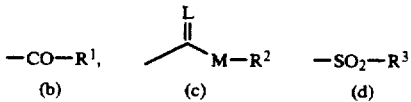

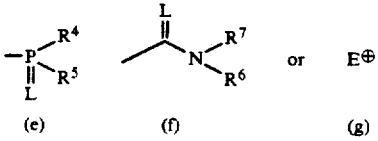

in which $E^{\oplus}$ represents a metal ion equivalent or an ammonium ion,

L and M represent oxygen and/or sulphur, $R^1$ represents optionally halogen-substituted $C_1$-$C_{20}$-alkyl, $C_2$-$C_{20}$-alkenyl, $C_1$-$C_8$-alkoxy-$C_2$-$C_8$-alkyl $C_1$-$C_8$-alkylthio-$C_2$-$C_8$-alkyl, $C_1$-$C_8$-polyalkoxy-$C_2$-$C_8$-alkyl or cycloalkyl which has 3-8 ring atoms and which can be interrupted by oxygen and/or sulphur atoms, or represents phenyl which is optionally substituted by halogen, nitro, $C_1$-$C_6$-alkyl, $C_1$-$C_6$-alkoxy, $C_1$-$C_6$-halogenoalkyl or $C_1$-$C_6$-halogenoalkoxy;

or represents phenyl-$C_1$-$C_6$-alkyl which is optionally substituted by halogen, $C_1$-$C_6$-alkyl, $C_1$-$C_6$-alkoxy, $C_1$-$C_6$-halogenoalkyl or $C_1$-$C_6$-halogenoalkoxy, or represents hetaryl which is optionally substituted by halogen and/or $C_1$-$C_6$-alkyl, or represents phenoxy-$C_1$-$C_6$-alkyl which is optionally substituted by halogen and $C_1$-$C_6$-alkyl, or represents hetaryloxy-$C_1$-$C_6$-alkyl which is optionally substituted by halogen, amino and $C_1$-$C_6$-alkyl, $R^2$ represents $C_1$-$C_{20}$-alkyl, $C_2$-$C_{20}$-alkenyl, $C_1$-$C_8$-alkoxy-$C_2$-$C_8$-alkyl or $C_1$-$C_8$-polyalkoxy-$C_2$-$C_8$-alkyl, each of which is optionally substituted by halogen, or represents phenyl or benzyl, each of which is optionally substituted by halogen, nitro, $C_1$-$C_1$-$C_6$-alkyl, $C_1$-$C_6$-alkoxy or $C_1$-$C_6$-halogenoalkyl, $R^3$, $R^4$ and $R^5$ independently of one another represent $C_1$-$C_8$-alkyl, $C_1$-$C_8$-alkoxy, $C_1$-$C_8$-alkylamino, di-($C_1$-$C_8$)-alkylamino, $C_1$-$C_8$-alkylthio, $C_2$-$C_5$-alkenylthio, $C_2$-$C_5$-alkinylthio or $C_3$-$C_7$-cycloalkylthio, each of which is optionally substituted by halogen, or represent phenyl, phenoxy or phenylthio, each of which is optionally substituted by halogen, nitro, cyano, $C_1$-$C_4$-alkoxy, $C_1$-$C_4$-halogenoalkoxy, $C_1$-$C_4$-alkylthio, $C_1$-$C_4$-halogenoalkylthio, $C_1$-$C_4$-alkyl or $C_1$-$C_4$-halogenoalkyl, $R^6$ and $R^7$ independently of one another represent $C_1$-$C_{20}$-alkyl, $C_1$-$C_{20}$-alkoxy, $C_2$-$C_8$-alkenyl or $C_1$-$C_{20}$-alkoxy-$C_1$-$C_{20}$-alkyl, each of which is optionally substituted by halogen, or represent phenyl which is optionally substituted by halogen, $C_1$-$C_{20}$-halogenoalkyl, $C_1$-$C_{20}$-alkyl or $C_1$-$C_{20}$-alkoxy, or represent benzyl which is optionally substituted by halogen, $C_1$-$C_{20}$-alkyl, $C_1$-$C_{20}$-halogenoalkyl or $C_1$-$C_{20}$-alkoxy, or together represent a $C_2$-$C_6$-alkylene ring which is optionally interrupted by oxygen, with the exception of the following compounds:
3-(2-methoxyphenyl)-4-hydroxy-$\Delta^3$-dihydrofuran-2-one,
3-(2-chlorophenyl)-4-hydroxy-$\Delta^3$-dihydrofuran-2-one,
3-(2-methoxyphenyl)-4-hydroxy-$\Delta^3$-dihydrofuran-2-one,
3-(2-fluorophenyl)-4-hydroxy-$\Delta^3$-dihydrofuran-2-one,
and the enantiomerically pure forms of compounds of the formula (I).

Particularly preferred compounds of the formula (I) are those in which

X represents $C_1$-$C_6$-alkyl, halogen, $C_1$-$C_6$-alkoxy or $C_1$-$C_2$-halogenoalkyl, Y represents hydrogen, $C_1$-$C_6$-alkyl, halogen, $C_1$-$C_6$-alkoxy or $C_1$-$C_2$-halogenoalkyl, Z represents $C_1$-$C_4$-alkyl, halogen or $C_1$-$C_4$-alkoxy, n represents a number from 0 to 3, or the radicals X and Z together with the phenyl radical to which they are bonded form the naphthalene radical of the formula

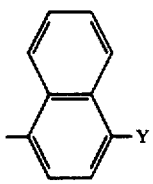

in which Y has the abovementioned meaning,

A and B are identical or different and represent hydrogen, or represent optionally halogen-substituted straight-chain or branched $C_1$-$C_{10}$-alkyl $C_3$-$C_6$-alkenyl, $C_3$-$C_6$-alkinyl, $C_1$-$C_8$-alkoxy-$C_2$-$C_6$-alkyl, $C_1$-$C_6$-polyalkoxy-$C_2$-$C_6$-alkyl, $C_1$-$C_8$-alkylthio-$C_2$-$C_6$-alkyl or cycloalkyl which has 3 to 7 ring atoms and which can be interrupted by 1-2 oxygen and/or sulphur atoms, or represent aryl, hetaryl or aryl-$C_1$-$C_4$-alkyl, each of which is optionally substituted by halogen, $C_1$-$C_4$-alkyl, $C_1$-$C_4$-halogenoalkyl, $C_1$-$C_4$-alkoxy or nitro, or A and B together with the carbon atom to which they are bonded, form a saturated or unsaturated 3- to 8-membered ring which is optionally interrupted by oxygen and/or sulphur and optionally substituted by halogen, $C_1$-$C_5$-alkyl, $C_1$-$C_5$-alkoxy, $C_1$-$C_3$-halogenoalkyl, $C_1$-$C_4$-halogenoalkoxy, $C_1$-$C_3$-alkylthio or optionally halogen-, alkyl- or alkoxy-substituted aryl, G represents hydrogen (a) or the groups

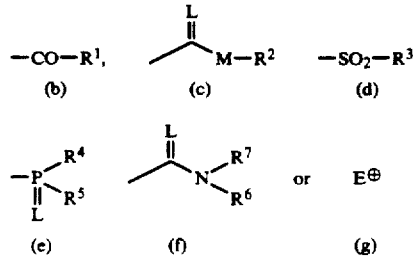

in which $E^\oplus$ represents a metal ion equivalent or an ammonium ion,

L and M in each case represent oxygen and/or sulphur, $R^1$ represents optionally halogen-substituted $C_1$-$C_{16}$-alkyl, $C_2$-$C_{16}$-alkenyl, $C_1$-$C_6$-alkoxy-$C_2$-$C_6$-alkyl, $C_1$-$C_{16}$-alkylthio-$C_2$-$C_{16}$-alkyl, $C_1$-$C_6$-polyalkoxy-$C_2$-$C_6$-alkyl and cycloalkyl which has 3-7 ring atoms and which can be interrupted by 1-2 oxygen and/or sulphur atoms, or represents phenyl which is optionally substituted by halogen, nitro, $C_1$-$C_4$-alkyl, $C_1$-$C_4$-alkoxy, $C_1$-$C_3$-halogenoalkyl or $C_1$-$C_3$-halogenoalkoxy, or represents phenyl-$C_1$-$C_4$-alkyl which is optionally substituted by halogen, $C_1$-$C_4$-alkyl, $C_1$-$C_4$-alkoxy, $C_1$-$C_3$-halogenoalkyl or $C_1$-$C_3$-halogenoalkoxy, or represents hetaryl which is optionally substituted by halogen and $C_1$-$C_6$-alkyl, or represents phenoxy-$C_1$-$C_5$-alkyl which is optionally substituted by halogen and $C_1$-$C_4$-alkyl, or represents hetaryloxy-$C_1$-$C_5$-alkyl which is optionally substituted by halogen, amino and $C_1$-$C_4$-alkyl, $R^2$ represents optionally halogen-substituted $C_1$-$C_{16}$-alkyl, $C_2$-$C_{16}$-alkenyl, $C_1$-$C_{16}$-alkoxy-$C_2$-$C_6$-alkyl or $C_1$-$C_6$-polyalkoxy-$C_2$-$C_6$-alkyl, or represents phenyl or benzyl, each of which is optionally substituted by halogen, nitro, $C_1$-$C_4$-alkyl, $C_1$-$C_3$-alkoxy or $C_1$-$C_3$-halogenoalkyl, $R^3$, $R^4$ and $R^5$ independently of one another represent $C_1$-$C_6$-alkyl, $C_1$-$C_6$-alkoxy, $C_1$-$C_6$-alkylamino, di-($C_1$-$C_6$)-alkylamino, $C_1$-$C_6$-alkylthio, $C_3$-$C_4$-alkenylthio, $C_2$-$C_4$-alkinylthio or $C_3$-$C_6$-cycloalkylthio, each of which is optionally substituted by halogen, or represent phenyl, phenoxy or phenylthio, each of which is optionally substituted by fluorine, chlorine, bromine, nitro, cyano, $C_1$-$C_3$-alkoxy, $C_1$-$C_3$-halogenoalkoxy, $C_1$-$C_3$-alkylthio, $C_1$-$C_3$-halogenoalkylthio, $C_1$-$C_3$-alkyl or $C_1$-$C_3$-halogenoalkyl, $R^6$ and $R^7$ independently of one another represent $C_1$-$C_{20}$-alkyl, $C_1$-$C_{20}$-alkoxy, $C_2$-$C_8$-alkenyl or $C_1$-$C_{20}$-alkoxy-$C_1$-$C_{20}$-alkyl, each of which is optionally substituted by halogen, or represent phenyl which is optionally substituted by halogen, $C_1$-$C_5$-halogenoalkyl, $C_1$-$C_5$- alkyl or $C_1$-$C_5$-alkoxy, or represent benzyl which is optionally substituted by halogen, $C_1$-$C_5$-alkyl, $C_1$-$C_5$-halogenoalkyl or $C_1$-$C_5$-alkoxy, with the exception of the following compounds:

3-(2-methoxyphenyl)-4-hydroxy-$\Delta^3$-dihydrofuran-2-one, 3-(2-chlorophenyl)-4-hydroxy-$\Delta^3$-dihydrofuran-2-one, 3-(2-methoxyphenyl)-4-hydroxy-$\Delta^3$-dihydrofuran-2-one, 3-(2-fluorophenyl)-4-hydroxy-$\Delta^3$-dihydrofuran-2-one, and the enantiomerically pure forms of compounds of the formula (I).

Very particularly preferred compounds of the formula (I) are those in which

X represents methyl, ethyl, propyl, i-propyl, fluorine, chlorine, bromine, methoxy, ethoxy and trifluoromethyl, Y represents hydrogen, methyl, ethyl, propyl, i-propyl, butyl, i-butyl, tert.-butyl, fluorine, chlorine, bromine, methoxy, ethoxy and trifluoromethyl, Z represents methyl, ethyl, i-propyl, butyl, i-butyl, tert.-butyl, fluorine, chlorine, bromine, methoxy and ethoxy, n represents a number from 0 to 3, or the radicals X and Z together with the phenyl radical to which they are bonded represent the radical of the formula

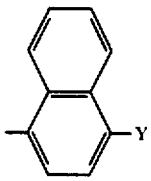

in which Y has the abovementioned meaning,

A and B are identical or different and represent hydrogen or optionally halogen-substituted straight-chain or branched $C_1$-$C_8$-alkyl, $C_3$-$C_4$-alkenyl, $C_3$-$C_4$-alkinyl, $C_1$-$C_6$-alkoxy-$C_2$-$C_4$-alkyl, $C_1$-$C_4$-polyalkoxy-$C_2$-$C_4$-alkyl, $C_1$-$C_6$-alkylthio-$C_2$-$C_4$-alkyl or cycloalkyl which has 3 to 6 ring atoms and which can be interrupted by 1-2 oxygen and/or sulphur atoms, or represent aryl, pyridine, imidazole, pyrazole, triazole, indole, thiazole or aryl-$C_1$-$C_3$-alkyl, each of which is optionally substituted by fluorine, chlorine, methyl, ethyl, propyl, iso-propyl, methoxy, ethoxy, trifluoromethyl or nitro, or A and B together with the carbon atom to which they are bonded, form a saturated or unsaturated 3- to 8-membered ring which is optionally interrupted by oxygen and/or sulphur and optionally substituted by fluorine, chlorine, $C_1$-$C_4$-alkyl, $C_1$-$C_4$-alkoxy, trifluoromethyl, $C_1$-$C_2$-alkylthio or optionally fluorine-, chlorine-, methyl- or methoxy-substituted aryl, G represents hydrogen (a) or the groups

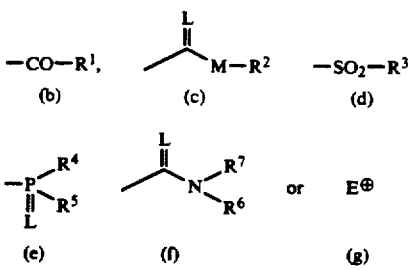

in which $E^\oplus$ represents a metal ion equivalent or an ammonium ion,

L and M in each case represent oxygen and/or sulphur, $R^1$ represents optionally fluorine- or chlorine-substituted $C_1$-$C_{14}$-alkyl, $C_2$-$C_{14}$-alkenyl, $C_1$-$C_4$-alkoxy-$C_2$-$C_6$-alkyl, $C_1$-$C_4$-alkylthio-$C_2$-$C_6$-alkyl, $C_1$-$C_4$-polyalkoxy-$C_2$-$C_4$-alkyl and cycloalkyl which has 3-6 ring atoms and which can be interrupted by 1-2 oxygen and/or sulphur atoms, or represents phenyl which is optionally substituted by fluorine, chlorine, bromine, methyl, ethyl, propyl, i-propyl, methoxy, ethoxy, trifluoromethyl, trifluoromethoxy or nitro, or represents phenyl-$C_1$-$C_3$-alkyl which is optionally substituted by fluorine, chlorine, bromine, methyl, ethyl, propyl, i-propyl, methoxy, ethoxy, trifluoromethyl or trifluoromethoxy, or represents pyridyl, pyrimidyl, thiazolyl and pyrazolyl, each of which is optionally substituted by fluorine, chlorine, bromine, methyl or ethyl, or represents phenoxy-$C_1$-$C_4$-alkyl which is optionally substituted by fluorine, chlorine, methyl or ethyl, or represents pyridyloxy-$C_1$-$C_4$-alkyl, pyrimidyloxy-$C_1$-$C_4$-alkyl and thiazolyloxy-$C_1$-$C_4$-alkyl, each of which is optionally substituted by fluorine, chlorine, amino, methyl or ethyl, $R^2$ represents $C_1$-$C_{14}$-alkyl, $C_2$-$C_{14}$-alkenyl, $C_1$-$C_4$-alkoxy-$C_2$-$C_6$-alkyl or $C_1$-$C_4$-polyalkoxy-$C_2$-$C_6$-alkyl, each of which is optionally substituted by fluorine or chlorine, or represents phenyl or benzyl, each of which is optionally substituted by fluorine, chlorine, nitro, methyl, ethyl, propyl, i-propyl, methoxy, ethoxy or trifluoromethyl, $R^3$, $R^4$ and $R^5$ independently of one another represent $C_1$-$C_4$-alkyl, $C_1$-$C_4$-alkoxy, $C_1$-$C_4$-alkylamino, di-($C_1$-$C_4$-alkyl)-amino or $C_1$-$C_4$-alkylthio, each of which is optionally substituted by fluorine or chlorine, or represent phenyl, phenoxy or phenylthio, each of which is optionally substituted by fluorine, chlorine, bromine, nitro, cyano, $C_1$-$C_2$-alkoxy, $C_1$-$C_4$-fluoroalkoxy, $C_1$-$C_2$-chloroalkoxy, $C_1$-$C_2$-alkylthio, $C_1$-$C_2$-fluoroalkylthio, $C_1$-$C_2$-chloroalkylthio or $C_1$-$C_3$-alkyl, $R^6$ and $R^7$ independently of one another represent $C_1$-$C_{10}$-alkyl, $C_1$-$C_{10}$-alkoxy or $C_1$-$C_{10}$-alkoxy-($C_1$-$C_{10}$)-alkyl, each of which is optionally substituted by fluorine, chlorine or bromine, or represent phenyl which is optionally substituted by fluorine, chlorine, bromine, $C_1$-$C_{20}$-halogenoalkyl, $C_1$-$C_{20}$-alkyl or $C_1$-$C_4$-alkoxy, or represent benzyl which is optionally substituted by fluorine, chlorine, bromine, $C_1$-$C_4$-alkyl, $C_1$-$C_4$-halogenoalkyl or $C_1$-$C_4$-alkoxy,
with the exception of the following compounds:
3-(2-methoxyphenyl)-4-hydroxy-$\Delta^3$-dihydrofuran-2-one,
3-(2-chlorophenyl)-4-hydroxy-$\Delta^3$-dihydrofuran-2-one,
3-(2-methoxyphenyl)-4-hydroxy-$\Delta^3$-dihydrofuran-2-one,
3-(2-fluorophenyl)-4-hydroxy-$\Delta^3$-dihydrofuran-2-one,
and the enantiomerically pure forms of compounds of the formula (I).

The following 3-aryl-4-hydroxy-$\Delta^3$-dihydrofurane derivatives of the formula (Ia) may be mentioned individually in addition to the compounds mentioned in the Preparation Examples:

TABLE 1

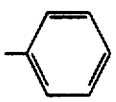

(Ia)

| A | B | D | X | Y | $Z_n$ |
|---|---|---|---|---|---|
| H | H | O | —$CH_3$ | —$CH_3$ | 6-$CH_3$ |
| —$CH_3$ | H | O | —$CH_3$ | —$CH_3$ | 6-$CH_3$ |
| 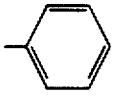 | H | O | —$CH_3$ | —$CH_3$ | 6-$CH_3$ |
| —C($CH_3$)$_3$ | H | O | —$CH_3$ | —$CH_3$ | 6-$CH_3$ |
| —$C_{10}H_{21}$ | H | O | —$CH_3$ | —$CH_3$ | 6-$CH_3$ |
| —$CH_3$ | —$CH_3$ | O | —$CH_3$ | —$CH_3$ | 6-$CH_3$ |
| —$C_2H_5$ | —$CH_3$ | O | —$CH_3$ | —$CH_3$ | 6-$CH_3$ |
| —CH($CH_3$)$_2$ | —$CH_3$ | O | —$CH_3$ | —$CH_3$ | 6-$CH_3$ |
| —$CH_2$—CH($CH_3$)$_2$ | —$CH_3$ | O | —$CH_3$ | —$CH_3$ | 6-$CH_3$ |
| 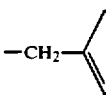 | —$CH_3$ | O | —$CH_3$ | —$CH_3$ | 6-$CH_3$ |
| —$CH_2$—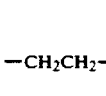 | —$CH_3$ | O | —$CH_3$ | —$CH_3$ | 6-$CH_3$ |
| —$CH_2CH_2$—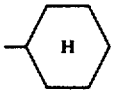 | —$CH_3$ | O | —$CH_3$ | —$CH_3$ | 6-$CH_3$ |
| —$C_2H_5$ | —$C_2H_5$ | O | —$CH_3$ | —$CH_3$ | 6-$CH_3$ |
| —CH($CH_3$)$_2$ | —CH($CH_3$)$_2$ | O | —$CH_3$ | —$CH_3$ | 6-$CH_3$ |
| 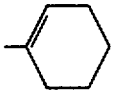 | H | O | —$CH_3$ | —$CH_3$ | 6-$CH_3$ |
| —CH=$CH_2$ | —$CH_3$ | O | —$CH_3$ | —$CH_3$ | 6-$CH_3$ |
| —$CF_3$ | —$CH_3$ | O | —$CH_3$ | —$CH_3$ | 6-$CH_3$ |
| —($CH_2$)$_2$— | | O | —$CH_3$ | —$CH_3$ | 6-$CH_3$ |
| —($CH_2$)$_4$— | | O | —$CH_3$ | —$CH_3$ | 6-$CH_3$ |
| —($CH_2$)$_5$— | | O | —$CH_3$ | —$CH_3$ | 6-$CH_3$ |
| —($CH_2$)$_6$— | | O | —$CH_3$ | —$CH_3$ | 6-$CH_3$ |
| —($CH_2$)$_7$— | | O | —$CH_3$ | —$CH_3$ | 6-$CH_3$ |
| —C($CH_3$)$_2$—C($CH_3$)$_2$— | | O | —$CH_3$ | —$CH_3$ | 6-$CH_3$ |
| —CH($CH_3$)—($CH_2$)$_4$— | | O | —$CH_3$ | —$CH_3$ | 6-$CH_3$ |
| —$CH_2$—CH($CH_3$)—($CH_2$)$_3$— | | O | —$CH_3$ | —$CH_3$ | 6-$CH_3$ |
| —($CH_2$)$_2$—CH($CH_3$)—($CH_2$)$_2$— | | O | —$CH_3$ | —$CH_3$ | 6-$CH_3$ |

TABLE 1-continued

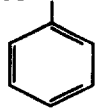

(Ia)

| A | B | D | X | Y | $Z_n$ |
|---|---|---|---|---|---|
| —C(CH₂)₂—CH—(CH₂)₂— with C(CH₃)₃ branch | | O | —CH₃ | —CH₃ | 6-CH₃ |
| —(CH₂)₂—CH—(CH₂)₂— with phenyl branch | | O | —CH₃ | —CH₃ | 6-CH₃ |
| —CH₂—C(CH₃)₂—CH₂—CH(CH₃)—CH₂— | | O | —CH₃ | —CH₃ | 6-CH₃ |
| tetrahydronaphthalene (gem-dimethyl) | | O | —CH₃ | —CH₃ | 6-CH₃ |
| —(CH₂)₂—CH—(CH₂)₂— with C₂H₅ branch | | O | —CH₃ | —CH₃ | 6-CH₃ |
| —(CH₂)₂—CH—(CH₂)₂— with i-C₃H₇ branch | | O | —CH₃ | —CH₃ | 6-CH₃ |
| —CH₃ | —CH₃ | O | Cl | Cl | H |
| —C₂H₅ | —CH₃ | O | Cl | Cl | H |
| —CH(CH₃)₂ | —CH₃ | O | Cl | Cl | H |
| —CF₃ | —CH₃ | O | Cl | Cl | H |
| | —(CH₂)₄— | O | Cl | Cl | H |
| | —(CH₂)₅— | O | Cl | Cl | H |
| | —(CH₂)₆— | O | Cl | Cl | H |
| | —CH₂—CH(CH₃)—(CH₂)₃— | O | Cl | Cl | H |
| | —(CH₂)₂—CH(CH₃)—(CH₂)₂— | O | Cl | Cl | H |
| | —(CH₂)₂—CH—(CH₂)₂— with C₂H₅ branch | O | Cl | Cl | H |
| | —(CH₂)₂—CH—(CH₂)₂— with i-C₃H₇ branch | O | Cl | Cl | H |
| —CH₃ | —CH₃ | O | Cl | H | 6-Cl |
| —C₂H₅ | —CH₃ | O | Cl | H | 6-Cl |
| —CH(CH₃)₂ | —CH₃ | O | Cl | H | 6-Cl |
| —CF₃ | —CH₃ | O | Cl | H | 6-Cl |
| | —(CH₂)₄— | O | Cl | H | 6-Cl |
| | —(CH₂)₅— | O | Cl | H | 6-Cl |
| | —(CH₂)₆— | O | Cl | H | 6-Cl |
| | —CH₂—CH(CH₃)—(CH₂)₃— | O | Cl | H | 6-Cl |
| | —(CH₂)₂—CH(CH₃)—(CH₂)₂— | O | Cl | H | 6-Cl |
| | —(CH₂)₂—CH—(CH₂)₂— with C₂H₅ branch | O | Cl | H | 6-Cl |
| | —(CH₂)₂—CH—(CH₂)₂— with i-C₃H₇ branch | O | Cl | H | 6-Cl |
| —CH₃ | —CH₃ | O | Cl | H | 6-F |
| —C₂H₅ | —CH₃ | O | Cl | H | 6-F |
| —CH(CH₃)₂ | —CH₃ | O | Cl | H | 6-F |
| —CF₃ | —CH₃ | O | Cl | H | 6-F |
| | —(CH₂)₄— | O | Cl | H | 6-F |
| | —(CH₂)₅— | O | Cl | H | 6-F |

TABLE 1-continued (Ia) structure: A–B–C(OH)=C(–C(=O)–D)–(phenyl with X, Y, Zn substituents)

| A | B | D | X | Y | $Z_n$ |
|---|---|---|---|---|---|
| | —(CH$_2$)$_6$— | O | Cl | H | 6-F |
| | —CH$_2$—CH(CH$_3$)—(CH$_2$)$_3$— | O | Cl | H | 6-F |
| | —(CH$_2$)$_2$—CH(CH$_3$)—(CH$_2$)$_2$— | O | Cl | H | 6-F |
| | —(CH$_2$)$_2$—CH(C$_2$H$_5$)—(CH$_2$)$_2$— | O | Cl | H | 6-F |
| | —(CH$_2$)$_2$—CH(i-C$_3$H$_7$)—(CH$_2$)$_2$— | O | Cl | H | 6-F |
| —CH$_3$ | —CH$_3$ | O | —CH$_3$ | —CH$_3$ | H |
| —C$_2$H$_5$ | —CH$_3$ | O | —CH$_3$ | —CH$_3$ | H |
| —CH(CH$_3$)$_2$ | —CH$_3$ | O | —CH$_3$ | —CH$_3$ | H |
| —CF$_3$ | —CH$_3$ | O | —CH$_3$ | —CH$_3$ | H |
| | —(CH$_2$)$_4$— | O | —CH$_3$ | —CH$_3$ | H |
| | —(CH$_2$)$_5$— | O | —CH$_3$ | —CH$_3$ | H |
| | —(CH$_2$)$_6$— | O | —CH$_3$ | —CH$_3$ | H |
| | —CH$_2$—CH(CH$_3$)—(CH$_2$)$_3$— | O | —CH$_3$ | —CH$_3$ | H |
| | —(CH$_2$)$_2$—CH(CH$_3$)—(CH$_2$)$_2$— | O | —CH$_3$ | —CH$_3$ | H |
| | —(CH$_2$)$_2$—CH(C$_2$H$_5$)—(CH$_2$)$_2$— | O | —CH$_3$ | —CH$_3$ | H |
| | —(CH$_2$)$_2$—CH(i-C$_3$H$_7$)—(CH$_2$)$_2$— | O | —CH$_3$ | —CH$_3$ | H |
| —CH$_3$ | —CH$_3$ | O | Cl | F | H |
| —C$_2$H$_5$ | —CH$_3$ | O | Cl | F | H |
| —CH(CH$_3$)$_2$ | —CH$_3$ | O | Cl | F | H |
| —CF$_3$ | —CH$_3$ | O | Cl | F | H |
| | —(CH$_2$)$_4$— | O | Cl | F | H |
| | —(CH$_2$)$_5$— | O | Cl | F | H |
| | —(CH$_2$)$_6$— | O | Cl | F | H |
| | —CH$_2$—CH(CH$_3$)—(CH$_2$)$_3$— | O | Cl | F | H |
| | —(CH$_2$)$_2$—CH(CH$_3$)—(CH$_2$)$_2$— | O | Cl | F | H |
| | —(CH$_2$)$_2$—CH(C$_2$H$_5$)—(CH$_2$)$_2$— | O | Cl | F | H |
| | —(CH$_2$)$_2$—CH(i-C$_3$H$_7$)—(CH$_2$)$_2$— | O | Cl | F | H |
| —CH$_3$ | —CH$_3$ | O | —Cl | —CF$_3$ | 6-Cl |
| —C$_2$H$_5$ | —CH$_3$ | O | —Cl | —CF$_3$ | 6-Cl |
| —CH(CH$_3$)$_2$ | —CH$_3$ | O | —Cl | —CF$_3$ | 6-Cl |
| —CF$_3$ | —CH$_3$ | O | —Cl | —CF$_3$ | 6-Cl |
| | —(CH$_2$)$_4$— | O | —Cl | —CF$_3$ | 6-Cl |
| | —(CH$_2$)$_5$— | O | —Cl | —CF$_3$ | 6-Cl |
| | —(CH$_2$)$_6$— | O | —Cl | —CF$_3$ | 6-Cl |
| | —CH$_2$—CH(CH$_3$)—(CH$_2$)$_3$— | O | —Cl | —CF$_3$ | 6-Cl |
| | —(CH$_2$)$_2$—CH(CH$_3$)—(CH$_2$)$_2$— | O | —Cl | —CF$_3$ | 6-Cl |
| | —(CH$_2$)$_2$—CH(C$_2$H$_5$)—(CH$_2$)$_2$— | O | —Cl | —CF$_3$ | 6-Cl |
| | —(CH$_2$)$_2$—CH(i-C$_3$H$_7$)—(CH$_2$)$_2$— | O | —Cl | —CF$_3$ | 6-Cl |
| H | H | O | Cl | Cl | H |
| H | H | O | Cl | H | 6-Cl |
| H | H | O | CH$_3$ | CH$_3$ | H |
| H | H | O | CH$_3$ | H | 6-CH$_3$ |

TABLE 1-continued

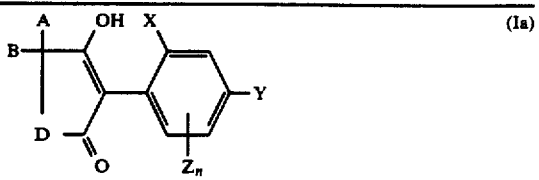

| A | B | D | X | Y | $Z_n$ |
|---|---|---|---|---|---|
| CH₃ | CH₃ | O | Cl | Cl | H |
| CH₃ | CH₃ | O | Cl | H | 6-Cl |
| CH₃ | CH₃ | O | CH₃ | CH₃ | H |
| CH₃ | CH₃ | O | CH₃ | H | 6-CH₃ |
| CH₃ | H | O | Cl | H | 6-Cl |
| CH₃ | H | O | CH₃ | CH₃ | H |
| CH₃ | H | O | CH₃ | H | 6-CH₃ |
| phenyl | H | O | Cl | Cl | H |
| phenyl | H | O | Cl | H | 6-Cl |
| phenyl | H | O | CH₃ | CH₃ | H |
| phenyl | H | O | CH₃ | H | 6-CH₃ |
| H | H | S | Cl | Cl | H |
| H | H | S | Cl | H | 6-Cl |
| H | H | S | CH₃ | CH₃ | H |
| H | H | S | CH₃ | H | 6-CH₃ |
| H | H | S | CH₃ | CH₃ | 6-CH₃ |
| CH₃ | H | S | Cl | Cl | H |
| CH₃ | H | S | Cl | H | 6-Cl |
| CH₃ | H | S | CH₃ | CH₃ | H |
| CH₃ | H | S | CH₃ | H | 6-CH₃ |
| CH₃ | H | S | CH₃ | CH₃ | 6-CH₃ |

The following 3-aryl-4-hydroxy-Δ³-dihydrofurane derivatives of the formula (Ib) may be mentioned individually in addition to the compounds mentioned in the Preparation Examples:

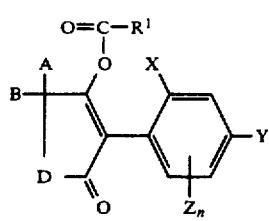

TABLE 2

| A | B | D | X | Y | $Z_n$ | R¹ | m.p. °C. |
|---|---|---|---|---|---|---|---|
| —CH₃ | —CH₃ | O | —CH₃ | —CH₃ | 6-CH₃ | —CH₃ | |
| —CH₃ | —CH₃ | O | —CH₃ | —CH₃ | 6-CH₃ | —C₂H₅ | |
| —CH₃ | —CH₃ | O | —CH₃ | —CH₃ | 6-CH₃ | —C₃H₇ | |
| —CH₃ | —CH₃ | O | —CH₃ | —CH₃ | 6-CH₃ | —C₄H₉ | |
| —CH₃ | —CH₃ | O | —CH₃ | —CH₃ | 6-CH₃ | —CH(CH₃)₂ | |
| —CH₃ | —CH₃ | O | —CH₃ | —CH₃ | 6-CH₃ | —CH₂CH(CH₃)₂ | |
| —CH₃ | —CH₃ | O | —CH₃ | —CH₃ | 6-CH₃ | —C(CH₃)₃ | |
| —CH₃ | —CH₃ | O | —CH₃ | —CH₃ | 6-CH₃ | —C(CH₃)₂—C₂H₅ | |
| —CH₃ | —CH₃ | O | —CH₃ | —CH₃ | 6-CH₃ | —C(CH₃)₂—CH(CH₃)₂ | |
| —CH₃ | —CH₃ | O | —CH₃ | —CH₃ | 6-CH₃ | —CH₂—C(CH₃)₃ | |

TABLE 2-continued

| | | | | | | |
|---|---|---|---|---|---|---|
| —CH₃ | —CH₃ | O | —CH₃ | —CH₃ | 6-CH₃ | —CH—C₄H₉<br>\|<br>C₂H₅ |
| —CH₃ | —CH₃ | O | —CH₃ | —CH₃ | 6-CH₃ | —C(CH₃)₂—CH₂Cl |
| —CH₃ | —CH₃ | O | —CH₃ | —CH₃ | 6-CH₃ | —C(CH₂Cl)₂<br>\|<br>CH₃ |
| —CH₃ | —CH₃ | O | —CH₃ | —CH₃ | 6-CH₃ | —C(CH₃)₂—CH₂OCH₃ |
| —CH₃ | —CH₃ | O | —CH₃ | —CH₃ | 6-CH₃ | —C(CH₃)—(CH₂—OCH₃)₂ |
| —CH₃ | —CH₃ | O | —CH₃ | —CH₃ | 6-CH₃ | —CH=C(CH₃)₂ |
| —CH₃ | —CH₃ | O | —CH₃ | —CH₃ | 6-CH₃ | (cyclopropyl) |
| —CH₃ | —CH₃ | O | —CH₃ | —CH₃ | 6-CH₃ | (cyclohexyl, H) |
| —CH₃ | —CH₃ | O | —CH₃ | —CH₃ | 6-CH₃ | (1-methylcyclohexyl, H) |
| —CH₃ | —CH₃ | O | —CH₃ | —CH₃ | 6-CH₃ | (phenyl) |
| —CH₃ | —CH₃ | O | —CH₃ | —CH₃ | 6-CH₃ | (2-thienyl) |
| —CH₃ | —CH₃ | O | —CH₃ | —CH₃ | 6-CH₃ | (2-furyl) |
| —CH₃ | —CH₃ | O | —CH₃ | —CH₃ | 6-CH₃ | —CH₂—(phenyl) |
| —CH₃ | —CH₃ | O | —CH₃ | —CH₃ | 6-CH₃ | (3-pyridyl) |
| —C₂H₅ | —CH₃ | O | —CH₃ | —CH₃ | 6-CH₃ | —CH₃ |
| —C₂H₅ | —CH₃ | O | —CH₃ | —CH₃ | 6-CH₃ | —C₂H₅ |
| —C₂H₅ | —CH₃ | O | —CH₃ | —CH₃ | 6-CH₃ | —C₃H₇ |
| —C₂H₅ | —CH₃ | O | —CH₃ | —CH₃ | 6-CH₃ | —C₄H₉ |
| —C₂H₅ | —CH₃ | O | —CH₃ | —CH₃ | 6-CH₃ | —CH(CH₃)₂ |
| —C₂H₅ | —CH₃ | O | —CH₃ | —CH₃ | 6-CH₃ | —CH₂CH(CH₃)₂ |
| —C₂H₅ | —CH₃ | O | —CH₃ | —CH₃ | 6-CH₃ | —C(CH₃)₃ |
| —C₂H₅ | —CH₃ | O | —CH₃ | —CH₃ | 6-CH₃ | —C(CH₃)₂—C₂H₅ |
| —C₂H₅ | —CH₃ | O | —CH₃ | —CH₃ | 6-CH₃ | —C(CH₃)₂—CH(CH₃)₂ |
| —C₂H₅ | —CH₃ | O | —CH₃ | —CH₃ | 6-CH₃ | —CH₂—C(CH₃)₃ |
| —C₂H₅ | —CH₃ | O | —CH₃ | —CH₃ | 6-CH₃ | —CH—C₄H₉<br>\|<br>C₂H₅ |
| —C₂H₅ | —CH₃ | O | —CH₃ | —CH₃ | 6-CH₃ | —C(CH₃)₂—CH₂Cl |
| —C₂H₅ | —CH₃ | O | —CH₃ | —CH₃ | 6-CH₃ | —C(CH₂Cl)₂<br>\|<br>CH₃ |
| —C₂H₅ | —CH₃ | O | —CH₃ | —CH₃ | 6-CH₃ | —C(CH₃)₂—CH₂OCH₃ |
| —C₂H₅ | —CH₃ | O | —CH₃ | —CH₃ | 6-CH₃ | —C(CH₃)—(CH₂—OCH₃)₂ |
| —C₂H₅ | —CH₃ | O | —CH₃ | —CH₃ | 6-CH₃ | —CH=C(CH₃)₂ |

TABLE 2-continued

| | | | | | | |
|---|---|---|---|---|---|---|
| —C$_2$H$_5$ | —CH$_3$ | O | —CH$_3$ | —CH$_3$ | 6-CH$_3$ | cyclopropyl |
| —C$_2$H$_5$ | —CH$_3$ | O | —CH$_3$ | —CH$_3$ | 6-CH$_3$ | cyclohexyl (H) |
| —C$_2$H$_5$ | —CH$_3$ | O | —CH$_3$ | —CH$_3$ | 6-CH$_3$ | 1-methylcyclohexyl (H$_3$C, H) |
| —C$_2$H$_5$ | —CH$_3$ | O | —CH$_3$ | —CH$_3$ | 6-CH$_3$ | phenyl |
| —C$_2$H$_5$ | —CH$_3$ | O | —CH$_3$ | —CH$_3$ | 6-CH$_3$ | 2-thienyl |
| —C$_2$H$_5$ | —CH$_3$ | O | —CH$_3$ | —CH$_3$ | 6-CH$_3$ | 2-furyl |
| —C$_2$H$_5$ | —CH$_3$ | O | —CH$_3$ | —CH$_3$ | 6-CH$_3$ | —CH$_2$-phenyl |
| —C$_2$H$_5$ | —CH$_3$ | O | —CH$_3$ | —CH$_3$ | 6-CH$_3$ | pyridyl |
| —CH(CH$_3$)$_2$ | —CH$_3$ | O | —CH$_3$ | —CH$_3$ | 6-CH$_3$ | —CH$_3$ |
| —CH(CH$_3$)$_2$ | —CH$_3$ | O | —CH$_3$ | —CH$_3$ | 6-CH$_3$ | —C$_2$H$_5$ |
| —CH(CH$_3$)$_2$ | —CH$_3$ | O | —CH$_3$ | —CH$_3$ | 6-CH$_3$ | —C$_3$H$_7$ |
| —CH(CH$_3$)$_2$ | —CH$_3$ | O | —CH$_3$ | —CH$_3$ | 6-CH$_3$ | —C$_4$H$_9$ |
| —CH(CH$_3$)$_2$ | —CH$_3$ | O | —CH$_3$ | —CH$_3$ | 6-CH$_3$ | —CH(CH$_3$)$_2$ |
| —CH(CH$_3$)$_2$ | —CH$_3$ | O | —CH$_3$ | —CH$_3$ | 6-CH$_3$ | —CH$_2$CH(CH$_3$)$_2$ |
| —CH(CH$_3$)$_2$ | —CH$_3$ | O | —CH$_3$ | —CH$_3$ | 6-CH$_3$ | —C(CH$_3$)$_3$ |
| —CH(CH$_3$)$_2$ | —CH$_3$ | O | —CH$_3$ | —CH$_3$ | 6-CH$_3$ | —C(CH$_3$)$_2$—C$_2$H$_5$ |
| —CH(CH$_3$)$_2$ | —CH$_3$ | O | —CH$_3$ | —CH$_3$ | 6-CH$_3$ | —C(CH$_3$)$_2$—CH(CH$_3$)$_2$ |
| —CH(CH$_3$)$_2$ | —CH$_3$ | O | —CH$_3$ | —CH$_3$ | 6-CH$_3$ | —CH$_2$—C(CH$_3$)$_3$ |
| —CH(CH$_3$)$_2$ | —CH$_3$ | O | —CH$_3$ | —CH$_3$ | 6-CH$_3$ | —CH(C$_2$H$_5$)—C$_4$H$_9$ |
| —CH(CH$_3$)$_2$ | —CH$_3$ | O | —CH$_3$ | —CH$_3$ | 6-CH$_3$ | —C(CH$_3$)$_2$—CH$_2$Cl |
| —CH(CH$_3$)$_2$ | —CH$_3$ | O | —CH$_3$ | —CH$_3$ | 6-CH$_3$ | —C(CH$_2$Cl)$_2$(CH$_3$) |
| —CH(CH$_3$)$_2$ | —CH$_3$ | O | —CH$_3$ | —CH$_3$ | 6-CH$_3$ | —C(CH$_3$)$_2$—CH$_2$OCH$_3$ |
| —CH(CH$_3$)$_2$ | —CH$_3$ | O | —CH$_3$ | —CH$_3$ | 6-CH$_3$ | —C(CH$_3$)—(CH$_2$OCH$_3$)$_2$ |
| —CH(CH$_3$)$_2$ | —CH$_3$ | O | —CH$_3$ | —CH$_3$ | 6-CH$_3$ | —CH=C(CH$_3$)$_2$ |
| —CH(CH$_3$)$_2$ | —CH$_3$ | O | —CH$_3$ | —CH$_3$ | 6-CH$_3$ | cyclopropyl |
| —CH(CH$_3$)$_2$ | —CH$_3$ | O | —CH$_3$ | —CH$_3$ | 6-CH$_3$ | cyclohexyl (H) |

TABLE 2-continued

| | | | | | | |
|---|---|---|---|---|---|---|
| —CH(CH₃)₂ | —CH₃ | O | —CH₃ | —CH₃ | 6-CH₃ | H₃C—⟨cyclohexyl-H⟩ |
| —CH(CH₃)₂ | —CH₃ | O | —CH₃ | —CH₃ | 6-CH₃ | —⟨phenyl⟩ |
| —CH(CH₃)₂ | —CH₃ | O | —CH₃ | —CH₃ | 6-CH₃ | —⟨2-thienyl⟩ |
| —CH(CH₃)₂ | —CH₃ | O | —CH₃ | —CH₃ | 6-CH₃ | —⟨2-furyl⟩ |
| —CH(CH₃)₂ | —CH₃ | O | —CH₃ | —CH₃ | 6-CH₃ | —CH₂—⟨phenyl⟩ |
| —CH(CH₃)₂ | —CH₃ | O | —CH₃ | —CH₃ | 6-CH₃ | —⟨3-pyridyl⟩ |
| —CF₃ | —CH₃ | O | —CH₃ | —CH₃ | 6-CH₃ | —CH₃ |
| —CF₃ | —CH₃ | O | —CH₃ | —CH₃ | 6-CH₃ | —C₂H₅ |
| —CF₃ | —CH₃ | O | —CH₃ | —CH₃ | 6-CH₃ | —C₃H₇ |
| —CF₃ | —CH₃ | O | —CH₃ | —CH₃ | 6-CH₃ | —C₄H₉ |
| —CF₃ | —CH₃ | O | —CH₃ | —CH₃ | 6-CH₃ | —CH(CH₃)₂ |
| —CF₃ | —CH₃ | O | —CH₃ | —CH₃ | 6-CH₃ | —CH₂CH(CH₃)₂ |
| —CF₃ | —CH₃ | O | —CH₃ | —CH₃ | 6-CH₃ | —C(CH₃)₃ |
| —CF₃ | —CH₃ | O | —CH₃ | —CH₃ | 6-CH₃ | —C(CH₃)₂—C₂H₅ |
| —CF₃ | —CH₃ | O | —CH₃ | —CH₃ | 6-CH₃ | —C(CH₃)₂—CH(CH₃)₂ |
| —CF₃ | —CH₃ | O | —CH₃ | —CH₃ | 6-CH₃ | —CH₂—C(CH₃)₃ |
| —CF₃ | —CH₃ | O | —CH₃ | —CH₃ | 6-CH₃ | —CH(C₂H₅)—C₄H₉ |
| —CF₃ | —CH₃ | O | —CH₃ | —CH₃ | 6-CH₃ | —C(CH₃)₂—CH₂Cl |
| —CF₃ | —CH₃ | O | —CH₃ | —CH₃ | 6-CH₃ | —C(CH₃)(CH₂Cl)₂ |
| —CF₃ | —CH₃ | O | —CH₃ | —CH₃ | 6-CH₃ | —C(CH₃)₂—CH₂OCH₃ |
| —CF₃ | —CH₃ | O | —CH₃ | —CH₃ | 6-CH₃ | —C(CH₃)—(CH₂—OCH₃)₂ |
| —CF₃ | —CH₃ | O | —CH₃ | —CH₃ | 6-CH₃ | —CH=C(CH₃)₂ |
| —CF₃ | —CH₃ | O | —CH₃ | —CH₃ | 6-CH₃ | —⟨cyclopropyl⟩ |
| —CF₃ | —CH₃ | O | —CH₃ | —CH₃ | 6-CH₃ | —⟨cyclohexyl-H⟩ |
| —CF₃ | —CH₃ | O | —CH₃ | —CH₃ | 6-CH₃ | H₃C—⟨cyclohexyl-H⟩ |
| —CF₃ | —CH₃ | O | —CH₃ | —CH₃ | 6-CH₃ | —⟨phenyl⟩ |

TABLE 2-continued

| | | | | | | |
|---|---|---|---|---|---|---|
| —CF₃ | —CH₃ | O | —CH₃ | —CH₃ | 6-CH₃ | 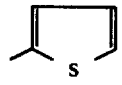 |
| —CF₃ | —CH₃ | O | —CH₃ | —CH₃ | 6-CH₃ | 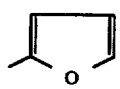 |
| —CF₃ | —CH₃ | O | —CH₃ | —CH₃ | 6-CH₃ | 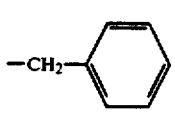 |
| —CF₃ | —CH₃ | O | —CH₃ | —CH₃ | 6-CH₃ | 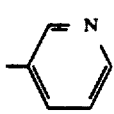 |
| | —(CH₂)₄— | O | —CH₃ | —CH₃ | 6-CH₃ | —CH₃ |
| | —(CH₂)₄— | O | —CH₃ | —CH₃ | 6-CH₃ | —C₂H₅ |
| | —(CH₂)₄— | O | —CH₃ | —CH₃ | 6-CH₃ | —C₃H₇ |
| | —(CH₂)₄— | O | —CH₃ | —CH₃ | 6-CH₃ | —C₄H₉ |
| | —(CH₂)₄— | O | —CH₃ | —CH₃ | 6-CH₃ | —CH(CH₃)₂ |
| | —(CH₂)₄— | O | —CH₃ | —CH₃ | 6-CH₃ | —CH₂CH(CH₃)₂ |
| | —(CH₂)₄— | O | —CH₃ | —CH₃ | 6-CH₃ | —C(CH₃)₃ |
| | —(CH₂)₄— | O | —CH₃ | —CH₃ | 6-CH₃ | —C(CH₃)₂—C₂H₅ |
| | —(CH₂)₄— | O | —CH₃ | —CH₃ | 6-CH₃ | —C(CH₃)₂—CH(CH₃)₂ |
| | —(CH₂)₄— | O | —CH₃ | —CH₃ | 6-CH₃ | —CH₂—C(CH₃)₃ |
| | —(CH₂)₄— | O | —CH₃ | —CH₃ | 6-CH₃ | —CH(C₂H₅)—C₄H₉ |
| | —(CH₂)₄— | O | —CH₃ | —CH₃ | 6-CH₃ | —C(CH₃)₂—CH₂Cl |
| | —(CH₂)₄— | O | —CH₃ | —CH₃ | 6-CH₃ | —C(CH₃)(CH₂Cl)₂ |
| | —(CH₂)₄— | O | —CH₃ | —CH₃ | 6-CH₃ | —C(CH₃)₂—CH₂OCH₃ |
| | —(CH₂)₄— | O | —CH₃ | —CH₃ | 6-CH₃ | —C(CH₃)—(CH₂—OCH₃)₂ |
| | —(CH₂)₄— | O | —CH₃ | —CH₃ | 6-CH₃ | —CH=C(CH₃)₂ |
| | —(CH₂)₄— | O | —CH₃ | —CH₃ | 6-CH₃ | 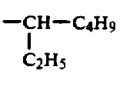 |
| | —(CH₂)₄— | O | —CH₃ | —CH₃ | 6-CH₃ | 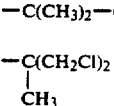 |
| | —(CH₂)₄— | O | —CH₃ | —CH₃ | 6-CH₃ |  |
| | —(CH₂)₄— | O | —CH₃ | —CH₃ | 6-CH₃ | 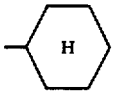 |
| | —(CH₂)₄— | O | —CH₃ | —CH₃ | 6-CH₃ | 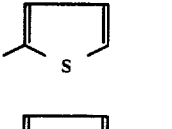 |
| | —(CH₂)₄— | O | —CH₃ | —CH₃ | 6-CH₃ | 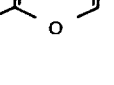 |

TABLE 2-continued

| | | | | | |
|---|---|---|---|---|---|
| —(CH₂)₄— | O | —CH₃ | —CH₃ | 6-CH₃ | 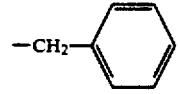 |
| —(CH₂)₄— | O | —CH₃ | —CH₃ | 6-CH₃ | 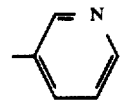 |
| —(CH₂)₅— | O | —CH₃ | —CH₃ | 6-CH₃ | —CH₃ |
| —(CH₂)₅— | O | —CH₃ | —CH₃ | 6-CH₃ | —C₂H₅ |
| —(CH₂)₅— | O | —CH₃ | —CH₃ | 6-CH₃ | —C₃H₇ |
| —(CH₂)₅— | O | —CH₃ | —CH₃ | 6-CH₃ | —C₄H₉ |
| —(CH₂)₅— | O | —CH₃ | —CH₃ | 6-CH₃ | —CH(CH₃)₂ |
| —(CH₂)₅— | O | —CH₃ | —CH₃ | 6-CH₃ | —CH₂CH(CH₃)₂ |
| —(CH₂)₅— | O | —CH₃ | —CH₃ | 6-CH₃ | —C(CH₃)₃ |
| —(CH₂)₅— | O | —CH₃ | —CH₃ | 6-CH₃ | —C(CH₃)₂—C₂H₅ |
| —(CH₂)₅— | O | —CH₃ | —CH₃ | 6-CH₃ | —C(CH₃)₂—CH(CH₃)₂ |
| —(CH₂)₅— | O | —CH₃ | —CH₃ | 6-CH₃ | —CH₂—C(CH₃)₃ |
| —(CH₂)₅— | O | —CH₃ | —CH₃ | 6-CH₃ | —CH—C₄H₉<br>    |<br>   C₂H₅ |
| —(CH₂)₅— | O | —CH₃ | —CH₃ | 6-CH₃ | —C(CH₃)₂—CH₂Cl |
| —(CH₂)₅— | O | —CH₃ | —CH₃ | 6-CH₃ | —C(CH₂Cl)₂<br>  |<br>  CH₃ |
| —(CH₂)₅— | O | —CH₃ | —CH₃ | 6-CH₃ | —C(CH₃)₂—CH₂OCH₃ |
| —(CH₂)₅— | O | —CH₃ | —CH₃ | 6-CH₃ | —C(CH₃)—(CH₂—OCH₃)₂ |
| —(CH₂)₅— | O | —CH₃ | —CH₃ | 6-CH₃ | —CH=C(CH₃)₂ |
| —(CH₂)₅— | O | —CH₃ | —CH₃ | 6-CH₃ | 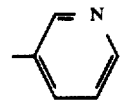 |
| —(CH₂)₅— | O | —CH₃ | —CH₃ | 6-CH₃ |  |
| —(CH₂)₅— | O | —CH₃ | —CH₃ | 6-CH₃ | 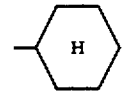 |
| —(CH₂)₅— | O | —CH₃ | —CH₃ | 6-CH₃ | 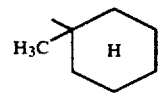 |
| —(CH₂)₅— | O | —CH₃ | —CH₃ | 6-CH₃ | 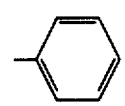 |
| —(CH₂)₅— | O | —CH₃ | —CH₃ | 6-CH₃ | 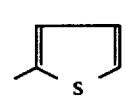 |
| —(CH₂)₅— | O | —CH₃ | —CH₃ | 6-CH₃ |  |
| —(CH₂)₅— | O | —CH₃ | —CH₃ | 6-CH₃ | 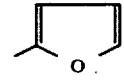 |
| —(CH₂)₆— | O | —CH₃ | —CH₃ | 6-CH₃ | CH₃ |

TABLE 2-continued

| | | | | | |
|---|---|---|---|---|---|
| —(CH₂)₆— | O | —CH₃ | —CH₃ | 6-CH₃ | —C₂H₅ |
| —(CH₂)₆— | O | —CH₃ | —CH₃ | 6-CH₃ | —C₃H₇ |
| —(CH₂)₆— | O | —CH₃ | —CH₃ | 6-CH₃ | —C₄H₉ |
| —(CH₂)₆— | O | —CH₃ | —CH₃ | 6-CH₃ | —CH(CH₃)₂ |
| —(CH₂)₆— | O | —CH₃ | —CH₃ | 6-CH₃ | —CH₂CH(CH₃)₂ |
| —(CH₂)₆— | O | —CH₃ | —CH₃ | 6-CH₃ | —C(CH₃)₃ |
| —(CH₂)₆— | O | —CH₃ | —CH₃ | 6-CH₃ | —C(CH₃)₂—C₂H₅ |
| —(CH₂)₆— | O | —CH₃ | —CH₃ | 6-CH₃ | —C(CH₃)₂—CH(CH₃)₂ |
| —(CH₂)₆— | O | —CH₃ | —CH₃ | 6-CH₃ | —CH₂C(CH₃)₃ |
| —(CH₂)₆— | O | —CH₃ | —CH₃ | 6-CH₃ | —CH—C₄H₉<br>    \|<br>    C₂H₅ |
| —(CH₂)₆— | O | —CH₃ | —CH₃ | 6-CH₃ | —C(CH₃)₂—CH₂Cl |
| —(CH₂)₆— | O | —CH₃ | —CH₃ | 6-CH₃ | —C(CH₂Cl)₂<br>    \|<br>    CH₃ |
| —(CH₂)₆— | O | —CH₃ | —CH₃ | 6-CH₃ | —C(CH₃)₂—CH₂OCH₃ |
| —(CH₂)₆— | O | —CH₃ | —CH₃ | 6-CH₃ | —C(CH₃)—(CH₂OCH₃)₂ |
| —(CH₂)₆— | O | —CH₃ | —CH₃ | 6-CH₃ | —CH=C(CH₃)₂ |
| —(CH₂)₆— | O | —CH₃ | —CH₃ | 6-CH₃ |  |
| —(CH₂)₆— | O | —CH₃ | —CH₃ | 6-CH₃ | 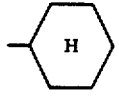 |
| —(CH₂)₆— | O | —CH₃ | —CH₃ | 6-CH₃ | 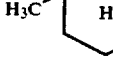 |
| —(CH₂)₆— | O | —CH₃ | —CH₃ | 6-CH₃ | 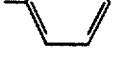 |
| —(CH₂)₆— | O | —CH₃ | —CH₃ | 6-CH₃ | 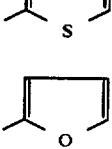 |
| —(CH₂)₆— | O | —CH₃ | —CH₃ | 6-CH₃ |  |
| —(CH₂)₆— | O | —CH₃ | —CH₃ | 6-CH₃ | 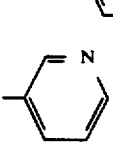 |
| —(CH₂)₆— | O | —CH₃ | —CH₃ | 6-CH₃ |  |
| —CH₂—CH(CH₃)—(CH₂)₃— | O | —CH₃ | 6-CH₃ | CH₃ | |
| —CH₂—CH(CH₃)—(CH₂)₃— | O | —CH₃ | —CH₃ | 6-CH₃ | —C₂H₅ |
| —CH₂—CH(CH₃)—(CH₂)₃— | O | —CH₃ | —CH₃ | 6-CH₃ | —C₃H₇ |
| —CH₂—CH(CH₃)—(CH₂)₃— | O | —CH₃ | —CH₃ | 6-CH₃ | —C₄H₉ |
| —CH₂—CH(CH₃)—(CH₂)₃— | O | —CH₃ | —CH₃ | 6-CH₃ | —CH(CH₃)₂ |
| —CH₂—CH(CH₃)—(CH₂)₃— | O | —CH₃ | —CH₃ | 6-CH₃ | —CH₂CH(CH₃)₂ |
| —CH₂—CH(CH₃)—(CH₂)₃— | O | —CH₃ | —CH₃ | 6-CH₃ | —C(CH₃)₃ |
| —CH₂—CH(CH₃)—(CH₂)₃— | O | —CH₃ | —CH₃ | 6-CH₃ | —C(CH₃)₂—C₂H₅ |
| —CH₂—CH(CH₃)—(CH₂)₃— | O | —CH₃ | —CH₃ | 6-CH₃ | —C(CH₃)₂—CH(CH₃)₂ |
| —CH₂—CH(CH₃)—(CH₂)₃— | O | —CH₃ | —CH₃ | 6-CH₃ | —CH₂C(CH₃)₃ |

-continued

| | | | | |
|---|---|---|---|---|
| —CH₂—CH(CH₃)—(CH₂)₃— | O | —CH₃ | —CH₃ | 6-CH₃ | —CH—C₄H₉<br>\|<br>C₂H₅ |
| —CH₂—CH(CH₃)—(CH₂)₃— | O | —CH₃ | —CH₃ | 6-CH₃ | —C(CH₃)₂—CH₂Cl |
| —CH₂—CH(CH₃)—(CH₂)₃— | O | —CH₃ | —CH₃ | 6-CH₃ | —C(CH₂Cl)₂<br>\|<br>CH₃ |
| —CH₂—CH(CH₃)—(CH₂)₃— | O | —CH₃ | —CH₃ | 6-CH₃ | —C(CH₃)₂—CH₂OCH₃ |
| —CH₂—CH(CH₃)—(CH₂)₃— | O | —CH₃ | —CH₃ | 6-CH₃ | —C(CH₃)—(CH₂OCH₃)₂ |
| —CH₂—CH(CH₃)—(CH₂)₃— | O | —CH₃ | —CH₃ | 6-CH₃ | —CH=C(CH₃)₂ |
| —CH₂—CH(CH₃)—(CH₂)₃— | O | —CH₃ | —CH₃ | 6-CH₃ | cyclopropyl |
| —CH₂—CH(CH₃)—(CH₂)₃— | O | —CH₃ | —CH₃ | 6-CH₃ | cyclohexyl |
| —CH₂—CH(CH₃)—(CH₂)₃— | O | —CH₃ | —CH₃ | 6-CH₃ | 1-methylcyclohexyl |
| —CH₂—CH(CH₃)—(CH₂)₃— | O | —CH₃ | —CH₃ | 6-CH₃ | phenyl |
| —CH₂—CH(CH₃)—(CH₂)₃— | O | —CH₃ | —CH₃ | 6-CH₃ | 2-thienyl |
| —CH₂—CH(CH₃)—(CH₂)₃— | O | —CH₃ | —CH₃ | 6-CH₃ | 2-furyl |
| —CH₂—CH(CH₃)—(CH₂)₃— | O | —CH₃ | —CH₃ | 6-CH₃ | —CH₂—phenyl |
| —CH₂—CH(CH₃)—(CH₂)₃— | O | —CH₃ | —CH₃ | 6-CH₃ | 3-pyridyl |
| —(CH₂)—CH(CH₃)—(CH₂)₂— | O | —CH₃ | —CH₃ | 6-CH₃ | CH₃ |
| —(CH₂)—CH(CH₃)—(CH₂)₂— | O | —CH₃ | —CH₃ | 6-CH₃ | —C₂H₅ |
| —(CH₂)—CH(CH₃)—(CH₂)₂— | O | —CH₃ | —CH₃ | 6-CH₃ | —C₃H₇ |
| —(CH₂)—CH(CH₃)—(CH₂)₂— | O | —CH₃ | —CH₃ | 6-CH₃ | —C₄H₉ |
| —(CH₂)—CH(CH₃)—(CH₂)₂— | O | —CH₃ | —CH₃ | 6-CH₃ | —CH(CH₃)₂ |
| —(CH₂)—CH(CH₃)—(CH₂)₂— | O | —CH₃ | —CH₃ | 6-CH₃ | —CH₂CH(CH₃)₂ |
| —(CH₂)—CH(CH₃)—(CH₂)₂— | O | —CH₃ | —CH₃ | 6-CH₃ | —C(CH₃)₃ |
| —(CH₂)—CH(CH₃)—(CH₂)₂— | O | —CH₃ | —CH₃ | 6-CH₃ | —C(CH₃)₂—C₂H₅ |
| —(CH₂)—CH(CH₃)—(CH₂)₂— | O | —CH₃ | —CH₃ | 6-CH₃ | —C(CH₃)₂—CH(CH₃)₂ |
| —(CH₂)—CH(CH₃)—(CH₂)₂— | O | —CH₃ | —CH₃ | 6-CH₃ | —CH₂C(CH₃)₃ |
| —(CH₂)—CH(CH₃)—(CH₂)₂— | O | —CH₃ | —CH₃ | 6-CH₃ | —CH—C₄H₉<br>\|<br>C₂H₅ |
| —(CH₂)—CH(CH₃)—(CH₂)₂— | O | —CH₃ | —CH₃ | 6-CH₃ | —C(CH₃)₂—CH₂Cl |
| —(CH₂)—CH(CH₃)—(CH₂)₂— | O | —CH₃ | —CH₃ | 6-CH₃ | —C(CH₂Cl)₂<br>\|<br>CH₃ |
| —(CH₂)—CH(CH₃)—(CH₂)₂— | O | —CH₃ | —CH₃ | 6-CH₃ | —C(CH₃)₂—CH₂OCH₃ |
| —(CH₂)—CH(CH₃)—(CH₂)₂— | O | —CH₃ | —CH₃ | 6-CH₃ | —C(CH₃)—(CH₂OCH₃)₂ |
| —(CH₂)—CH(CH₃)—(CH₂)₂— | O | —CH₃ | —CH₃ | 6-CH₃ | —CH=C(CH₃)₂ |

| | | | | |
|---|---|---|---|---|
| —(CH₂)—CH(CH₃)—(CH₂)₂— | O | —CH₃ | —CH₃ | 6-CH₃ |  |
| —(CH₂)—CH(CH₃)—(CH₂)₂— | O | —CH₃ | —CH₃ | 6-CH₃ | 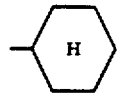 |
| —(CH₂)—CH(CH₃)—(CH₂)₂— | O | —CH₃ | —CH₃ | 6-CH₃ | 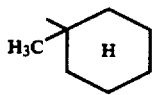 |
| —(CH₂)—CH(CH₃)—(CH₂)₂— | O | —CH₃ | —CH₃ | 6-CH₃ | 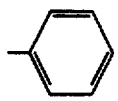 |
| —(CH₂)—CH(CH₃)—(CH₂)₂— | O | —CH₃ | —CH₃ | 6-CH₃ | 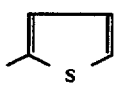 |
| —(CH₂)—CH(CH₃)—(CH₂)₂— | O | —CH₃ | —CH₃ | 6-CH₃ | 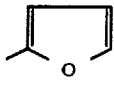 |
| —(CH₂)—CH(CH₃)—(CH₂)₂— | O | —CH₃ | —CH₃ | 6-CH₃ | —CH₂—⌬ |
| —(CH₂)—CH(CH₃)—(CH₂)₂— | O | —CH₃ | —CH₃ | 6-CH₃ | 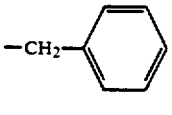 |
| —(CH₂)₂—CH(C₂H₅)—(CH₂)₂— | O | —CH₃ | —CH₃ | 6-CH₃ | CH₃ |
| —(CH₂)₂—CH(C₂H₅)—(CH₂)₂— | O | —CH₃ | —CH₃ | 6-CH₃ | —C₂H₅ |
| —(CH₂)₂—CH(C₂H₅)—(CH₂)₂— | O | —CH₃ | —CH₃ | 6-CH₃ | —C₃H₇ |
| —(CH₂)₂—CH(C₂H₅)—(CH₂)₂— | O | —CH₃ | —CH₃ | 6-CH₃ | —C₄H₉ |
| —(CH₂)₂—CH(C₂H₅)—(CH₂)₂— | O | —CH₃ | —CH₃ | 6-CH₃ | —CH(CH₃)₂ |
| —(CH₂)₂—CH(C₂H₅)—(CH₂)₂— | O | —CH₃ | —CH₃ | 6-CH₃ | —CH₂CH(CH₃)₂ |
| —(CH₂)₂—CH(C₂H₅)—(CH₂)₂— | O | —CH₃ | —CH₃ | 6-CH₃ | —C(CH₃)₃ |
| —(CH₂)₂—CH(C₂H₅)—(CH₂)₂— | O | —CH₃ | —CH₃ | 6-CH₃ | —C(CH₃)₂—C₂H₅ |
| —(CH₂)₂—CH(C₂H₅)—(CH₂)₂— | O | —CH₃ | —CH₃ | 6-CH₃ | —C(CH₃)₂—CH(CH₃)₂ |
| —(CH₂)₂—CH(C₂H₅)—(CH₂)₂— | O | —CH₃ | —CH₃ | 6-CH₃ | —CH₂C(CH₃)₃ |
| —(CH₂)₂—CH(C₂H₅)—(CH₂)₂— | O | —CH₃ | —CH₃ | 6-CH₃ | —CH(C₂H₅)—C₄H₉ |
| —(CH₂)₂—CH(C₂H₅)—(CH₂)₂— | O | —CH₃ | —CH₃ | 6-CH₃ | —C(CH₃)₂—CH₂Cl |
| —(CH₂)₂—CH(C₂H₅)—(CH₂)₂— | O | —CH₃ | —CH₃ | 6-CH₃ | —C(CH₂Cl)₂—CH₃ |
| —(CH₂)₂—CH(C₂H₅)—(CH₂)₂— | O | —CH₃ | —CH₃ | 6-CH₃ | —C(CH₃)₂—CH₂OCH₃ |
| —(CH₂)₂—CH(C₂H₅)—(CH₂)₂— | O | —CH₃ | —CH₃ | 6-CH₃ | —C(CH₃)—(CH₂OCH₃)₂ |
| —(CH₂)₂—CH(C₂H₅)—(CH₂)₂— | O | —CH₃ | —CH₃ | 6-CH₃ | —CH=C(CH₃)₂ |
| —(CH₂)₂—CH(C₂H₅)—(CH₂)₂— | O | —CH₃ | —CH₃ | 6-CH₃ | 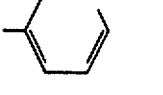 |
| —(CH₂)₂—CH(C₂H₅)—(CH₂)₂— | O | —CH₃ | —CH₃ | 6-CH₃ |  |

-continued

| | | | | |
|---|---|---|---|---|
| −(CH₂)₂−CH(C₂H₅)−(CH₂)₂− | O | −CH₃ | −CH₃ | 6-CH₃ | 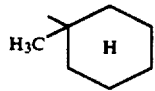
| −(CH₂)₂−CH(C₂H₅)−(CH₂)₂− | O | −CH₃ | −CH₃ | 6-CH₃ | 
| −(CH₂)₂−CH(C₂H₅)−(CH₂)₂− | O | −CH₃ | −CH₃ | 6-CH₃ | 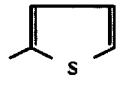
| −(CH₂)₂−CH(C₂H₅)−(CH₂)₂− | O | −CH₃ | −CH₃ | 6-CH₃ | 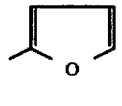
| −(CH₂)₂−CH(C₂H₅)−(CH₂)₂− | O | −CH₃ | −CH₃ | 6-CH₃ | −CH₂− 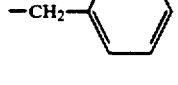
| −(CH₂)₂−CH(C₂H₅)−(CH₂)₂− | O | −CH₃ | −CH₃ | 6-CH₃ | 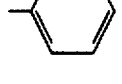
| −(CH₂)₂−CH(i-C₃H₇)−(CH₂)₂− | O | −CH₃ | −CH₃ | 6-CH₃ | CH₃ |
| −(CH₂)₂−CH(i-C₃H₇)−(CH₂)₂− | O | −CH₃ | −CH₃ | 6-CH₃ | −C₂H₅ |
| −(CH₂)₂−CH(i-C₃H₇)−(CH₂)₂− | O | −CH₃ | −CH₃ | 6-CH₃ | −C₃H₇ |
| −(CH₂)₂−CH(i-C₃H₇)−(CH₂)₂− | O | −CH₃ | −CH₃ | 6-CH₃ | −C₄H₉ |
| −(CH₂)₂−CH(i-C₃H₇)−(CH₂)₂− | O | −CH₃ | −CH₃ | 6-CH₃ | −CH(CH₃)₂ |
| −(CH₂)₂−CH(i-C₃H₇)−(CH₂)₂− | O | −CH₃ | −CH₃ | 6-CH₃ | −CH₂CH(CH₃)₂ |
| −(CH₂)₂−CH(i-C₃H₇)−(CH₂)₂− | O | −CH₃ | −CH₃ | 6-CH₃ | −C(CH₃)₃ |
| −(CH₂)₂−CH(i-C₃H₇)−(CH₂)₂− | O | −CH₃ | −CH₃ | 6-CH₃ | −C(CH₃)₂−C₂H₅ |
| −(CH₂)₂−CH(i-C₃H₇)−(CH₂)₂− | O | −CH₃ | −CH₃ | 6-CH₃ | −C(CH₃)₂−CH(CH₃)₂ |
| −(CH₂)₂−CH(i-C₃H₇)−(CH₂)₂− | O | −CH₃ | −CH₃ | 6-CH₃ | −CH₂C(CH₃)₃ |
| −(CH₂)₂−CH(i-C₃H₇)−(CH₂)₂− | O | −CH₃ | −CH₃ | 6-CH₃ | −CH−C₄H₉<br>  |<br>  C₂H₅ |
| −(CH₂)₂−CH(i-C₃H₇)−(CH₂)₂− | O | −CH₃ | −CH₃ | 6-CH₃ | −C(CH₃)₂−CH₂Cl |
| −(CH₂)₂−CH(i-C₃H₇)−(CH₂)₂− | O | −CH₃ | −CH₃ | 6-CH₃ | −C(CH₂Cl)₂<br>  |<br>  CH₃ |
| −(CH₂)₂−CH(i-C₃H₇)−(CH₂)₂− | O | −CH₃ | −CH₃ | 6-CH₃ | −C(CH₃)₂−CH₂OCH₃ |
| −(CH₂)₂−CH(i-C₃H₇)−(CH₂)₂− | O | −CH₃ | −CH₃ | 6-CH₃ | −C(CH₃)−(CH₂OCH₃)₂ |
| −(CH₂)₂−CH(i-C₃H₇)−(CH₂)₂− | O | −CH₃ | −CH₃ | 6-CH₃ | −CH=C(CH₃)₂ |
| −(CH₂)₂−CH(i-C₃H₇)−(CH₂)₂− | O | −CH₃ | −CH₃ | 6-CH₃ | 
| −(CH₂)₂−CH(i-C₃H₇)−(CH₂)₂− | O | −CH₃ | −CH₃ | 6-CH₃ | 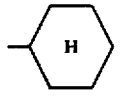
| −(CH₂)₂−CH(i-C₃H₇)−(CH₂)₂− | O | −CH₃ | −CH₃ | 6-CH₃ | 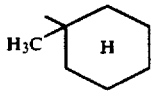
| −(CH₂)₂−CH(i-C₃H₇)−(CH₂)₂− | O | −CH₃ | −CH₃ | 6-CH₃ | 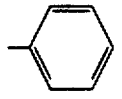

-continued

| | | | | | | |
|---|---|---|---|---|---|---|
| —(CH₂)₂—CH(i-C₃H₇)—(CH₂)₂— | | O | —CH₃ | —CH₃ | 6-CH₃ | 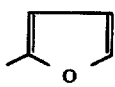 |
| —(CH₂)₂—CH(i-C₃H₇)—(CH₂)₂— | | O | —CH₃ | —CH₃ | 6-CH₃ | 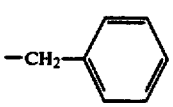 |
| —(CH₂)₂—CH(i-C₃H₇)—(CH₂)₂— | | O | —CH₃ | —CH₃ | 6-CH₃ | 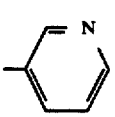 |
| —(CH₂)₂—CH(i-C₃H₇)—(CH₂)₂— | | O | —CH₃ | —CH₃ | 6-CH₃ | 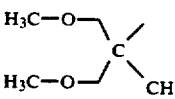 |
| CH₃ | H | O | Cl | Cl | H | CH₃— |
| CH₃ | H | O | Cl | Cl | H | (CH₃)₃C— |
| CH₃ | H | O | Cl | H | 6-Cl | CH₃— |
| CH₃ | H | O | Cl | H | 6-Cl | (CH₃)₃C— |
| CH₃ | H | O | CH₃ | CH₃ | H | CH₃ |
| CH₃ | H | O | CH₃ | CH₃ | H | (CH₃)₃C— |
| CH₃ | H | O | CH₃ | H | 6-CH₃ | CH₃— |
| CH₃ | H | O | CH₃ | H | 6-CH₃ | (CH₃)₃C— |
| CH₃ | H | O | CH₃ | CH₃ | 6-CH₃ | (CH₃)₂CH— |
| CH₃ | H | O | CH₃ | CH₃ | 6-CH₃ | 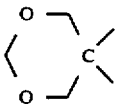 |
| CH₃ | H | O | CH₃ | CH₃ | 6-CH₃ | 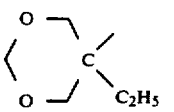 |
| CH₃ | H | O | CH₃ | CH₃ | 6-CH₃ | H₃C—S—CH₂— |
| CH₃ | H | O | CH₃ | CH₃ | 6-CH₃ | 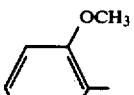 |
| CH₃ | H | O | CH₃ | CH₃ | 6-CH₃ | 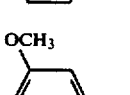 |
| CH₃ | H | O | CH₃ | CH₃ | 6-CH₃ | 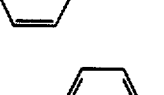 |
| CH₃ | H | O | CH₃ | CH₃ | 6-CH₃ | (see below) |
| CH₃ | H | O | CH₃ | CH₃ | 6-CH₃ | (see below) |
| CH₃ | H | O | CH₃ | CH₃ | 6-CH₃ | CH₃— |
| CH₃ | H | S | Cl | Cl | H | CH₃— |
| CH₃ | H | S | Cl | Cl | H | (CH₃)₃C— |
| CH₃ | H | S | Cl | H | 6-Cl | CH₃— |
| CH₃ | H | S | Cl | H | 6-Cl | (CH₃)₃C— |

-continued

| | | | | | | |
|---|---|---|---|---|---|---|
| CH$_3$ | H | S | CH$_3$ | CH$_3$ | H | CH$_3$— |
| CH$_3$ | H | S | CH$_3$ | CH$_3$ | H | (CH$_3$)$_3$C— |
| CH$_3$ | H | S | CH$_3$ | H | 6-H$_3$ | CH$_3$— |
| | —(CH$_2$)$_5$— | O | CH$_3$ | H | 6-CH$_3$ | (CH$_3$)$_3$C— |
| | —(CH$_2$)$_5$— | O | CH$_3$ | CH$_3$ | 6-CH$_3$ | (CH$_3$)$_2$CH— |
| CH$_3$ | H | O | CH$_3$ | CH$_3$ | 6-CH$_3$ | CH$_3$—(CH$_2$)$_3$— |
| CH$_3$ | H | O | CH$_3$ | CH$_3$ | 6-CH$_3$ | C$_2$H$_5$—C(CH$_3$)$_2$ |
| CH$_3$ | H | O | CH$_3$ | CH$_3$ | 6-CH$_3$ | (CH$_3$)$_3$C—CH$_2$— |
| CH$_3$ | H | O | CH$_3$ | CH$_3$ | 6-CH$_3$ | (CH$_3$)$_2$CH—C(CH$_3$)$_2$ |
| CH$_3$ | H | O | CH$_3$ | CH$_3$ | 6-CH$_3$ | CH$_2$=CH—(CH$_2$)$_8$— |
| CH$_3$ | H | O | CH$_3$ | CH$_3$ | 6-CH$_3$ | Cl—CH$_2$—C(CH$_3$)$_2$—C$_2$H$_5$ (Cl, H$_3$C, CH$_3$ on C) |
| CH$_3$ | H | O | CH$_3$ | CH$_3$ | 6-CH$_3$ | (ClCH$_2$)$_2$C(CH$_3$)—C$_2$H$_5$ |
| CH$_3$ | H | O | CH$_3$ | CH$_3$ | 6-CH$_3$ | H$_3$C—O—CH$_2$—C(CH$_3$)$_2$—C$_2$H$_5$ |
| | —(CH$_2$)$_5$— | O | CH$_3$ | CH$_3$ | 6-CH$_3$ | CH$_3$—(CH$_2$)$_3$— |
| | —(CH$_2$)$_5$— | O | CH$_3$ | CH$_3$ | 6-CH$_3$ | C$_2$H$_5$—C(CH$_3$)$_2$ |
| | —(CH$_2$)$_5$— | O | CH$_3$ | CH$_3$ | 6-CH$_3$ | (CH$_3$)$_3$C—CH$_2$— |
| | —(CH$_2$)$_5$— | O | CH$_3$ | CH$_3$ | 6-CH$_3$ | (CH$_3$)$_2$CH—C(CH$_3$)$_2$ |
| | —(CH$_2$)$_5$— | O | CH$_3$ | CH$_3$ | 6-CH$_3$ | CH$_2$=CH—(CH$_2$)$_8$— |
| | —(CH$_2$)$_5$— | O | CH$_3$ | CH$_3$ | 6-CH$_3$ | Cl—CH$_2$—C(CH$_3$)(C$_2$H$_5$)—Cl |
| CH$_3$ | H | S | CH$_3$ | H | 6-CH$_3$ | (CH$_3$)$_3$C— |
| CH$_3$ | H | S | CH$_3$ | CH$_3$ | 6-CH$_3$ | —CH$_3$ |
| CH$_3$ | H | S | CH$_3$ | CH$_3$ | 6-CH$_3$ | (CH$_3$)$_3$C— |
| CH$_3$ | H | S | CH$_3$ | CH$_3$ | 6-CH$_3$ | (CH$_3$)$_3$C— |
| CH$_3$ | H | S | CH$_3$ | CH$_3$ | 6-CH$_3$ | CH$_3$—(CH$_2$)$_3$— |
| CH$_3$ | H | S | CH$_3$ | CH$_3$ | 6-CH$_3$ | C$_2$H$_5$—C(CH$_3$)$_2$ |
| CH$_3$ | H | S | CH$_3$ | CH$_3$ | 6-CH$_3$ | (CH$_3$)$_3$C—CH$_2$— |
| CH$_3$ | H | S | CH$_3$ | CH$_3$ | 6-CH$_3$ | (CH$_3$)$_2$CH—C(CH$_3$)$_2$ |
| CH$_3$ | H | S | CH$_3$ | CH$_3$ | 6-CH$_3$ | CH$_2$=CH—(CH$_2$)$_8$— |
| CH$_3$ | H | S | CH$_3$ | CH$_3$ | 6-CH$_3$ | Cl—CH$_2$—C(CH$_3$)$_2$—C$_2$H$_5$ |

-continued

| | | | | | | |
|---|---|---|---|---|---|---|
| CH₃ | H | S | CH₃ | CH₃ | 6-CH₃ | ClCH₂-C(CH₃)(CH₃)-CH₂Cl |
| CH₃ | H | S | CH₃ | CH₃ | 6-CH₃ | H₃C-O-CH₂-C(CH₃)(CH₂-CH₃)- with H₃C |
| CH₃ | H | S | CH₃ | CH₃ | 6-CH₃ | H₃C-O-CH₂-C(CH₃)-CH₂-O-CH₃ |
| CH₃ | H | S | CH₃ | CH₃ | 6-CH₃ | (CH₃)₂C=CH- |
| CH₃ | H | S | CH₃ | CH₃ | 6-CH₃ | H₃C-S-CH₂- |
| CH₃ | H | S | CH₃ | CH₃ | 6-CH₃ | 1,3-dioxane-2-yl with CH₃ |
| CH₃ | H | S | CH₃ | CH₃ | 6-CH₃ | 1,3-dioxane-2-yl with C₂H₅ |
| CH₃ | H | S | CH₃ | CH₃ | 6-CH₃ | 2-methoxyphenyl-methyl (OCH₃ ortho) |
| CH₃ | H | S | CH₃ | CH₃ | 6-CH₃ | 3-methoxyphenyl-methyl (OCH₃ meta) |
| CH₃ | CH₃ | O | CH₃ | CH₃ | 6-CH₃ | CH₂=CH-(CH₂)₈- |
| CH₃ | CH₃ | O | CH₃ | CH₃ | 6-CH₃ | Cl-CH₂-C(CH₃)(CH₃)-CH₂-CH₃ |
| CH₃ | CH₃ | O | CH₃ | CH₃ | 6-CH₃ | Cl-CH₂-C(CH₃)-CH₂-Cl |
| CH₃ | CH₃ | O | CH₃ | CH₃ | 6-CH₃ | H₃C-O-CH₂-C(CH₃)(CH₂CH₃)- |
| CH₃ | CH₃ | O | CH₃ | CH₃ | 6-CH₃ | H₃C-O-CH₂-C(CH₃)-CH₂-O-CH₃ |
| CH₃ | CH₃ | O | CH₃ | CH₃ | 6-CH₃ | (CH₃)₂C=CH- |
| CH₃ | CH₃ | O | CH₃ | CH₃ | 6-CH₃ | H₃C-S-CH₂ |

-continued

| | | | | | | |
|---|---|---|---|---|---|---|
| CH₃ | CH₃ | O | CH₃ | CH₃ | 6-CH₃ | 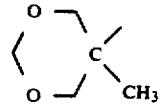 |
| CH₃ | CH₃ | O | CH₃ | CH₃ | 6-CH₃ | 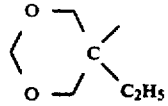 |
| CH₃ | CH₃ | O | CH₃ | CH₃ | 6-CH₃ | 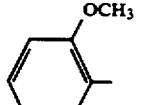 |
| CH₃ | CH₃ | O | CH₃ | CH₃ | 6-CH₃ | 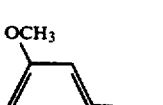 |
| CH₃ | CH₃ | O | CH₃ | CH₃ | 6-CH₃ | 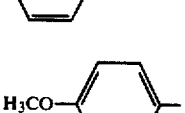 |
| CH₃ | CH₃ | O | CH₃ | CH₃ | 6-CH₃ | CH₃— |
| | —(CH₂)₅— | O | Cl | Cl | H | CH₃— |
| | —(CH₂)₅— | O | Cl | Cl | H | (CH₃)₃C— |
| | —(CH₂)₅— | O | Cl | H | 6-Cl | CH₃— |
| CH₃ | H | S | CH₃ | CH₃ | 6-CH₃ | 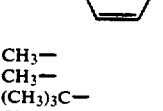 |
| CH₃ | H | S | CH₃ | CH₃ | 6-CH₃ | CH₃— |
| CH₃ | CH₃ | O | Cl | Cl | H | CH₃— |
| CH₃ | CH₃ | O | Cl | Cl | H | (CH₃)₃C— |
| CH₃ | CH₃ | O | Cl | H | 6-Cl | CH₃— |
| CH₃ | CH₃ | O | Cl | H | 6-Cl | (CH₃)₃C— |
| CH₃ | CH₃ | O | CH₃ | CH₃ | H | CH₃— |
| CH₃ | CH₃ | O | CH₃ | CH₃ | H | (CH₃)₃C— |
| CH₃ | CH₃ | O | CH₃ | H | 6-CH₃ | CH₃— |
| CH₃ | CH₃ | O | CH₃ | H | 6-CH₃ | (CH₃)₃C— |
| CH₃ | CH₃ | O | CH₃ | CH₃ | 6-CH₃ | (CH₃)₂CH— |
| CH₃ | CH₃ | O | CH₃ | CH₃ | 6-CH₃ | CH₃—(CH₂)₃— |
| | —(CH₂)₅— | O | CH₃ | CH₃ | 6-CH₃ | H₃C—S—CH₂ |
| | —(CH₂)₅— | O | CH₃ | CH₃ | 6-CH₃ | 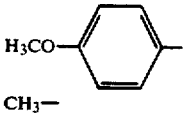 |
| | —(CH₂)₅— | O | CH₃ | CH₃ | 6-CH₃ | 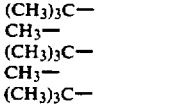 |
| | —(CH₂)₅— | O | CH₃ | CH₃ | 6-CH₃ | 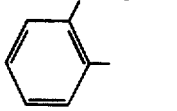 |
| | —(CH₂)₅— | O | CH₃ | CH₃ | 6-CH₃ | 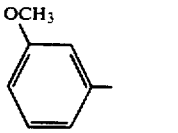 |

-continued
| | | | | | | |
|---|---|---|---|---|---|---|
| —(CH₂)₅— | | O | CH₃ | CH₃ | 6-CH₃ | H₃CO—⟨phenyl⟩— |
| 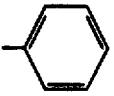 | H | O | Cl | Cl | H | CH₃— |
| 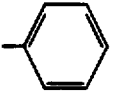 | H | O | Cl | Cl | H | (CH₃)₃C— |
| 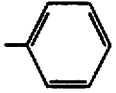 | H | O | Cl | H | 6-Cl | CH₃— |
| 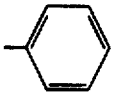 | H | O | Cl | H | 6-Cl | (CH₃)₃C— |
|  | H | O | CH₃ | CH₃ | H | CH₃— |
| 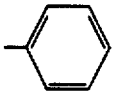 | H | O | CH₃ | CH₃ | H | (CH₃)₃C— |
| 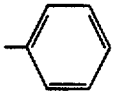 | H | O | CH₃ | H | 6-CH₃ | CH₃— |
| 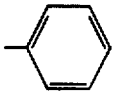 | H | O | CH₃ | H | 6-CH₃ | (CH₃)₃C— |
| 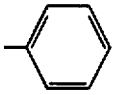 | H | O | CH₃ | CH₃ | 6-CH₃ | CH₃— |
| 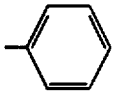 | H | O | CH₃ | CH₃ | 6-CH₃ | (CH₃)₂CH— |
| 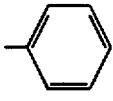 | H | O | CH₃ | CH₃ | 6-CH₃ | (CH₃)₃C— |
| 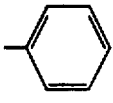 | H | O | CH₃ | CH₃ | 6-CH₃ | (CH₃)—(CH₂)₃— |
| 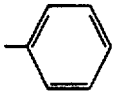 | H | O | CH₃ | CH₃ | 6-CH₃ | C₂H₅—C(CH₃)₂ |

| | | | | | |
|---|---|---|---|---|---|
| 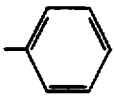 | H | O | CH₃ | CH₃ | 6-CH₃ | (CH₃)₃C—CH₂— |
| 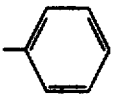 | H | O | CH₃ | CH₃ | 6-CH₃ | (CH₃)₂CH—C(CH₃)₂— |
| —(CH₂)₅— | | O | Cl | H | 6-Cl | (CH₃)₃C— |
| —(CH₂)₅— | | O | CH₃ | CH₃ | H | CH₃— |
| —(CH₂)₅— | | O | CH₃ | CH₃ | H | (CH₃)₃C— |
| —(CH₂)₅— | | O | CH₃ | H | 6-CH₃ | CH₃— |
| —(CH₂)₅— | | O | CH₃ | CH₃ | 6-CH₃ | 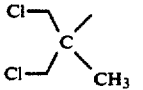 |
| —(CH₂)₅— | | O | CH₃ | CH₃ | 6-CH₃ | 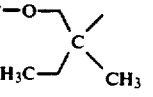 |
| —(CH₂)₅— | | O | CH₃ | CH₃ | 6-CH₃ | 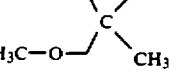 |
| —(CH₂)₅— | | O | CH₃ | CH₃ | 6-CH₃ |  |
| 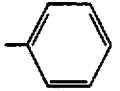 | H | O | CH₃ | CH₃ | 6-CH₃ | CH₂=CH—(CH₂)₈— |
| 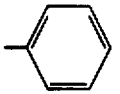 | H | O | CH₃ | CH₃ | 6-CH₃ | 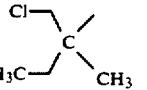 |
| 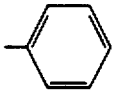 | H | O | CH₃ | CH₃ | 6-CH₃ | 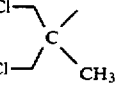 |
| 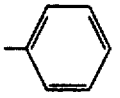 | H | O | CH₃ | CH₃ | 6-CH₃ | 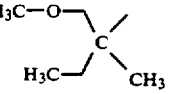 |
| 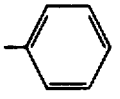 | H | O | CH₃ | CH₃ | 6-CH₃ | 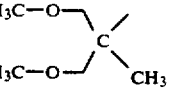 |
| 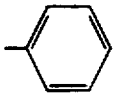 | H | O | CH₃ | CH₃ | 6-CH₃ |  |
| 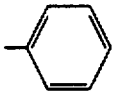 | H | O | CH₃ | CH₃ | 6-CH₃ | H₃C—S—CH₂— |

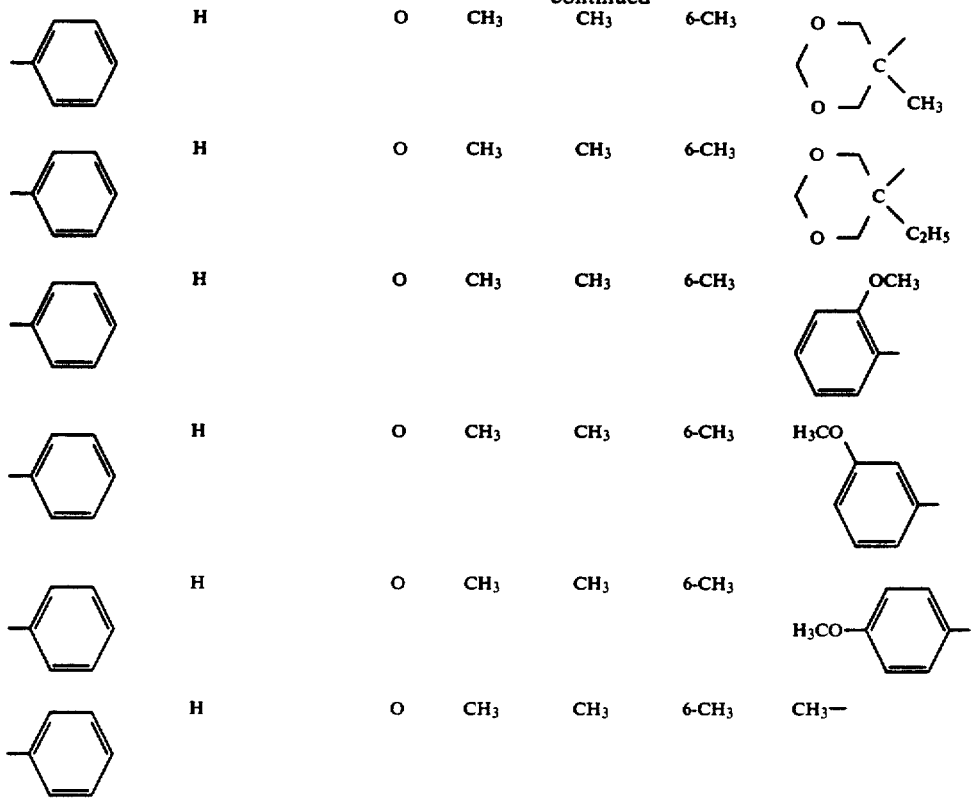

The following 3-aryl-4-hydroxy-Δ³-dihydrofurane derivatives of the formula (Ic) may be mentioned individually in addition to the compounds mentioned in the Preparation Examples:

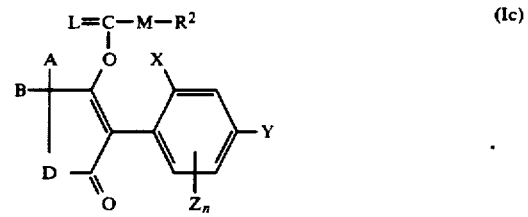

(Ic)

| TABLE 3 | | | | | | | | |
|---|---|---|---|---|---|---|---|---|
| A | B | D | X | Y | $Z_n$ | L | M | $R^2$ |
| —CH₃ | —CH₃ | O | —CH₃ | —CH₃ | 6-CH₃ | O | O | —CH₃ |
| —C₂H₅ | —CH₃ | O | —CH₃ | —CH₃ | 6-CH₃ | O | O | —CH₃ |
| —CH(CH₃)₂ | —CH₃ | O | —CH₃ | —CH₃ | 6-CH₃ | O | O | —CH₃ |
| —CF₃ | —CH₃ | O | —CH₃ | —CH₃ | 6-CH₃ | O | O | —CH₃ |
| —(CH₂)₄— | | O | —CH₃ | —CH₃ | 6-CH₃ | O | O | —CH₃ |
| —(CH₂)₅— | | O | —CH₃ | —CH₃ | 6-CH₃ | O | O | —CH₃ |
| —(CH₂)₆— | | O | —CH₃ | —CH₃ | 6-CH₃ | O | O | —CH₃ |
| —CH₂—CH(CH₃)—(CH₂)₃— | | O | —CH₃ | —CH₃ | 6-CH₃ | O | O | —CH₃ |
| —(CH₂)₂—CH(CH₃)—(CH₂)₂— | | O | —CH₃ | —CH₃ | 6-CH₃ | O | O | —CH₃ |
| —(CH₂)₂—CH(C₂H₅)—(CH₂)₂— | | O | —CH₃ | —CH₃ | 6-CH₃ | O | O | —CH₃ |
| —(CH₂)₂—CH(i-C₃H₇)—(CH₂)₂— | | O | —CH₃ | —CH₃ | 6-CH₃ | O | O | —CH₃ |
| —CH₃ | —CH₃ | O | —CH₃ | —CH₃ | 6-CH₃ | O | O | —C₂H₅ |
| —C₂H₅ | —CH₃ | O | —CH₃ | —CH₃ | 6-CH₃ | O | O | —C₂H₅ |
| —CH(CH₃)₂ | —CH₃ | O | —CH₃ | —CH₃ | 6-CH₃ | O | O | —C₂H₅ |
| —CF₃ | —CH₃ | O | —CH₃ | —CH₃ | 6-CH₃ | O | O | —C₂H₅ |
| —(CH₂)₄— | | O | —CH₃ | —CH₃ | 6-CH₃ | O | O | —C₂H₅ |
| —(CH₂)₅— | | O | —CH₃ | —CH₃ | 6-CH₃ | O | O | —C₂H₅ |

-continued

| | | | | | | | |
|---|---|---|---|---|---|---|---|
| | —(CH₂)₆— | O | —CH₃ | —CH₃ | 6-CH₃ | O | O | —C₂H₅ |
| | —CH₂—CH(CH₃)—(CH₂)₃— | O | —CH₃ | —CH₃ | 6-CH₃ | O | O | —C₂H₅ |
| | —(CH₂)₂—CH(CH₃)—(CH₂)₂— | O | —CH₃ | —CH₃ | 6-CH₃ | O | O | —C₂H₅ |
| | —(CH₂)₂—CH(C₂H₅)—(CH₂)₂— | O | —CH₃ | —CH₃ | 6-CH₃ | O | O | —C₂H₅ |
| | —(CH₂)₂—CH(i-C₃H₇)—(CH₂)₂— | O | —CH₃ | —CH₃ | 6-CH₃ | O | O | —C₂H₅ |
| —CH₃ | —CH₃ | O | —CH₃ | —CH₃ | 6-CH₃ | O | O | —CH(CH₃)₂ |
| —C₂H₅ | —CH₃ | O | —CH₃ | —CH₃ | 6-CH₃ | O | O | —CH(CH₃)₂ |
| —CH(CH₃)₂ | —CH₃ | O | —CH₃ | —CH₃ | 6-CH₃ | O | O | —CH(CH₃)₂ |
| —CF₃ | —CH₃ | O | —CH₃ | —CH₃ | 6-CH₃ | O | O | —CH(CH₃)₂ |
| | —(CH₂)₄— | O | —CH₃ | —CH₃ | 6-CH₃ | O | O | —CH(CH₃)₂ |
| | —(CH₂)₅— | O | —CH₃ | —CH₃ | 6-CH₃ | O | O | —CH(CH₃)₂ |
| | —(CH₂)₆— | O | —CH₃ | —CH₃ | 6-CH₃ | O | O | —CH(CH₃)₂ |
| | —CH₂—CH(CH₃)—(CH₂)₃— | O | —CH₃ | —CH₃ | 6-CH₃ | O | O | —CH(CH₃)₂ |
| | —(CH₂)₂—CH(CH₃)—(CH₂)₂— | O | —CH₃ | —CH₃ | 6-CH₃ | O | O | —CH(CH₃)₂ |
| | —(CH₂)₂—CH(C₂H₅)—(CH₂)₂— | O | —CH₃ | —CH₃ | 6-CH₃ | O | O | —CH(CH₃)₂ |
| | —(CH₂)₂—CH(i-C₃H₇)—(CH₂)₂— | O | —CH₃ | —CH₃ | 6-CH₃ | O | O | —CH(CH₃)₂ |
| —CH₃ | —CH₃ | O | —CH₃ | —CH₃ | 6-CH₃ | O | O | —OCH₂—CH(CH₃)₂ |
| —C₂H₅ | —CH₃ | O | —CH₃ | —CH₃ | 6-CH₃ | O | O | —OCH₂—CH(CH₃)₂ |
| —CH(CH₃)₂ | —CH₃ | O | —CH₃ | —CH₃ | 6-CH₃ | O | O | —OCH₂—CH(CH₃)₂ |
| —CF₃ | —CH₃ | O | —CH₃ | —CH₃ | 6-CH₃ | O | O | —OCH₂—CH(CH₃)₂ |
| | —(CH₂)₄— | O | —CH₃ | —CH₃ | 6-CH₃ | O | O | —OCH₂—CH(CH₃)₂ |
| | —(CH₂)₅— | O | —CH₃ | —CH₃ | 6-CH₃ | O | O | —OCH₂—CH(CH₃)₂ |
| | —(CH₂)₆— | O | —CH₃ | —CH₃ | 6-CH₃ | O | O | —OCH₂—CH(CH₃)₂ |
| | —CH₂—CH(CH₃)—(CH₂)₃— | O | —CH₃ | —CH₃ | 6-CH₃ | O | O | —OCH₂—CH(CH₃)₂ |
| | —(CH₂)₂—CH(CH₃)—(CH₂)₂— | O | —CH₃ | —CH₃ | 6-CH₃ | O | O | —OCH₂—CH(CH₃)₂ |
| | —(CH₂)₂—CH(C₂H₅)—(CH₂)₂— | O | —CH₃ | —CH₃ | 6-CH₃ | O | O | —OCH₂—CH(CH₃)₂ |
| | —(CH₂)₂—CH(i-C₃H₇)—(CH₂)₂— | O | —CH₃ | —CH₃ | 6-CH₃ | O | O | —OCH₂—CH(CH₃)₂ |
| —CH₃ | —CH₃ | O | —CH₃ | —CH₃ | 6-CH₃ | O | O | —CH(CH₃)—C₂H₅ |
| —C₂H₅ | —CH₃ | O | —CH₃ | —CH₃ | 6-CH₃ | O | O | —CH(CH₃)—C₂H₅ |
| —CH(CH₃)₂ | —CH₃ | O | —CH₃ | —CH₃ | 6-CH₃ | O | O | —CH(CH₃)—C₂H₅ |
| —CF₃ | —CH₃ | O | —CH₃ | —CH₃ | 6-CH₃ | O | O | —CH(CH₃)—C₂H₅ |
| | —(CH₂)₄— | O | —CH₃ | —CH₃ | 6-CH₃ | O | O | —CH(CH₃)—C₂H₅ |
| | —(CH₂)₅— | O | —CH₃ | —CH₃ | 6-CH₃ | O | O | —CH(CH₃)—C₂H₅ |
| | —(CH₂)₆— | O | —CH₃ | —CH₃ | 6-CH₃ | O | O | —CH(CH₃)—C₂H₅ |
| | —CH₂—CH(CH₃)—(CH₂)₃— | O | —CH₃ | —CH₃ | 6-CH₃ | O | O | —CH(CH₃)—C₂H₅ |
| | —(CH₂)₂—CH(CH₃)—(CH₂)₂— | O | —CH₃ | —CH₃ | 6-CH₃ | O | O | —CH(CH₃)—C₂H₅ |
| | —(CH₂)₂—CH(C₂H₅)—(CH₂)₂— | O | —CH₃ | —CH₃ | 6-CH₃ | O | O | —CH(CH₃)—C₂H₅ |
| | —(CH₂)₂—CH(i-C₃H₇)—(CH₂)₂— | O | —CH₃ | —CH₃ | 6-CH₃ | O | O | —CH(CH₃)—C₂H₅ |
| —CH₃ | —CH₃ | O | —CH₃ | —CH₃ | 6-CH₃ | O | O | —CH₂—C(CH₃)₃ |
| —C₂H₅ | —CH₃ | O | —CH₃ | —CH₃ | 6-CH₃ | O | O | —CH₂—C(CH₃)₃ |
| —CH(CH₃)₂ | —CH₃ | O | —CH₃ | —CH₃ | 6-CH₃ | O | O | —CH₂—C(CH₃)₃ |
| —CF₃ | —CH₃ | O | —CH₃ | —CH₃ | 6-CH₃ | O | O | —CH₂—C(CH₃)₃ |
| | —(CH₂)₄— | O | —CH₃ | —CH₃ | 6-CH₃ | O | O | —CH₂—C(CH₃)₃ |
| | —(CH₂)₅— | O | —CH₃ | —CH₃ | 6-CH₃ | O | O | —CH₂—C(CH₃)₃ |
| | —(CH₂)₆— | O | —CH₃ | —CH₃ | 6-CH₃ | O | O | —CH₂—C(CH₃)₃ |
| | —CH₂—CH(CH₃)—(CH₂)₃— | O | —CH₃ | —CH₃ | 6-CH₃ | O | O | —CH₂—C(CH₃)₃ |
| | —(CH₂)₂—CH(CH₃)—(CH₂)₂— | O | —CH₃ | —CH₃ | 6-CH₃ | O | O | —CH₂—C(CH₃)₃ |
| | —(CH₂)₂—CH(C₂H₅)—(CH₂)₂— | O | —CH₃ | —CH₃ | 6-CH₃ | O | O | —CH₂—C(CH₃)₃ |

-continued

| | | | | | | | | |
|---|---|---|---|---|---|---|---|---|
| —(CH₂)₂—CH(i-C₃H₇)—(CH₂)₂— | | O | —CH₃ | —CH₃ | 6-CH₃ | O | O | —CH₂—C(CH₃)₃ |
| —CH₃ | —CH₃ | O | —CH₃ | —CH₃ | 6-CH₃ | O | O | —CH₂—C₆H₁₁ |
| —C₂H₅ | —CH₃ | O | —CH₃ | —CH₃ | 6-CH₃ | O | O | —CH₂—C₆H₁₁ |
| —CH(CH₃)₂ | —CH₃ | O | —CH₃ | —CH₃ | 6-CH₃ | O | O | —CH₂—C₆H₁₁ |
| —CF₃ | —CH₃ | O | —CH₃ | —CH₃ | 6-CH₃ | O | O | —CH₂—C₆H₁₁ |
| | —(CH₂)₄— | O | —CH₃ | —CH₃ | 6-CH₃ | O | O | —CH₂—C₆H₁₁ |
| | —(CH₂)₅— | O | —CH₃ | —CH₃ | 6-CH₃ | O | O | —CH₂—C₆H₁₁ |
| | —(CH₂)₆— | O | —CH₃ | —CH₃ | 6-CH₃ | O | O | —CH₂—C₆H₁₁ |
| | —CH₂—CH(CH₃)—(CH₂)₃— | O | —CH₃ | —CH₃ | 6-CH₃ | O | O | —CH₂—C₆H₁₁ |
| | —(CH₂)₂—CH(CH₃)—(CH₂)₂— | O | —CH₃ | —CH₃ | 6-CH₃ | O | O | —CH₂—C₆H₁₁ |
| | —(CH₂)₂—CH(C₂H₅)—(CH₂)₂— | O | —CH₃ | —CH₃ | 6-CH₃ | O | O | —CH₂—C₆H₁₀H |
| | —(CH₂)₂—CH(i-C₃H₇)—(CH₂)₂— | O | —CH₃ | —CH₃ | 6-CH₃ | O | O | —CH₂—C₆H₁₀H |
| —CH₃ | —CH₃ | O | —CH₃ | —CH₃ | 6-CH₃ | O | O | —CH₂—CH(C₄H₉)(C₂H₅) |
| —C₂H₅ | —CH₃ | O | —CH₃ | —CH₃ | 6-CH₃ | O | O | —CH₂—CH(C₄H₉)(C₂H₅) |

-continued

| | | | | | | | | |
|---|---|---|---|---|---|---|---|---|
| —CH(CH₃)₂ | —CH₃ | O | —CH₃ | —CH₃ | 6-CH₃ | O | O | —CH₂—CH(C₄H₉)(C₂H₅) |
| —CF₃ | —CH₃ | O | —CH₃ | —CH₃ | 6-CH₃ | O | O | —CH₂—CH(C₄H₉)(C₂H₅) |
| | —(CH₂)₄— | O | —CH₃ | —CH₃ | 6-CH₃ | O | O | —CH₂—CH(C₄H₉)(C₂H₅) |
| | —(CH₂)₅— | O | —CH₃ | —CH₃ | 6-CH₃ | O | O | —CH₂—CH(C₄H₉)(C₂H₅) |
| | —(CH₂)₆— | O | —CH₃ | —CH₃ | 6-CH₃ | O | O | —CH₂—CH(C₄H₉)(C₂H₅) |
| | —CH₂—CH(CH₃)—(CH₂)₃— | O | —CH₃ | —CH₃ | 6-CH₃ | O | O | —CH₂—CH(C₄H₉)(C₂H₅) |
| | —(CH₂)₂—CH(CH₃)—(CH₂)₂— | O | —CH₃ | —CH₃ | 6-CH₃ | O | O | —CH₂—CH(C₄H₉)(C₂H₅) |
| | —(CH₂)₂—CH(C₂H₅)—(CH₂)₂— | O | —CH₃ | —CH₃ | 6-CH₃ | O | O | —CH₂—CH(C₄H₉)(C₂H₅) |
| | —(CH₂)₂—CH(i-C₃H₇)—(CH₂)₂— | O | —CH₃ | —CH₃ | 6-CH₃ | O | O | —CH₂—CH(C₄H₉)(C₂H₅) |
| —CH₃ | —CH₃ | O | —CH₃ | —CH₃ | 6-CH₃ | O | O | —C₆H₅ |
| —C₂H₅ | —CH₃ | O | —CH₃ | —CH₃ | 6-CH₃ | O | O | —C₆H₅ |
| —CH(CH₃)₂ | —CH₃ | O | —CH₃ | —CH₃ | 6-CH₃ | O | O | —C₆H₅ |
| —CF₃ | —CH₃ | O | —CH₃ | —CH₃ | 6-CH₃ | O | O | —C₆H₅ |
| | —(CH₂)₄— | O | —CH₃ | —CH₃ | 6-CH₃ | O | O | —C₆H₅ |

-continued

| | | | | | | | | |
|---|---|---|---|---|---|---|---|---|
| | —(CH₂)₅— | O | —CH₃ | —CH₃ | 6-CH₃ | O | O | 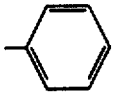 |
| | —(CH₂)₆— | O | —CH₃ | —CH₃ | 6-CH₃ | O | O | 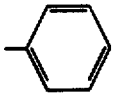 |
| | —CH₂—CH(CH₃)—(CH₂)₃— | O | —CH₃ | —CH₃ | 6-CH₃ | O | O | 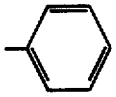 |
| | —(CH₂)₂—CH(CH₃)—(CH₂)₂— | O | —CH₃ | —CH₃ | 6-CH₃ | O | O | 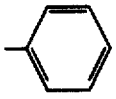 |
| | —(CH₂)₂—CH—(CH₂)₂—<br>             C₂H₅ | O | —CH₃ | —CH₃ | 6-CH₃ | O | O | 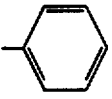 |
| | —(CH₂)₂—CH—(CH₂)₂—<br>             i-C₃H₇ | O | —CH₃ | —CH₃ | 6-CH₃ | O | O | 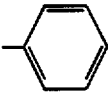 |
| —CH₃ | —CH₃ | O | —CH₃ | —CH₃ | 6-CH₃ | O | S | —C₂H₅ |
| —C₂H₅ | —CH₃ | O | —CH₃ | —CH₃ | 6-CH₃ | O | S | —C₂H₅ |
| —CH(CH₃)₂ | —CH₃ | O | —CH₃ | —CH₃ | 6-CH₃ | O | S | —C₂H₅ |
| —CF₃ | —CH₃ | O | —CH₃ | —CH₃ | 6-CH₃ | O | S | —C₂H₅ |
| | —(CH₂)₄— | O | —CH₃ | —CH₃ | 6-CH₃ | O | S | —C₂H₅ |
| | —(CH₂)₅— | O | —CH₃ | —CH₃ | 6-CH₃ | O | S | —C₂H₅ |
| | —(CH₂)₆— | O | —CH₃ | —CH₃ | 6-CH₃ | O | S | —C₂H₅ |
| | —CH₂—CH(CH₃)—(CH₂)₃— | O | —CH₃ | —CH₃ | 6-CH₃ | O | S | —C₂H₅ |
| | —(CH₂)₂—CH(CH₃)—(CH₂)₂— | O | —CH₃ | —CH₃ | 6-CH₃ | O | S | —C₂H₅ |
| | —(CH₂)₂—CH—(CH₂)₂—<br>             C₂H₅ | O | —CH₃ | —CH₃ | 6-CH₃ | O | S | —C₂H₅ |
| | —(CH₂)₂—CH—(CH₂)₂—<br>             i-C₃H₇ | O | —CH₃ | —CH₃ | 6-CH₃ | O | S | —C₂H₅ |
| —CH₃ | —CH₃ | O | —CH₃ | —CH₃ | 6-CH₃ | O | S | —CH(CH₃)₂ |
| —C₂H₅ | —CH₃ | O | —CH₃ | —CH₃ | 6-CH₃ | O | S | —CH(CH₃)₂ |
| —CH(CH₃)₂ | —CH₃ | O | —CH₃ | —CH₃ | 6-CH₃ | O | S | —CH(CH₃)₂ |
| —CF₃ | —CH₃ | O | —CH₃ | —CH₃ | 6-CH₃ | O | S | —CH(CH₃)₂ |
| | —(CH₂)₄— | O | —CH₃ | —CH₃ | 6-CH₃ | O | S | —CH(CH₃)₂ |
| | —(CH₂)₅— | O | —CH₃ | —CH₃ | 6-CH₃ | O | S | —CH(CH₃)₂ |
| | —(CH₂)₆— | O | —CH₃ | —CH₃ | 6-CH₃ | O | S | —CH(CH₃)₂ |
| | —CH₂—CH(CH₃)—(CH₂)₃— | O | —CH₃ | —CH₃ | 6-CH₃ | O | S | —CH(CH₃)₂ |
| | —(CH₂)₂—CH(CH₃)—(CH₂)₂— | O | —CH₃ | —CH₃ | 6-CH₃ | O | S | —CH(CH₃)₂ |
| | —(CH₂)₂—CH—(CH₂)₂—<br>             C₂H₅ | O | —CH₃ | —CH₃ | 6-CH₃ | O | S | —CH(CH₃)₂ |
| | —(CH₂)₂—CH—(CH₂)₂—<br>             i-C₃H₇ | O | —CH₃ | —CH₃ | 6-CH₃ | O | S | —CH(CH₃)₂ |
| —CH₃ | —CH₃ | O | —CH₃ | —CH₃ | 6-CH₃ | O | S | —CH₂—CH(CH₃)₂ |
| —C₂H₅ | —CH₃ | O | —CH₃ | —CH₃ | 6-CH₃ | O | S | —CH₂—CH(CH₃)₂ |
| —CH(CH₃)₂ | —CH₃ | O | —CH₃ | —CH₃ | 6-CH₃ | O | S | —CH₂—CH(CH₃)₂ |
| —CF₃ | —CH₃ | O | —CH₃ | —CH₃ | 6-CH₃ | O | S | —CH₂—CH(CH₃)₂ |
| | —(CH₂)₄— | O | —CH₃ | —CH₃ | 6-CH₃ | O | S | —CH₂—CH(CH₃)₂ |
| | —(CH₂)₅— | O | —CH₃ | —CH₃ | 6-CH₃ | O | S | —CH₂—CH(CH₃)₂ |
| | —(CH₂)₆— | O | —CH₃ | —CH₃ | 6-CH₃ | O | S | —CH₂—CH(CH₃)₂ |
| | —CH₂—CH(CH₃)—(CH₂)₃— | O | —CH₃ | —CH₃ | 6-CH₃ | O | S | —CH₂—CH(CH₃)₂ |
| | —(CH₂)₂—CH(CH₃)—(CH₂)₂— | O | —CH₃ | —CH₃ | 6-CH₃ | O | S | —CH₂—CH(CH₃)₂ |

-continued

| | | | | | | | | |
|---|---|---|---|---|---|---|---|---|
| −(CH₂)₂−CH−(CH₂)₂−<br>    \|<br>    C₂H₅ | | O | −CH₃ | −CH₃ | 6-CH₃ | O | S | −CH₂−CH(CH₃)₂ |
| −(CH₂)₂−CH−(CH₂)₂−<br>    \|<br>    i-C₃H₇ | | O | −CH₃ | −CH₃ | 6-CH₃ | O | S | −CH₂−CH(CH₃)₂ |
| −CH₃ | −CH₃ | O | −CH₃ | −CH₃ | 6-CH₃ | O | S | −CH₂−C(CH₃)₃ |
| −C₂H₅ | −CH₃ | O | −CH₃ | −CH₃ | 6-CH₃ | O | S | −CH₂−C(CH₃)₃ |
| −CH(CH₃)₂ | −CH₃ | O | −CH₃ | −CH₃ | 6-CH₃ | O | S | −CH₂−C(CH₃)₃ |
| −CF₃ | −CH₃ | O | −CH₃ | −CH₃ | 6-CH₃ | O | S | −CH₂−C(CH₃)₃ |
| −(CH₂)₄− | | O | −CH₃ | −CH₃ | 6-CH₃ | O | S | −CH₂−C(CH₃)₃ |
| −(CH₂)₅− | | O | −CH₃ | −CH₃ | 6-CH₃ | O | S | −CH₂−C(CH₃)₃ |
| −(CH₂)₆− | | O | −CH₃ | −CH₃ | 6-CH₃ | O | S | −CH₂−C(CH₃)₃ |
| −CH₂−CH(CH₃)−(CH₂)₃− | | O | −CH₃ | −CH₃ | 6-CH₃ | O | S | −CH₂−C(CH₃)₃ |
| −(CH₂)₂−CH(CH₃)−(CH₂)₂− | | O | −CH₃ | −CH₃ | 6-CH₃ | O | S | −CH₂−C(CH₃)₃ |
| −(CH₂)₂−CH−(CH₂)₂−<br>    \|<br>    C₂H₅ | | O | −CH₃ | −CH₃ | 6-CH₃ | O | S | −CH₂−C(CH₃)₃ |
| −(CH₂)₂−CH−(CH₂)₂−<br>    \|<br>    i-C₃H₇ | | O | −CH₃ | −CH₃ | 6-CH₃ | O | S | −CH₂−C(CH₃)₃ |
| −CH₃ | −CH₃ | O | −CH₃ | −CH₃ | 6-CH₃ | O | S | −CH(CH₃)−C₂H₅ |
| −C₂H₅ | −CH₃ | O | −CH₃ | −CH₃ | 6-CH₃ | O | S | −CH(CH₃)−C₂H₅ |
| −CH(CH₃)₂ | −CH₃ | O | −CH₃ | −CH₃ | 6-CH₃ | O | S | −CH(CH₃)−C₂H₅ |
| −CF₃ | −CH₃ | O | −CH₃ | −CH₃ | 6-CH₃ | O | S | −CH(CH₃)−C₂H₅ |
| −(CH₂)₄− | | O | −CH₃ | −CH₃ | 6-CH₃ | O | S | −CH(CH₃)−C₂H₅ |
| −(CH₂)₅− | | O | −CH₃ | −CH₃ | 6-CH₃ | O | S | −CH(CH₃)−C₂H₅ |
| −(CH₂)₆− | | O | −CH₃ | −CH₃ | 6-CH₃ | O | S | −CH(CH₃)−C₂H₅ |
| −CH₂−CH(CH₃)−(CH₂)₃− | | O | −CH₃ | −CH₃ | 6-CH₃ | O | S | −CH(CH₃)−C₂H₅ |
| −(CH₂)₂−CH(CH₃)−(CH₂)₂− | | O | −CH₃ | −CH₃ | 6-CH₃ | O | S | −CH(CH₃)−C₂H₅ |
| −(CH₂)₂−CH−(CH₂)₂−<br>    \|<br>    C₂H₅ | | O | −CH₃ | −CH₃ | 6-CH₃ | O | S | −CH(CH₃)−C₂H₅ |
| −(CH₂)₂−CH−(CH₂)₂−<br>    \|<br>    i-C₃H₇ | | O | −CH₃ | −CH₃ | 6-CH₃ | O | S | −CH(CH₃)−C₂H₅ |
| CH₃ | H | O | CH₃ | CH₃ | 6-CH₃ | O | O | CH₃− |
| CH₃ | H | O | CH₃ | CH₃ | 6-CH₃ | O | O | (CH₃)₂CH−CH₂− |
| CH₃ | H | O | CH₃ | CH₃ | 6-CH₃ | O | O | C₂H₅−CH−<br>    \|<br>    CH₃ |
| CH₃ | H | O | CH₃ | CH₃ | 6-CH₃ | O | O | (CH₃)₃C− |
| CH₃ | H | O | CH₃ | CH₃ | 6-CH₃ | O | O | (CH₃)₃C−CH₂− |
| CH₃ | H | O | CH₃ | CH₃ | 6-CH₃ | O | O | 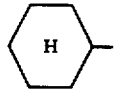 |
| CH₃ | H | O | CH₃ | CH₃ | 6-CH₃ | O | O | 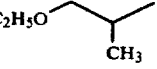 |
| CH₃ | H | O | Cl | Cl | H | O | O | C₂H₅−CH−<br>    \|<br>    CH₃ |
| CH₃ | H | O | Cl | H | 6-Cl | O | O | C₂H₅−CH−<br>    \|<br>    CH₃ |
| CH₃ | H | O | CH₃ | CH₃ | H | O | O | C₂H₅−CH−<br>    \|<br>    CH₃ |
| CH₃ | H | O | CH₃ | H | 6-CH₃ | O | O | C₂H₅−CH−<br>    \|<br>    CH₃ |

-continued

| | | | | | | | | |
|---|---|---|---|---|---|---|---|---|
| $CH_3$ | H | O | $CH_3$ | $CH_3$ | 6-$CH_3$ | O | O | $C_2H_5O\text{-}CH_2\text{-}CH(C_2H_5)\text{-}CH_3$ |
| $CH_3$ | H | O | $CH_3$ | $CH_3$ | 6-$CH_3$ | O | O | $C_6H_5\text{-}$ |
| $CH_3$ | H | O | $CH_3$ | $CH_3$ | 6-$CH_3$ | O | S | $CH_3-$ |
| $CH_3$ | H | O | $CH_3$ | $CH_3$ | 6-$CH_3$ | O | S | $(CH_3)_2CH-$ |
| $CH_3$ | H | O | $CH_3$ | $CH_3$ | 6-$CH_3$ | O | S | $(CH_2)_2\text{-}CH\text{-}CH_2$ |
| $CH_3$ | H | O | $CH_3$ | $CH_3$ | 6-$CH_3$ | O | S | $C_2H_5\text{-}CH(CH_3)\text{-}$ |
| $CH_3$ | H | S | Cl | Cl | H | O | O | $C_2H_5\text{-}CH(CH_3)\text{-}$ |
| $CH_3$ | H | S | Cl | H | 6-Cl | O | O | $C_2H_5\text{-}CH(CH_3)\text{-}$ |
| $CH_3$ | H | S | $CH_3$ | $CH_3$ | H | O | O | $C_2H_5\text{-}CH(CH_3)\text{-}$ |
| $CH_3$ | H | S | $CH_3$ | H | 6-$CH_3$ | O | O | $C_2H_5\text{-}CH(CH_3)\text{-}$ |
| $CH_3$ | H | S | $CH_3$ | $CH_3$ | 6-$CH_3$ | O | O | $CH_3-$ |
| $CH_3$ | H | S | $CH_3$ | $CH_3$ | 6-$CH_3$ | O | O | $(CH_3)_2CH-$ |
| $CH_3$ | H | S | $CH_3$ | $CH_3$ | 6-$CH_3$ | O | O | $(CH_3)_2CH\text{-}CH_2-$ |
| $CH_3$ | H | S | $CH_3$ | $CH_3$ | 6-$CH_3$ | O | O | $C_2H_5\text{-}CH(CH_3)\text{-}$ |
| $CH_3$ | H | S | $CH_3$ | $CH_3$ | 6-$CH_3$ | O | O | $(CH_3)_3C-$ |
| $CH_3$ | H | S | $CH_3$ | $CH_3$ | 6-$CH_3$ | O | O | $(CH_3)_3CH\text{-}CH_2-$ |
| $CH_3$ | H | S | $CH_3$ | $CH_3$ | 6-$CH_3$ | O | O | cyclohexyl |
| $CH_3$ | H | S | $CH_3$ | $CH_3$ | 6-$CH_3$ | O | O | $C_2H_5O\text{-}CH_2\text{-}CH(CH_3)\text{-}$ |
| $CH_3$ | H | S | $CH_3$ | $CH_3$ | 6-$CH_3$ | O | O | $C_2H_5O\text{-}CH_2\text{-}CH(C_2H_5)\text{-}$ |
| $CH_3$ | H | S | $CH_3$ | $CH_3$ | 6-$CH_3$ | O | O | $C_6H_5\text{-}$ |
| $CH_3$ | H | S | $CH_3$ | $CH_3$ | 6-$CH_3$ | O | S | $CH_3-$ |
| $CH_3$ | H | S | $CH_3$ | $CH_3$ | 6-$CH_3$ | O | S | $(CH_3)_2CH-$ |
| $CH_3$ | H | S | $CH_3$ | $CH_3$ | 6-$CH_3$ | O | S | $(CH_3)_2CH\text{-}CH_2-$ |
| $CH_3$ | H | S | $CH_3$ | $CH_3$ | 6-$CH_3$ | O | S | $C_2H_5\text{-}CH(CH_3)\text{-}$ |
| $CH_3$ | $CH_3$ | O | Cl | Cl | H | O | O | $C_2H_5\text{-}CH(CH_3)\text{-}$ |

-continued

| | | | | | | | | |
|---|---|---|---|---|---|---|---|---|
| CH₃ | CH₃ | O | Cl | H | 6-Cl | O | O | C₂H₅—CH—<br>         \|<br>         CH₃ |
| CH₃ | CH₃ | O | CH₃ | CH₃ | H | O | O | C₂H₅—CH—<br>         \|<br>         CH₃ |
| CH₃ | CH₃ | O | CH₃ | H | 6-CH₃ | O | O | C₂H₅—CH—<br>         \|<br>         CH₃ |
| CH₃ | CH₃ | O | CH₃ | CH₃ | 6-CH₃ | O | O | CH₃— |
| CH₃ | CH₃ | O | CH₃ | CH₃ | 6-CH₃ | O | O | (CH₃)₂CH— |
| CH₃ | CH₃ | O | CH₃ | CH₃ | 6-CH₃ | O | O | (CH₃)₂CH—CH₂— |
| CH₃ | CH₃ | O | CH₃ | CH₃ | 6-CH₃ | O | O | C₂H₅—CH—<br>         \|<br>         CH₃ |
| CH₃ | CH₃ | O | CH₃ | CH₃ | 6-CH₃ | O | O | (CH₃)₃C— |
| CH₃ | CH₃ | O | CH₃ | CH₃ | 6-CH₃ | O | O | (CH₃)₃C—CH₂— |
| CH₃ | CH₃ | O | CH₃ | CH₃ | 6-CH₃ | O | O | 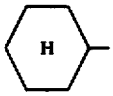 |
| CH₃ | CH₃ | O | CH₃ | CH₃ | 6-CH₃ | O | O | C₂H₅O—CH₂—CH—<br>                    \|<br>                    CH₃ |
| CH₃ | CH₃ | O | CH₃ | CH₃ | 6-CH₃ | O | O | C₂H₅O—CH₂—CH—<br>                    \|<br>                    C₂H₅ |
| CH₃ | CH₃ | O | CH₃ | CH₃ | 6-CH₃ | O | O | 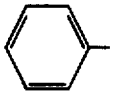 |
| CH₃ | CH₃ | O | CH₃ | CH₃ | 6-CH₃ | O | S | CH₃— |
| CH₃ | CH₃ | O | CH₃ | CH₃ | 6-CH₃ | O | S | (CH₃)₂CH— |
| CH₃ | CH₃ | O | CH₃ | CH₃ | 6-CH₃ | O | S | (CH₂)₂—CH—CH₂ |
| CH₃ | CH₃ | O | CH₃ | CH₃ | 6-CH₃ | O | S | C₂H₅—CH—<br>         \|<br>         CH₃ |
| —(CH₂)₅— | | O | Cl | Cl | H | O | O | C₂H₅—CH—<br>         \|<br>         CH₃ |
| —(CH₂)₅— | | O | Cl | H | 6-Cl | O | O | C₂H₅—CH—<br>         \|<br>         CH₃ |
| —(CH₂)₅— | | O | CH₃ | CH₃ | H | O | O | C₂H₅—CH—<br>         \|<br>         CH₃ |
| —(CH₂)₅— | | O | CH₃ | H | 6-CH₃ | O | O | C₂H₅—CH—<br>         \|<br>         CH₃ |
| —(CH₂)₅— | | O | CH₃ | CH₃ | 6-CH₃ | O | O | CH₃— |
| —(CH₂)₅— | | O | CH₃ | CH₃ | 6-CH₃ | O | O | (CH₃)₂CH— |
| —(CH₂)₅— | | O | CH₃ | CH₃ | 6-CH₃ | O | O | (CH₃)₂CH—CH₂— |
| —(CH₂)₅— | | O | CH₃ | CH₃ | 6-CH₃ | O | O | C₂H₅—CH—<br>         \|<br>         CH₃ |
| —(CH₂)₅— | | O | CH₃ | CH₃ | 6-CH₃ | O | O | (CH₃)₃C— |
| —(CH₂)₅— | | O | CH₃ | CH₃ | 6-CH₃ | O | O | (CH₃)₃C—CH₂ |

-continued

| | | | | | | | |
|---|---|---|---|---|---|---|---|
| —(CH$_2$)$_5$— | O | CH$_3$ | CH$_3$ | 6-CH$_3$ | O | O | 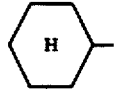 |
| —(CH$_2$)$_5$— | O | CH$_3$ | CH$_3$ | 6-CH$_3$ | O | O | 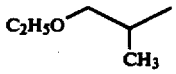 |
| —(CH$_2$)$_5$— | O | CH$_3$ | CH$_3$ | 6-CH$_3$ | O | O | 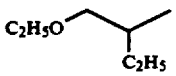 |
| —(CH$_2$)$_5$— | O | CH$_3$ | CH$_3$ | 6-CH$_3$ | O | O | 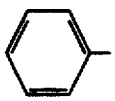 |
| —(CH$_2$)$_5$— | O | CH$_3$ | CH$_3$ | 6-CH$_3$ | O | S | CH$_3$— |
| —(CH$_2$)$_5$— | O | CH$_3$ | CH$_3$ | 6-CH$_3$ | O | S | (CH$_3$)$_2$CH— |
| —(CH$_2$)$_5$— | O | CH$_3$ | CH$_3$ | 6-CH$_3$ | O | S | (CH$_3$)CH—CH$_2$— |
| —(CH$_2$)$_5$— | O | CH$_3$ | CH$_3$ | 6-CH$_3$ | O | S | C$_2$H$_5$—CH—<br>\|<br>CH$_3$ |
| 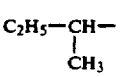 | H | O | Cl | Cl | H | O | O | C$_2$H$_5$—CH—<br>\|<br>CH$_3$ |
| 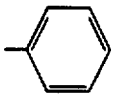 | H | O | Cl | H | 6-Cl | O | O | C$_2$H$_5$—CH—<br>\|<br>CH$_3$ |
| 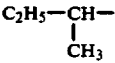 | H | O | CH$_3$ | CH$_3$ | H | O | O | C$_2$H$_5$—CH—<br>\|<br>CH$_3$ |
| 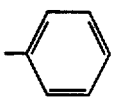 | H | O | CH$_3$ | H | 6-CH$_3$ | O | O | C$_2$H$_5$—CH—<br>\|<br>CH$_3$ |
| 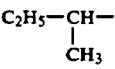 | H | O | CH$_3$ | CH$_3$ | 6-CH$_3$ | O | O | CH$_3$— |
| 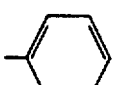 | H | O | CH$_3$ | CH$_3$ | 6-CH$_3$ | O | O | (CH$_3$)$_2$CH— |
| 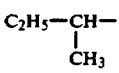 | H | O | CH$_3$ | CH$_3$ | 6-CH$_3$ | O | O | (CH$_3$)$_2$CH—CH$_2$ |
| 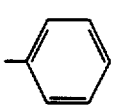 | H | O | CH$_3$ | CH$_3$ | 6-CH$_3$ | O | O | C$_2$H$_5$—CH—<br>\|<br>CH$_3$ |

-continued

| | | | | | | | |
|---|---|---|---|---|---|---|---|
| –C₆H₅ | H | O | CH₃ | CH₃ | 6-CH₃ | O | O | (CH₃)₃C— |
| –C₆H₅ | H | O | CH₃ | CH₃ | 6-CH₃ | O | O | (CH₃)₃C—CH₂— |
| –C₆H₅ | H | O | CH₃ | CH₃ | 6-CH₃ | O | O | cyclohexyl-H |
| –C₆H₅ | H | O | CH₃ | CH₃ | 6-CH₃ | O | O | C₂H₅O–CH₂–CH(CH₃)– |
| –C₆H₅ | H | O | CH₃ | CH₃ | 6-CH₃ | O | O | C₂H₅O–CH₂–CH(C₂H₅)– |
| –C₆H₅ | H | O | CH₃ | CH₃ | 6-CH₃ | O | O | –C₆H₅ |
| –C₆H₅ | H | O | CH₃ | CH₃ | 6-CH₃ | O | S | CH₃— |
| –C₆H₅ | H | O | CH₃ | CH₃ | 6-CH₃ | O | S | (CH₃)₂CH— |
| –C₆H₅ | H | O | CH₃ | CH₃ | 6-CH₃ | O | S | (CH₃)₂CH—CH₂ |
| –C₆H₅ | H | O | CH₃ | CH₃ | 6-CH₃ | O | S | C₂H₅—CH(CH₃)— |

The following 3-aryl-4-hydroxy-Δ³-dihydrofurane derivatives of the formula (Id) may be mentioned individually in addition to the compounds mentioned in the Preparation Examples:

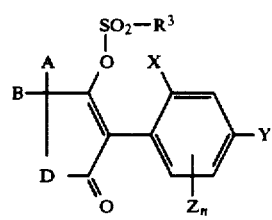

(Id)

TABLE 4

| A | B | D | X | Y | Zₙ | R³ |
|---|---|---|---|---|---|---|
| CH₃ | CH₃ | O | CH₃ | CH₃ | 6-CH₃ | –C₆H₅–C₂H₅ |

TABLE 4-continued

| A | B | D | X | Y | $Z_n$ | $R^3$ |
|---|---|---|---|---|---|---|
| $CH_3$ | $CH_3$ | O | $CH_3$ | $CH_3$ | 6-$CH_3$ | 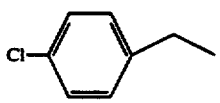 |
| $CH_3$ | $CH_3$ | O | $CH_3$ | $CH_3$ | 6-$CH_3$ |  |
| $CH_3$ | $CH_3$ | O | $CH_3$ | $CH_3$ | 6-$CH_3$ | 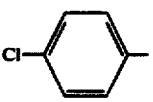 |

The following 3-aryl-4-hydroxy-$\Delta^3$-dihydrofurane derivatives of the formula (Ie) may be mentioned individually in addition to the compounds mentioned in the Preparation Examples:

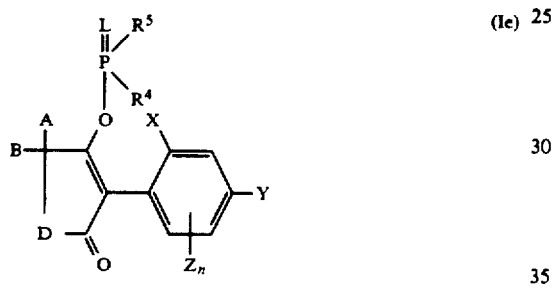
(Ie)

The following 3-aryl-4-hydroxy-$\Delta^3$-dihydrofurane derivatives of the formula (If) may be mentioned individually in addition to the compounds mentioned in the Preparations Examples:

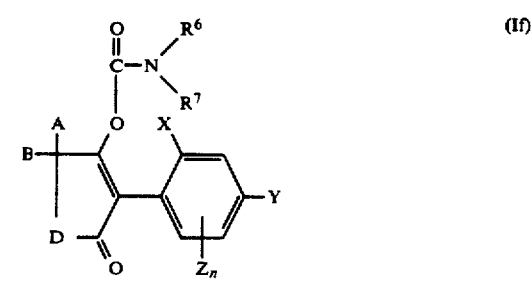
(If)

TABLE 5

| A | B | D | X | Y | $Z_n$ | L | $R^4$ | $R^5$ |
|---|---|---|---|---|---|---|---|---|
| $CH_3$ | $CH_3$ | O | $CH_3$ | $CH_3$ | 6-$CH_3$ | S | $CF_3CH_2O-$ | $CH_3$ |
| $CH_3$ | $CH_3$ | O | $CH_3$ | $CH_3$ | 6-$CH_3$ | O | $CH_3-O-$ | $C_2H_5-S-$ |
| $CH_3$ | $CH_3$ | O | $CH_3$ | $CH_3$ | 6-$CH_3$ | O | $CH_3-O-$ | $(CH_3)_2CH-S-$ |
| $CH_3$ | $CH_3$ | O | $CH_3$ | $CH_3$ | 6-$CH_3$ | O | $CH_3-O-$ | $\begin{array}{c}C_2H_5\\ \diagdown\\ CH-S-\\ \diagup\\ CH_3\end{array}$ |
| $CH_3$ | $CH_3$ | O | $CH_3$ | $CH_3$ | 6-$CH_3$ | O | $C_2H_5O-$ | $C_2H_5-S-$ |
| $CH_3$ | $CH_3$ | O | $CH_3$ | $CH_3$ | 6-$CH_3$ | O | $C_2H_5-O-$ | $(CH_3)_2CH-S-$ |
| $CH_3$ | $CH_3$ | O | $CH_3$ | $CH_3$ | 6-$CH_3$ | O | $C_2H_5-O-$ | $\begin{array}{c}C_2H_5\\ \diagdown\\ CH-S-\\ \diagup\\ CH_3\end{array}$ |

TABLE 6

| A | B | D | X | Y | $Z_n$ | L | $R^6$ | $R^7$ |
|---|---|---|---|---|---|---|---|---|
| $CH_3$ | $CH_3$ | O | $CH_3$ | $CH_3$ | 6-$CH_3$ | O | $CH_3-$ | $CH_3-$ |
| $CH_3$ | $CH_3$ | O | $CH_3$ | $CH_3$ | 6-$CH_3$ | S | $CH_3-$ | $CH_3-$ |
| $CH_3$ | $CH_3$ | O | $CH_3$ | $CH_3$ | 6-$CH_3$ | O | $CH_2=CHCH_2-$ | $CH_2=CH-CH_2-$ |
| $CH_3$ | $CH_3$ | O | $CH_3$ | $CH_3$ | 6-$CH_3$ | O | $-(CH_2)_2-O-(CH_2)_2-$ | |
| $CH_3$ | $CH_3$ | O | $CH_3$ | $CH_3$ | 6-$CH_3$ | S | $-(CH_2)_5-$ | |

TABLE 6-continued

| A | B | D | X | Y | $Z_n$ | L | $R^6$ | $R^7$ |
|---|---|---|---|---|---|---|---|---|
| $CH_3$ | $CH_3$ | O | $CH_3$ | $CH_3$ | 6-$CH_3$ | S | phenyl | $C_2H_5-$ |

The following 3-aryl-4-hydroxy-$\Delta^3$-dihydrofurane derivatives of the formula (Ig) may be mentioned individually in addition to the compounds mentioned in the Preparation Examples:

TABLE 7

(Ig) — structure with substituents A, B, D, X, Y, $Z_n$, $E^\oplus$

| A | B | D | X | Y | $Z_n$ | $E^\oplus$ |
|---|---|---|---|---|---|---|
| $CH_3$ | $CH_3$ | O | $CH_3$ | $CH_3$ | 6-$CH_3$ | $NH_4$ |
| $CH_3$ | $CH_3$ | O | $CH_3$ | $CH_3$ | 6-$CH_3$ | Na |
| $C_2H_5$ | $CH_3$ | O | $CH_3$ | $CH_3$ | 6-$CH_3$ | Na |
| $-CH(CH_3)_2$ | $CH_3$ | O | $CH_3$ | $CH_3$ | 6-$CH_3$ | Na |
| $CF_3$ | $CH_3$ | O | $CH_3$ | $CH_3$ | 6-$CH_3$ | Na |
| $-(CH_2)_4-$ | | O | $CH_3$ | $CH_3$ | 6-$CH_3$ | Na |
| $-(CH_2)_5-$ | | O | $CH_3$ | $CH_3$ | 6-$CH_3$ | Na |
| $-(CH_2)_6-$ | | O | $CH_3$ | $CH_3$ | 6-$CH_3$ | Na |
| $-CH_2-CH(CH_3)-(CH_2)_3-$ | | O | $CH_3$ | $CH_3$ | 6-$CH_3$ | Na |
| $-(CH_2)_2-CH(CH_3)-(CH_2)_2-$ | | O | $CH_3$ | $CH_3$ | 6-$CH_3$ | Na |
| $-(CH_2)_2-CH(C_2H_5)-(CH_2)_2-$ | | O | $CH_3$ | $CH_3$ | 6-$CH_3$ | Na |
| $-(CH_2)_2-CH(i-C_3H_7)-(CH_2)_2-$ | | O | $CH_3$ | $CH_3$ | 6-$CH_3$ | Na |
| $CH_3$ | $CH_3$ | O | $CH_3$ | $CH_3$ | 6-$CH_3$ | $i-C_3H_7NH_3$ |
| $C_2H_5$ | $CH_3$ | O | $CH_3$ | $CH_3$ | 6-$CH_3$ | $i-C_3H_7NH_3$ |
| $-CH(CH_3)_2$ | $CH_3$ | O | $CH_3$ | $CH_3$ | 6-$CH_3$ | $i-C_3H_7NH_3$ |
| $CF_3$ | $CH_3$ | O | $CH_3$ | $CH_3$ | 6-$CH_3$ | $i-C_3H_7NH_3$ |
| $-(CH_2)_4-$ | | O | $CH_3$ | $CH_3$ | 6-$CH_3$ | $i-C_3H_7NH_3$ |
| $-(CH_2)_5-$ | | O | $CH_3$ | $CH_3$ | 6-$CH_3$ | $i-C_3H_7NH_3$ |
| $-(CH_2)_6-$ | | O | $CH_3$ | $CH_3$ | 6-$CH_3$ | $i-C_3H_7NH_3$ |
| $-CH_2-CH(CH_3)-(CH_2)_3-$ | | O | $CH_3$ | $CH_3$ | 6-$CH_3$ | $i-C_3H_7NH_3$ |
| $-(CH_2)_2-CH(CH_3)-(CH_2)_2-$ | | O | $CH_3$ | $CH_3$ | 6-$CH_3$ | $i-C_3H_7NH_3$ |
| $-(CH_2)_2-CH(C_2H_5)-(CH_2)_2-$ | | O | $CH_3$ | $CH_3$ | 6-$CH_3$ | $i-C_3H_7NH_3$ |
| $-(CH_2)_2-CH(i-C_3H_7)-(CH_2)_2-$ | | O | $CH_3$ | $CH_3$ | 6-$CH_3$ | $i-C_3H_7NH_3$ |
| $CH_3$ | $CH_3$ | O | $CH_3$ | $CH_3$ | 6-$CH_3$ | $N(C_4H_9-t)_4$ |
| $C_2H_5$ | $CH_3$ | O | $CH_3$ | $CH_3$ | 6-$CH_3$ | $N(C_4H_9-t)_4$ |
| $-CH(CH_3)_2$ | $CH_3$ | O | $CH_3$ | $CH_3$ | 6-$CH_3$ | $N(C_4H_9-t)_4$ |
| $CF_3$ | $CH_3$ | O | $CH_3$ | $CH_3$ | 6-$CH_3$ | $N(C_4H_9-t)_4$ |
| $-(CH_2)_4-$ | | O | $CH_3$ | $CH_3$ | 6-$CH_3$ | $N(C_4H_9-t)_4$ |

TABLE 7-continued (Ig)

| A | B | D | X | Y | $Z_n$ | $E^\oplus$ |
|---|---|---|---|---|---|---|
| | $-(CH_2)_5-$ | O | $CH_3$ | $CH_3$ | 6-$CH_3$ | $N(C_4H_9\text{-}t)_4$ |
| | $-(CH_2)_6-$ | O | $CH_3$ | $CH_3$ | 6-$CH_3$ | $N(C_4H_9\text{-}t)_4$ |
| | $-CH_2-CH-(CH_2)_3-$<br>$\quad\quad\;\; \vert$<br>$\quad\quad\;\; CH_3$ | O | $CH_3$ | $CH_3$ | 6-$CH_3$ | $N(C_4H_9\text{-}t)_4$ |
| | $-(CH_2)_2-CH-(CH_2)_2-$<br>$\quad\quad\quad\;\; \vert$<br>$\quad\quad\quad\;\; CH_3$ | O | $CH_3$ | $CH_3$ | 6-$CH_3$ | $N(C_4H_9\text{-}t)_4$ |
| | $-(CH_2)_2-CH-(CH_2)_2-$<br>$\quad\quad\quad\;\; \vert$<br>$\quad\quad\quad\;\; C_2H_5$ | O | $CH_3$ | $CH_3$ | 6-$CH_3$ | $N(C_4H_9\text{-}t)_4$ |
| | $-(CH_2)_2-CH-(CH_2)_2-$<br>$\quad\quad\quad\;\; \vert$<br>$\quad\quad\quad\;\; i\text{-}C_3H_7$ | O | $CH_3$ | $CH_3$ | 6-$CH_3$ | $N(C_4H_9\text{-}t)_4$ |
| $CH_3$ | $CH_3$ | O | $CH_3$ | $CH_3$ | 6-$CH_3$ | $NH_2(CH_3)_2$ |
| $C_2H_5$ | $CH_3$ | O | $CH_3$ | $CH_3$ | 6-$CH_3$ | $NH_2(CH_3)_2$ |
| $-CH(CH_3)_2$ | $CH_3$ | O | $CH_3$ | $CH_3$ | 6-$CH_3$ | $NH_2(CH_3)_2$ |
| $CF_3$ | $CH_3$ | O | $CH_3$ | $CH_3$ | 6-$CH_3$ | $NH_2(CH_3)_2$ |
| | $-(CH_2)_4-$ | O | $CH_3$ | $CH_3$ | 6-$CH_3$ | $NH_2(CH_3)_2$ |
| | $-(CH_2)_5-$ | O | $CH_3$ | $CH_3$ | 6-$CH_3$ | $NH_2(CH_3)_2$ |
| | $-(CH_2)_6-$ | O | $CH_3$ | $CH_3$ | 6-$CH_3$ | $NH_2(CH_3)_2$ |
| | $-CH_2-CH-(CH_2)_3-$<br>$\quad\quad\;\; \vert$<br>$\quad\quad\;\; CH_3$ | O | $CH_3$ | $CH_3$ | 6-$CH_3$ | $NH_2(CH_3)_2$ |
| | $-(CH_2)_2-CH-(CH_2)_2-$<br>$\quad\quad\quad\;\; \vert$<br>$\quad\quad\quad\;\; CH_3$ | O | $CH_3$ | $CH_3$ | 6-$CH_3$ | $NH_2(CH_3)_2$ |
| | $-(CH_2)_2-CH-(CH_2)_2-$<br>$\quad\quad\quad\;\; \vert$<br>$\quad\quad\quad\;\; C_2H_5$ | O | $CH_3$ | $CH_3$ | 6-$CH_3$ | $NH_2(CH_3)_2$ |
| | $-(CH_2)_2-CH-(CH_2)_2-$<br>$\quad\quad\quad\;\; \vert$<br>$\quad\quad\quad\;\; i\text{-}C_3H_7$ | O | $CH_3$ | $CH_3$ | 6-$CH_3$ | $NH_2(CH_3)_2$ |

If, according to process (A), ethyl O-2,6-dichlorophenylacetyl-hydroxyacetate is used, the course of the process according to the invention can be represented by the following equation:

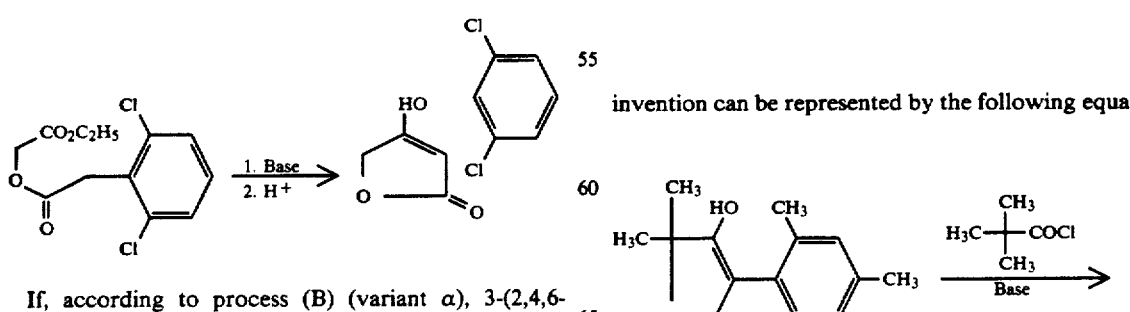

If, according to process (B) (variant a), 3-(2,4,6-trimethylphenyl)-4-hydroxy-5,5-dimethyl-Δ³-dihydrofuran-2-one and pivaloyl chloride are used as starting materials, the course of the process according to the invention can be represented by the following equation.

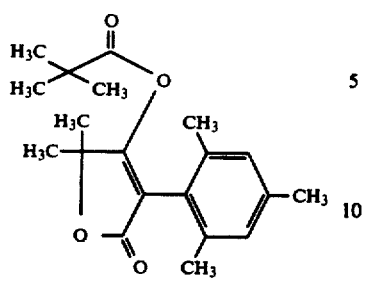

If, according to process B (variant β), 3-(2,4,5-trimethylphenyl)-4-hydroxy-5-phenyl-Δ³-dihydrofuran-2-one and acetic anhydride are used as starting compounds, the course of the process according to the invention can be represented by the following equation:

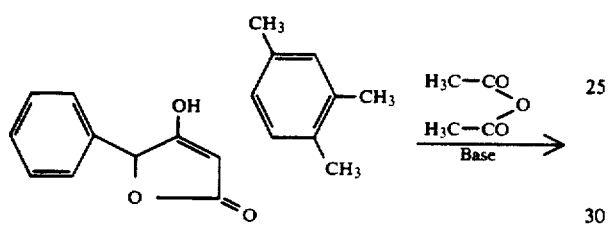

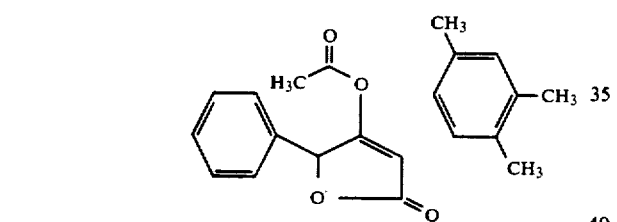

If, according to process C, 3-(2,4-dichlorophenyl)-4-hydroxy-5-methyl-Δ³-dihydrofuran-2-one and ethoxyethyl chloroformate are used as starting compounds, the course of the process according to the invention can be represented by the following equation.

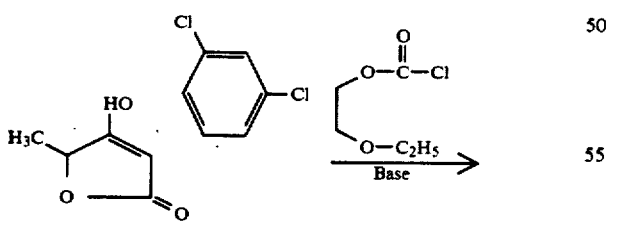

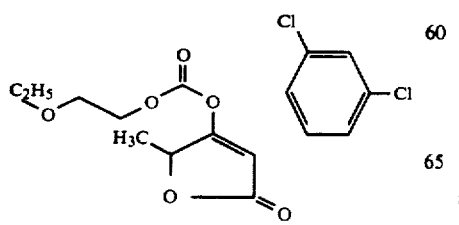

If, according to process (Dα), 3-(2,4,6-trimethylphenyl)-4-hydroxy-5-methyl-Δ³-dihydro-thiophen-2-one and methyl chloromonothioformate are used as starting materials, the course of the reaction can be represented as follows:

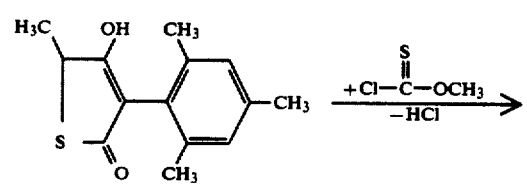

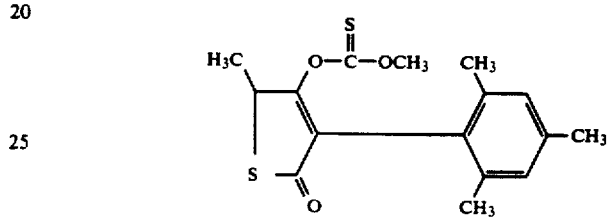

If, according to process (Dβ), 3-(2,4,6-trimethylphenyl)-4-hydroxy-5,5-pentamethylene-Δ³-dihydrofurna-2-one carbon disulfphide and methyl iodide are used as starting materials, the course of the reaction can be represented by the following equation:

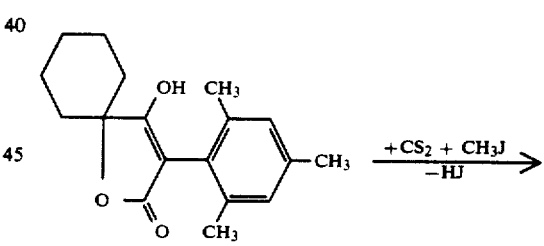

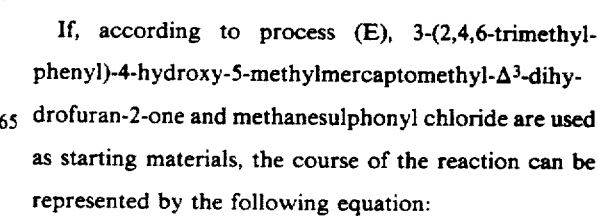

If, according to process (E), 3-(2,4,6-trimethylphenyl)-4-hydroxy-5-methylmercaptomethyl-Δ³-dihydrofuran-2-one and methanesulphonyl chloride are used as starting materials, the course of the reaction can be represented by the following equation:

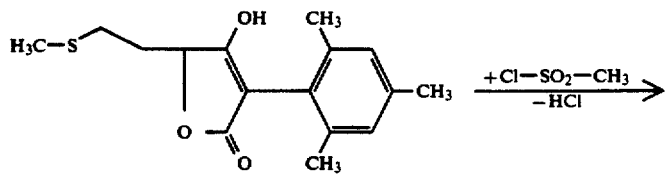

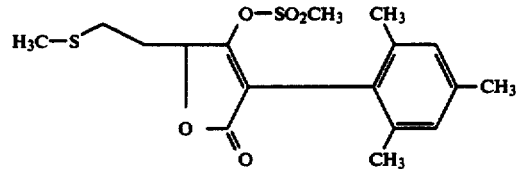

If, according to process (F), 3-(2,4,6-trimethyl-phenyl)-4-hydroxy-5,5-dimethyl-Δ³-dihydro-furan-2-one and 2,2,2-trifluoroethyl methanechlorothiophosphonate are used as starting materials, the course of the reaction can be represented by the following equation:

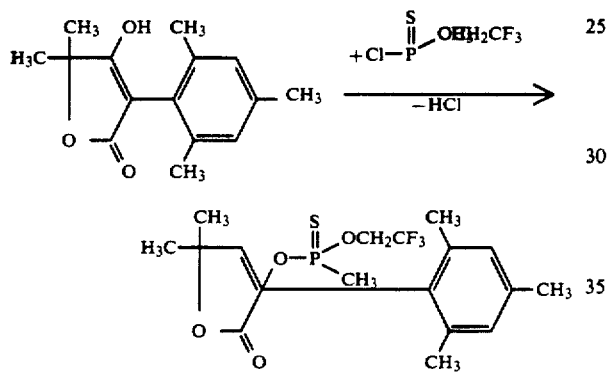

If, according to process (Gα), 3-(2,4,6-trimethyl-phenyl)-4-hydroxy-5-tetramethylene-Δ³-dihydro-furan-2-one and ethyl isocyanate are used as starting materials, the course of the reaction can be represented by the following equation:

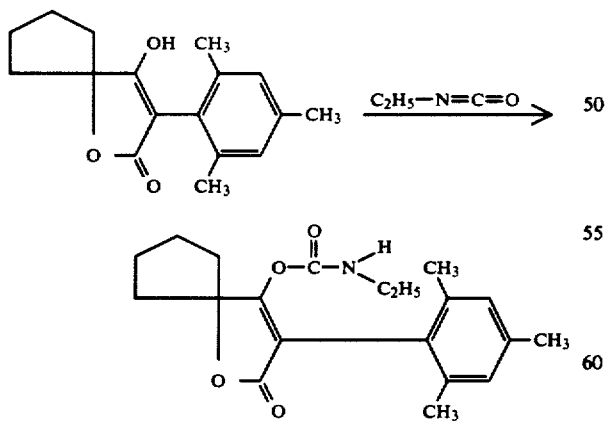

If, according to process (Gβ), 3-(2,4,6-trimethyl-phenyl)-4-hydroxy-5-methyl-Δ³-dihydrofuran-2-one and dimethylcarbamoyl chloride are used as starting materails, the course of the reaction can be represented by the following equation:

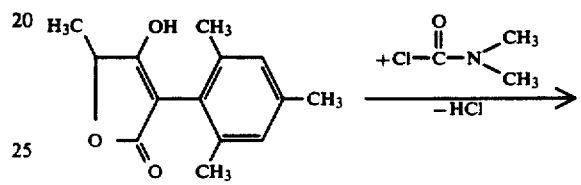

If, according to process (H), 3-(2,4,6-trimethyl-phenyl)-4-hydroxy-5,5-dimethyl-Δ³-dihydro-furan-2-one and NaOH are used as reactants, the course of the process according to the invention can be represented by the following equation:

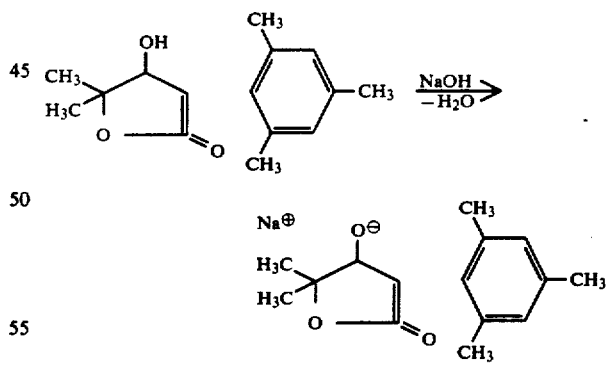

The compounds of the formula (II)

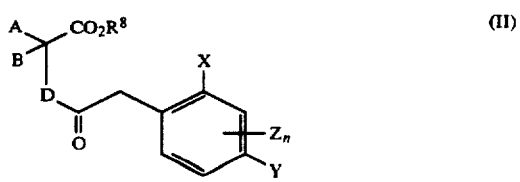

in which

A, B, D, X, Y, Z, n and $R^8$ have the abovementioned meaning and which are required as starting materials in the above process (A) are known or can be prepared in a simple manner by processes known in principle. For example, O-acyl α-hydroxycarboxylate of the formula (II) is obtained when
a) 2-hydroxycarboxylic acid (ester), or 2-mercaptocarboxylic acid (ester) of the formula (XIV)

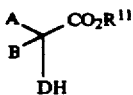 (XIV)

in which
$R^{11}$ represents hydrogen (XIVa) or alkyl (XIVb) and
A, B and D have the abovementioned meaning, are acylated with phenylacetic acid halides of the formula (XV)

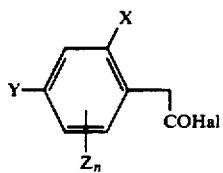 (XV)

in which
X, Y, Z and n have the abovementioned meaning and
Hal represents chlorine or bromine,
(Chem. Reviews 52 237-416 (1953)); or when thio- or hydroxycarboxylic acids of the formula (IIa)

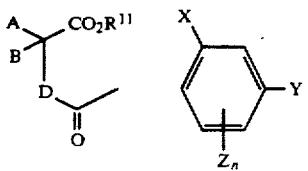 (IIa)

in which
A, B, D, X, Y, Z and n have the abovementioned meaning, and
$R^{11}$ represents hydrogen,
are esterified (Chem. Ind. (London) 1568 (1968)).
Compounds of the formula (IIa) can be obtained, for example, from the phenylacetic acid halides of the formula (XV) and thio- or hydroxycarboxylic acids of the formula (XIVa) (Chem. Reviews 52 237-416 (1953)).
Compounds of the formula (II) are furthermore obtained when phenylacetic acids of the formula XVI

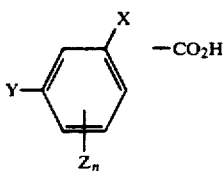 (XVI)

in which
X, Y, Z and n have the abovementioned meaning are alkylated with α-halogenocarboxylates of the formula XVII

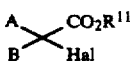 (XVII)

in which
A and B have the abovementioned meaning,
$R^{11}$ represents alkyl and
Hal represents chlorine or bromine.
The following compounds of the formula (II) may be mentioned by way of example:
ethyl O-(2,4-dichlorophenyl-acetyl)-hydroxyacetate
ethyl O-(2,6-dichlorophenyl-acetyl)-hydroxyacetate
ethyl O-(2,4,6-trichlorophenyl-acetyl)-hydroxyacetate
ethyl O-(2,4-dimethylphenyl-acetyl)-hydroxyacetate
ethyl O-(2,6-dimethylphenyl-acetyl)-hydroxyacetate
ethyl O-(2,4,6-trimethylphenyl-acetyl)-hydroxyacetate
ethyl O-(2,4-dichlorophenyl-acetyl)-lactate
ethyl O-(2,6-dichlorophenyl-acetyl)-lactate
ethyl O-(2,4,6-trichlorophenyl-acetyl)-lactate
ethyl O-(2,4-dimethylphenyl-acetyl)-lactate
ethyl O-(2,6-dimethylphenyl-acetyl)-lactate
ethyl O-(2,4,6-trimethylphenyl-acetyl)-lactate
ethyl O-(2,4-dichlorophenyl-acetyl)-hydroxyisobutyrate
ethyl O-(2,6-dichlorophenyl-acetyl)-hydroxyisobutyrate
ethyl O-(2,4,6-trichlorophenyl-acetyl)-hydroxyisobutyrate
ethyl O-(2,4-dimethylphenyl-acetyl)-hydroxyisobutyrate
ethyl O-(2,6-dimethylphenyl-acetyl)-hydroxyisobutyrate
ethyl O-(2,4,6-trimethylphenyl-acetyl)-hydroxyisobutyrate
ethyl O-(2,4-dichlorophenyl-acetyl)-mandelate
ethyl O-(2,6-dichlorophenyl-acetyl)-mandelate
ethyl O-(2,4,6-trichlorophenyl-acetyl)-mandelate
ethyl O-(2,4-dimethylphenyl-acetyl)-mandelate
ethyl O-(2,6-dimethylphenyl-acetyl)-mandelate
ethyl O-(2,4,6-trimethylphenyl-acetyl)-mandelate
ethyl O-(2,4-dichlorophenyl-acetyl)-1-hydroxycyclohexanecarboxylate
ethyl O-(2,6-dichlorophenyl-acetyl)-1-hydroxycyclohexanecarboxylate
ethyl O-(2,4,6-trichlorophenyl-acetyl)-1-hydroxycyclohexanecarboxylate
ethyl O-(2,4-dimethylphenyl-acetyl)-1-hydroxycyclohexanecarboxylate
ethyl O-(2,6-dimethylphenyl-acetyl)-1-hydroxycyclohexanecarboxylate
ethyl O-(2,4,6-trimethylphenyl-acetyl)-1-hydroxycyclohexanecarboxylate
ethyl O-(2,4-dichlorophenyl-acetyl)-2-hydroxy-2-ethylbutyrate
ethyl O-(2,6-dichlorophenyl-acetyl)-2-hydroxy-2-ethyl-. butyrate
ethyl O-(2,4,6-trichlorophenyl-acetyl)-2-hydroxy-2-ethylbutyrate
ethyl O-(2,4-dimethylphenyl-acetyl)-2-hydroxy-2-ethylbutyrate
ethyl O-(2,6-dimethylphenyl-acetyl)-2-hydroxy-2-ethylbutyrate
ethyl O-(2,4,6-trimethylphenyl-acetyl)-2-hydroxy-2-ethylbutyrate The following compounds of the formula (II) may be mentioned by way of example:
ethyl S-(2,4-dichlorophenyl-acetyl)-thioacetate
ethyl S-(2,6-dichlorophenyl-acetyl)-thioacetate
ethyl S-(2,4,6-trichlorophenyl-acetyl)-thioacetate
ethyl S-(2,4-dimethylphenyl-acetyl)-thioacetate
ethyl S-(2,6-dimethylphenyl-acetyl)-thioacetate
ethyl S-(2,4,6-trimethylphenyl-acetyl)-thioacetate
ethyl S-(2,4-dichlorophenyl-acetyl)-thiolactate
ethyl S-(2,6-dichlorophenyl-acetyl)-thiolactate
ethyl S-(2,4,6-trichlorophenyl-acetyl)-thiolactate
ethyl S-(2,4-dimethylphenyl-acetyl)-thiolactate
ethyl S-(2,6-dimethylphenyl-acetyl)-thiolactate
ethyl S-(2,4,6-trimethylphenyl-acetyl)-thiolactate
ethyl S-(2,4-dichlorophenyl-acetyl)-thioisobutyrate
ethyl S-(2,6-dichlorophenyl-acetyl)-thioisobutyrate
ethyl S-(2,4,6-trichlorophenyl-acetyl)-thioisobutyrate
ethyl S-(2,4-dimethylphenyl-acetyl)-thioisobutyrate
ethyl S-(2,6-dimethylphenyl-acetyl)-thioisobutyrate
ethyl S-(2,4,6-trimethylphenyl-acetyl)-thioisobutyrate Process (A) is characterised in that compounds of the formula (II), in which A, B, D, X, Y, Z, n and $R^8$ have the abovementioned meaning, are subjected to intramolecular condensation in the presence of bases.

Diluents which can be employed in process (A) according to the invention are all inert organic solvents. The following can preferably be used: hydrocarbons, such as toluene and xylene, furthermore ethers, such as dibutyl ether, tetrahydrofuran, dioxane, glycol dimethyl ether and diglycol dimethyl ether, furthermore polar solvents such as dimethyl sulphoxide, sulpholane, dimethylformamide and N-methyl-pyrrolidone. Alcohols such as methanol, ethanol, propanol, iso-propanol, butanol, isobutanol and tert.-butanol can furthermore be employed. Bases (deprotonating agents) which can be employed for carrying out process (A) according to the invention are all customary proton acceptors. The following can preferably be used: the oxides, hydroxides and carbonates of alkali metals and alkaline earth metals such as sodium hydroxide, potassium hydroxide, magnesium oxide, calcium oxide, sodium carbonate, potassium carbonate and calcium carbonate, all of which can also be used in the presence of phase transfer catalysts such as, for example, triethylbenzylammonium chloride, tetrabutylammonium bromide, Adogen 464 or TDA 1. Alkali metals such as sodium or potassium can furthermore be used. Other substances which can be used are amides and hydrides of alkali metals and. alkaline earth metals such as sodium amide, sodium hydride and calcium hydride, and additionally also alkali metal alcoholates such as sodium methylate, sodium ethylate and potassium tert.-butylate.

Adogen 464=methyltrialkyl($C_8$–$C_{10}$) ammonium chloride TDA 1=tris-(methoxyethoxyethyl)-amine When carrying out process (A) according to the invention, the reaction temperatures can be varied within a substantial range. In general, the process is carried out at temperatures between 0° C. and 250° C., preferably between 50° C. and 150° C. Process (A) according to the invention is generally carried out under atmospheric pressure.

When carrying out process (A) according to the invention, the reactants of the formula (II) and the deprotonating bases are generally employed in approximately equimolar amounts. However, it is also possible to use one or the other reactant in a larger excess (up to 3 moles).

Process (Bα) is characterised in that compounds of the formula (Ia) are reacted with carboxylic acid halides of the formula (III).

When the acid halides are used, then diluents which can be employed in process (Bα) according to the invention are all solvents which are inert to these compounds. The following can preferably be used: hydrocarbons such as benzine, benzene, toluene, xylene and tetralin, furthermore halogenohydrocarbons such as methylene chloride, chloroform, carbon tetrachloride, chlorobenzene and o-dichlorobenzene, moreover ketones, such as acetone and methyl isopropyl ketone, furthermore ethers such as diethyl ether, tetrahydrofuran and dioxane, in addition carboxylic acid esters such as ethyl acetate, and also strongly polar solvents such as dimethyl sulphoxide and sulpholane. If the acid halide is sufficiently stable to hydrolysis, the reaction can also be carried out in the presence of water.

If the corresponding carboxylic acid halides are used, then acid-binding agents in the reaction in accordance with process (Bα) according to the invention are all customary acid acceptors. The following can preferably be used: tertiary amines such as triethylamine, pyridine, diazabicyclooctane (DABCO), diazabicycloundecane (DBU), diazabicyclononene (DBN), Hünig base and N,N-dimethylaniline, furthermore alkaline earth metal oxides such as magnesium oxide and calcium oxide, in addition alkali metal carbonates and alkaline earth metal carbonates such as sodium carbonate, potassium carbonate and calcium carbonate.

When carrying out process (Bα) according to the invention, the reaction temperatures can also be varied within a substantial range, even when carboxylic acid halides are used. In general, the process is carried out at temperatures between −20° C. and +150° C., preferably between 0° C. and 100° C.

When carrying out process (Bα) according to the invention, the starting materials of the formula (Ia) and the carboxylic acid halide of the formula (III) are generally used in approximately equivalent amounts. However, it is also possible to employ a larger excess (up to 5 moles) of the carboxylic acid halide. Working-up is carried out by customary methods.

Process (Bβ) is characterised in that compounds of the formula (Ia) are reacted with carboxylic anhydrides of the formula (IV).

If, in process (Bβ) according to the invention, carboxylic anhydrides are used as reactants of the formula (IV), then the diluents which can be used are preferably those which are also preferably suitable when acid halides are used. Besides, a carboxylic anhydride employed in excess can also simultaneously act as the diluent.

When carrying out process (Bβ) according to the invention, the reaction temperatures can be varied within a substantial range, even when carboxylic anhydrides are used. In general, the process is carried out at temperatures between −20° C. and +150° C., preferably between 0° C. and 100° C.

When carrying out the process according to the invention, the starting substances of the formula (Ia) and the carboxylic anhydride of the formula (IV) are generally used in approximately equivalent amounts. However, it is also possible to employ the carboxylic anhydride in a larger excess (up to 5 moles). Working-up is carried out by customary methods.

In general, a procedure is followed in which diluent and excess carboxylic anhydride as well as the carboxylic acid which forms is removed by distillation or by washing with an organic solvent or with water.

Process (C) is characterised in that compounds of the formula (Ia) are reacted with chloroformic acid esters, or chloroformic acid thioesters, of the formula (V). If the corresponding chloroformic acid esters, or chloroformic acid thioesters are used, then suitable acid-binding agents for the reaction in accordance with process (C) according to the invention are all customary acid acceptors. The following can preferably be used: tertiary amines such as triethylamine, pyridine, DABCO, DBC, DBA, Hünig base and N,N-dimethyl-aniline, furthermore alkaline earth metal oxides such as magnesium oxide and calcium oxide, and, in addition, alkaline earth metal carbonates and alkaline earth metal carbonates such as sodium carbonate, potassium carbonate and calcium carbonate.

When the chloroformic acid esters, or chloroformic acid thioesters, are used, then diluents which can be employed in process (C) according to the invention are all solvents which are inert to these compounds. The following can preferably be used: hydrocarbons, such as benzine, benzene, toluene, xylene and tetralin, furthermore halogenohydrocarbons such as methylene chloride, chloroform, carbon tetrachloride, chlorobenzene and o-dichlorobenzene, in addition ketones such as acetone and methyl isopropyl ketone, furthermore ethers, such as diethyl ether, tetrahydrofuran and dioxane, moreover carboxylic acid esters, such as ethyl acetate, and also strongly polar solvents such as dimethyl sulphoxide and sulpholane.

When the chloroformic acid esters, or chloroformic acid thioesters, are used as carboxylic acid derivatives of the formula (V), the reaction temperatures at which process (C) according to the invention is carried out can be varied within a substantial range. If the process is carried out in the presence of a diluent and of an acid-binding agent, then the reaction temperatures are generally between $-20°$ C. and $+100°$ C., preferably between $0°$ C. and $50°$ C.

Process (C) according to the invention is generally carried out under atmospheric pressure.

When carrying out process (C) according to the invention, the starting substances of the formula (Ia) and the corresponding chloroformic acid ester, or chloroformic acid thioester, of the formula (V) are generally used in approximately equivalent amounts. However, it is also possible to employ one or the other component in a larger excess (up to 2 moles). Working-up is then carried out by customary methods. In general, a procedure is followed in which precipitated salts are removed, and the reaction mixture which remains is concentrated by stripping off the diluent.

In preparation process $D_\alpha$, approx. 1 mole of chloromonothioformic acid ester, or chlorodithioformic acid ester, of the formula (VII) is reacted per mole of starting compound of the formula (Ia) at $0°$ to $120°$ C., preferably at $20°$ to $60°$ C.

Suitable diluents which may be added are all inert polar organic solvents such as ethers, amides, alcohols, sulphones and sulphoxides.

Dimethyl sulphoxide, tetrahydrofuran, dimethylformamide and dimethyl sulphide are preferably employed.

If, in a preferred embodiment, the enolate salt of the compound Ia is synthesised by an addition of strong deprotonating agent such as, for example, sodium hydride or potassium tertiary butylate, a further addition of acid-binding agents can be dispensed with.

If acid-binding agents are employed, then suitable substances are customary inorganic or organic bases, with sodium hydroxide, sodium carbonate, potassium carbonate, pyridine and triethylamine being mentioned by way of example.

The reaction can be carried out under atmospheric pressure or under increased pressure and is preferably carried out under atmospheric pressure. Working-up is carried out by customary methods.

In preparation process $D_\beta$, an equimolar amount, or an excess, of carbon disulphide is added per mole of starting compound of the formula (II). This process is preferably carried out at temperatures from $0°$ to $50°$ C. and, in particular, at $20°$ to $30°$ C.

It is frequently advantageous first to prepare the corresponding salt from the compound of the formula (II) by adding a deprotonating agent (such as, for example, potassium tertiary butylate or sodium hydride). The compound (II) is reacted with carbon disulphide until the formation of the intermediate is complete, for example, after stirring for several hours at room temperature.

The further reaction with the alkyl halide of the formula (VIII) is preferably carried out at $0°$ to $70°$ C. and, in particular, at $20°$ to $50°$ C. At least an equimolar amount of alkyl halide is employed for this purpose.

The process is carried out under atmospheric pressure or under increased pressure, preferably under atmospheric pressure.

Again, working-up is carried out by customary methods.

In preparation process E), approx. 1 mole of sulphonyl chloride (VIII) is reacted per mole of starting compound of the formula (Ia) at $0°$ to $150°$ C., preferably at $20°$ to $70°$ C.

Suitable diluents which may be added are all inert polar organic solvents such as ethers, amides, nitriles, alcohols, sulphones and sulphoxides.

Dimethyl sulphoxide, tetrahydrofuran, dimethylformamide and dimethyl sulphide are preferably employed.

If, in a preferred embodiment, the enolate salt of the compound Ia is synthesised by an addition of strong deprotonating agents (such as, for example, sodium hydride or potassium tertiary butylate), a further addition of acid-binding agents can be dispensed with.

If acid-binding agents are employed, then suitable substances are customary inorganic or organic bases, with sodium hydroxide, sodium carbonate, potassium carbonate and pyridine being mentioned by way of example.

The reaction can be carried out under atmospheric pressure or under increased pressure and is preferably carried out under atmospheric pressure. Working-up is carried out by customary methods.

If appropriate, preparation process E can be carried out under phase transfer conditions (W. J. Spillane et al.; J. Chem. Soc., Perkin Trans I, (3) 677-9 (1982)). In this case, 0.3 to 1.5 moles of sulphonyl chloride VIII, preferably 0.5 mole, are reacted per mole of starting compound of the formula (Ia) at $0°$ to $150°$ C., preferably at $20°$ to $70°$ C.

Phase transfer catalysts which can be used are all quaternary ammonium salts, preferably tetraoctylammonium bromide and benzyltriethylammonium chloride. All unpolar inert solvents can act as organic solvents in this case, benzene and toluene are preferably employed.

To obtain compounds of the structure (Ie), 1 to 2, preferably 1 to 1.3, moles of the phosphorus compound of the formula (IX) are employed in preparation process F) per mole of the compound (Ia) at temperatures between −40° C. and 150° C., preferably between −10° and 110° C.

Suitable diluents which may be added are all inert polar organic solvents such as, inter alia, ethers, amides, nitriles, alcohols, sulphides, sulphones and sulphoxides.

Acetonitrile, dimethyl sulphoxide, tetrahydrofuran, dimethylformamide and dimethyl sulphide are preferably employed.

Suitable acid-binding agents which may be added are customary inorganic or organic bases such as hydroxides or carbonates. Sodium hydroxide, sodium carbonate, potassium carbonate and pyridine may be mentioned by way of example.

The reaction can be carried out under atmospheric pressure or under increased pressure and is preferably carried out under atmospheric pressure. Working-up is carried out by customary methods of organic chemistry. The end products obtained are preferably purified by crystallisation, chromatographic purification or by so-called "incipient distillation", i.e. removal of the volatile components in vacuo.

In preparation process $G_\alpha$, approx. 1 mole of isocyanate of the formula (X) is reacted per mole of starting compound of the formula Ia at 0° to 100° C., preferably at 20° to 50° C.

Suitable diluents which may be added are all inert organic solvents such as ethers, amides, nitriles, sulphones and sulphoxides.

If appropriate, catalysts can be added to accelerate the reaction. Catalysts which can very advantageously be employed are organotin compounds such as, for example, dibutyltin dilaurate. The process is preferably carried out under atmospheric pressure.

In preparation process $G_\beta$, approx. 1 mole of carbamoyl chloride, or thiocarbamoyl chloride, of the formula (XI) is reacted per mole of starting compound of the formula (Ia) at 0° to 150° C., preferably at 20° to 70° C.

Suitable diluents which may be added are all inert polar organic solvents such as ethers, amides, alcohols, sulphones and sulphoxides.

Dimethyl sulphoxide, tetrahydrofuran, dimethylformamide and dimethyl sulphide are preferably employed.

If, in a preferred embodiment, the enolate salt of the compound Ia is synthesised by an addition of strong deprotonating agents (such as, for example, sodium hydride or potassium tertiary butylate), a further addition of acid-binding agents can be dispensed with.

If acid-binding agents are employed, then suitable substances are customary inorganic or organic bases, with sodium hydroxide, sodium carbonate, potassium carbonate and pyridine being mentioned by way of example.

The reaction can be carried out under atmospheric pressure or under increased pressure and is preferably carried out under atmospheric pressure. Working-up is carried out by customary methods.

Process (H) is characterised in that compounds of the formula (Ia) are reacted with metal hydroxides (XII) or amines (XIII).

Diluents which can be employed in the process according to the invention are preferably ethers such as tetrahydrofuran, dioxane, diethyl ether, but also alcohols such as methanol, ethanol and isopropanol, or else water. Process (H) according to the invention is generally carried out under atmospheric pressure. The reaction temperatures are generally between −20° C. and 100° C., preferably between 0° C. and 50° C.

When carrying out process (H) according to the invention, the starting substances of the formula (Ia), and (XII) or (XIII), respectively, are generally used in approximately equimolar amounts. However, it is also possible to employ one or the other component in a larger excess (up to 2 moles). In general, a procedure is followed in which the reaction mixture is concentrated by stripping off the diluent.

Preparation Examples

Example Ia-1

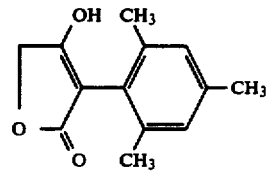

11.8 g (0.105 mol) of potassium tertiary butylate are dissolved in 100 ml of tert. butanol at 40° C.

26 g of ethoxycarbonylmethyl 2,4,6-trimethylphenylacetate dissolved in 50 ml of tert. butanol, are subsequently added dropwise at 40° C., with stirring.

This mixture is stirred into 600 ml of ice-water, the pH is brought to 2 using 1N hydrochloric acid, the mixture is extracted using ethyl acetate, and the extract is washed twice with water, dried over sodium sulphate and concentrated on a rotary evaporator.

Yield: 6.82 g (30.3% of theory) of the compound 3-(2,4,6-trimethylphenyl)-4-hydroxy-$\Delta^3$-dihydrofuran-2-one.

Melting point (after recrystallisation from methylene chloride/n-hexane) 154° C.

Example Ia-2

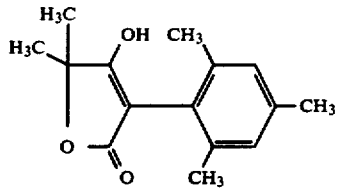

2.16 g (90 mmol) of sodium hydride (80%) were introduced into 50 ml of absolute toluene. This procedure is carried out under an argon atmosphere. The mixture is heated to reflux temperature. 17.5 g (60 mmol) of the compound of the formula

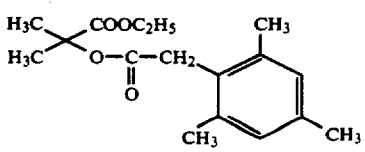

dissolved in 70 ml of absolute toluene are then added dropwise under reflux conditions, and the mixture is refluxed for 3 hours.

For working-up, the solution is evaporated on a rotary evaporator, the residue is taken up in water, and the solution is acidified. The precipitate which separates out during this process is taken up in methylene chloride, and the aqueous mother liquor is extracted repeatedly. The extract is subsequently dried over sodium sulphate and concentrated on a rotary evaporator.

To purify the product, it is suspended in 20 ml of hot chloroform, 60 ml of n-hexane are slowly added under reflux conditions, the mixture is allowed to cool slowly, and solids are filtered off with suction and dried.

Yield 4.66 g (=32% of theory) of the compound 3-(2,4,6-trimethylphenyl)-4-hydroxy-5,5-dimethyl-$\Delta^3$-dihydrofuran-2-one of melting point 254° C.

The following Preparation Examples were synthesised analogously to the preparation methods of Examples Ia-1 and Ia-2:

TABLE 8

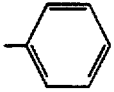

(Ia)

| Ex. No. | A | B | D | X | Y | $Z_n$ | Physical constants |
|---|---|---|---|---|---|---|---|
| Ia-3 | CH₃ | H | O | Cl | Cl | H | m.p.: 179° C. |
| Ia-4 | CH₃ | H | O | Cl | H | H | m.p.: 154° C. |
| Ia-5 | CH₃ | H | O | CF₃ | H | H | m.p.: 156° C. |
| Ia-6 | CH₃ | H | O | OCH₃ | H | H | m.p.: 110° C. |
| Ia-7 | CH₃ | H | O | CH₃ | H | H | m.p.: 124° C. |
| Ia-8 | H | H | O | Br | H | H | m.p.: 218° C. |
| Ia-9 | H | H | O | F | H | 6-F | m.p.: 264° C. |
| Ia-10 | H | H | O | —CH=CH—CH=CH— | H | m.p.: 210° C. |
| Ia-11 | H | H | O | CH₃ | H | H | m.p.: 163° C. |
| Ia-12 | H | H | O | F | H | H | m.p.: 201° C. |
| Ia-13 | —(CH₂)₅— | | O | CH₃ | CH₃ | 6-CH₃ | m.p.: 279° C. |
| Ia-14 | 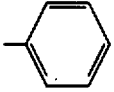 | H | O | CH₃ | CH₃ | 6-CH₃ | m.p.: 212–214° C. |
| Ia-15 |  | CH₃ | O | CH₃ | CH₃ | 6-CH₃ | m.p.: 244–245° C. |
| Ia-16 | CH₃ | H | O | CH₃ | CH₃ | 6-CH₃ | m.p.: 208–210° C. |
| Ia-17 | CH₃ | H | O | Cl | H | 6-Cl | m.p.: 237° C. |
| Ia-18 | 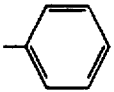 | H | O | Cl | H | 6-Cl | m.p.: 211° C. |
| Ia-19 | CH₃ | CH₃ | O | Cl | H | 6-Cl | m.p.: >270° C. |
| Ia-20 | 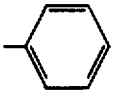 | CH₃ | O | Cl | H | 6-Cl | m.p.: 255° C. |
| Ia-21 | 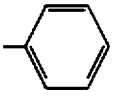 | H | O | Cl | Cl | H | m.p.: 97° C. |
| Ia-22 | CH₃ | CH₃ | O | Cl | Cl | H | m.p.: 191° C. |
| Ia-23 | | CH₃ | O | Cl | Cl | H | m.p.: 130° C. |
| Ia-24 | | —(CH₂)₅— | O | Cl | H | 6-Cl | m.p.: >265° C. |
| Ia-25 | | —(CH₂)₅— | O | Cl | Cl | H | m.p.: >230° C. |
| Ia-26 | | —(CH₂)₅— | O | F | H | 6-Cl | m.p.: 269° C. |
| Ia-27 | CH₃ | H | O | F | H | 6-Cl | m.p.: 201° C. |

TABLE 8-continued (Ia)

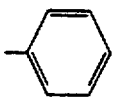

| Ex. No. | A | B | D | X | Y | $Z_n$ | Physical constants |
|---|---|---|---|---|---|---|---|
| Ia-28 | phenyl | H | O | F | H | 6-Cl | m.p.: 138° C. |
| Ia-29 | $CH_3$ | $CH_3$ | O | F | H | 6-Cl | m.p.: 249° C. |
| Ia-30 | phenyl | phenyl | O | $CH_3$ | $CH_3$ | 6-$CH_3$ | m.p.: 270–275° C. |
| Ia-31 | —$CH_2$—$CH_2$— | | O | $CH_3$ | $CH_3$ | 6-$CH_3$ | m.p.: 258–260° C. |
| Ia-32 | —$(CH_2)_9$—$CH_3$ | H | O | $CH_3$ | $CH_3$ | 6-$CH_3$ | m.p.: 98–99° C. |
| Ia-33 | —$(CH_2)_4$— | | O | $CH_3$ | $CH_3$ | 6-$CH_3$ | m.p.: 234–238° C. |
| Ia-34 | —$CH_2$—CH(CH_3)—$(CH_2)_3$— | | O | $CH_3$ | $CH_3$ | 6-$CH_3$ | m.p.: 233–235° C. |
| Ia-35 | —$(CH_2)_6$— | | O | $CH_3$ | $CH_3$ | 6-$CH_3$ | m.p.: >250° C. |
| Ia-36 | —$CH_2CH_2$—CH(t-$C_4H_9$)—$(CH_2)_2$— | | O | $CH_3$ | $CH_3$ | 6-$CH_3$ | m.p.: 210–245° C. |
| Ia-37 | $C_2H_5$ | $C_2H_5$ | O | $CH_3$ | $CH_3$ | 6-$CH_3$ | m.p.: 216–228° C. |
| Ia-38 | cyclohexyl | H | O | $CH_3$ | $CH_3$ | 6-$CH_3$ | m.p.: 192–197° C. |
| Ia-39 | —$CH_2$—$CH_2$—CH($CH_3$)—$(CH_2)_2$— | | O | $CH_3$ | $CH_3$ | 6-$CH_3$ | m.p.: 222° C. |
| Ia-40 | —$(CH_2)_7$— | | O | $CH_3$ | $CH_3$ | 6-$CH_3$ | m.p.: 246–248° C. |
| Ia-41 | —CH($CH_3$)—$(CH_2)_4$— | | O | $CH_3$ | $CH_3$ | 6-$CH_3$ | m.p.: 223–231° C. |
| Ia-42 | —$(CH_2)_2$—CH(Ph)—$(CH_2)_2$— | | O | $CH_3$ | $CH_3$ | 6-$CH_3$ | m.p.: 257–260° C. |
| Ia-43 | $C_2H_5$ | $CH_3$ | O | $CH_3$ | $CH_3$ | 6-$CH_3$ | m.p.: 175–180° C. |
| Ia-44 | t-$C_4H_9$ | H | O | $CH_3$ | $CH_3$ | 6-$CH_3$ | m.p.: 180–185° C. |
| Ia-45 | —$CH_2$—C($CH_3$)$_2$—$CH_2$—CH($CH_3$)—$CH_2$— | | O | $CH_3$ | $CH_3$ | 6-$CH_3$ | m.p.: 258–259° C. |
| Ia-46 | —CH=$CH_2$ | $CH_3$ | O | $CH_3$ | $CH_3$ | 6-$CH_3$ | m.p.: 233–235° C. |
| Ia-47 | $CH_3$ | $CH_3$ | O | $CH_3$ | $CH_3$ | H | m.p.: 190–194° C. |
| Ia-48 | 4-t-$C_4H_9$-phenyl | H | O | F | H | 6-Cl | m.p.: 197° C. |

TABLE 8-continued (Ia)

| Ex. No. | A | B | D | X | Y | $Z_n$ | Physical constants |
|---|---|---|---|---|---|---|---|
| Ia-49 | $CH_3$ | $CF_3$ | O | $CH_3$ | $CH_3$ | 6-$CH_3$ | m.p.: 255–257° C. |
| Ia-50 | t-$C_4H_9$ | $CH_3$ | O | $CH_3$ | $CH_3$ | 6-$CH_3$ | m.p.: 208° C. |
| Ia-51 | (2-ethylphenyl, ethyl) | | O | $CH_3$ | $CH_3$ | 6-$CH_3$ | m.p.: 236–237° C. |
| Ia-52 | i-$C_3H_7$ | $CH_3$ | O | $CH_3$ | $CH_3$ | 6-$CH_3$ | m.p.: 215–217° C. |
| Ia-53 | —C($CH_3$)$_2$—C($CH_3$)$_2$— | | O | $CH_3$ | $CH_3$ | 6-$CH_3$ | m.p.: 212–213° C. |
| Ia-52 | i-$C_3H_7$ | H | O | $CH_3$ | $CH_3$ | 6-$CH_3$ | m.p.: 190–191° C. |
| Ia-55 | —(CH$_2$)$_5$— | | O | Cl | Cl | 6-$CF_3$ | m.p.: 266° C. |
| Ia-56 | —(CH$_2$)$_5$— | | O | F | $CF_3$ | 6-Cl | m.p.: 221° C. |
| Ia-57 | H | H | O | Cl | Cl | H | m.p.: 198° C. |
| Ia-58 | (cyclohexenyl) | H | O | $CH_3$ | $CH_3$ | 6-$CH_3$ | m.p.: 118–127° C. |
| Ia-59 | (phenyl-CH$_2$-CH$_2$-) | $CH_3$ | O | $CH_3$ | $CH_3$ | 6-$CH_3$ | m.p.: 170° C. |
| Ia-60 | (benzyl) | (benzyl) | O | $CH_3$ | $CH_3$ | 6-$CH_3$ | m.p.: 204–206° C. |
| Ia-61 | —(CH$_2$)$_5$— | | O | $CH_3$ | $CH_3$ | 3F, 6$CH_3$ | m.p.: 251–253° C. |
| Ia-62 | (cyclohexenyl) | | O | $CH_3$ | $CH_3$ | 6-$CH_3$ | m.p.: 217 (Zers.) |

Example Ib-1

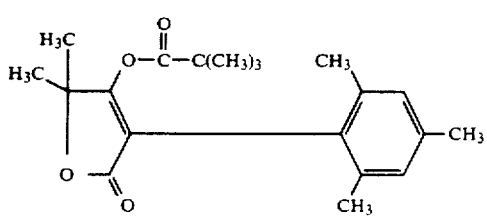

1.23 g (5 mmol) of 3-(2,4,6-trimethylphenyl)-4-hydroxy-5,5-dimethyl-$\Delta^3$-dihydrofuran-2-one are introduced into 20 ml of absolute methylene chloride. To this mixture there is added 0.61 g (6 mmol) of triethylamine, a solution of 0.72 g (6 mmol) of pivaloyl chloride in 5 ml of absolute methylene chloride is added at 0°–10° C., and stirring is continued for 1 hour at room temperature.

For working up, the solution is washed with aqueous citric acid and aqueous sodium hydrogen carbonate solution, dried over sodium sulphate and evaporated on Yield: 1.43 g (87% of theory) of the compound 3-(2,4,6-trimethylphenyl)-4-pivaloyloxy-5,5-dimethyl-$\Delta^3$-dihydrofuran-2-one of melting point 82° C.

Example Ib-2

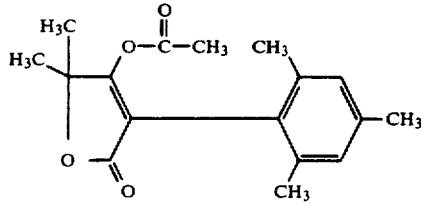

2.46 g (10 mmol) of 3-(2,4,6-trimethylphenyl)-4-hydroxy-5,5-dimethyl-$\Delta^3$-dihydrofuran-2-one are introduced into 40 ml of absolute methylene chloride. 1.11 g (11 mmol) of triethylamine are added, a solution of 0.86 g (11 mmol) of acetyl chloride in 10 ml of absolute methylene chloride is added dropwise at 0°–10° C., and stirring is continued for 1 hour at room temperature.

Working-up is carried out analogously to Example 3.

Yield: 2.55 g (88% or theory) or the compound 3-(2,4,6-trimethylphenyl)-4-acetyloxy-5,5-dimethyl-$\Delta^3$-dihydrofuran-2-one of melting point 160° C.

The following Preparation Examples were synthesised analogously to the preparation methods of Exam-

TABLE 9

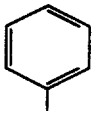

(Ib)

| Ex. No. | A | B | D | X | Y | $Z_n$ | $R^1$ | Physical constants |
|---|---|---|---|---|---|---|---|---|
| Ib-3 | phenyl | CH₃ | O | CH₃ | CH₃ | 6-CH₃ | CH₃ | m.p.: 118–120° C. |
| Ib-4 | CH₃ | CH₃ | O | CH₃ | CH₃ | 6-CH₃ | —C(CH₃)₂—C₂H₅ | m.p.: 64° C. |
| Ib-5 | CH₃ | CH₃ | O | CH₃ | CH₃ | 6-CH₃ | —C(CH₃)₂—CH(CH₃)₂ | m.p.: 67° C. |
| Ib-6 | CH₃ | CH₃ | O | CH₃ | CH₃ | 6-CH₃ | —CH₂—C(CH₃)₃ | m.p.: 73° C. |
| Ib-7 | —(CH₂)₅— | —(CH₂)₅— | O | CH₃ | CH₃ | 6-CH₃ | CH₃ | m.p.: 200° C. |
| Ib-8 | —(CH₂)₅— | —(CH₂)₅— | O | CH₃ | CH₃ | 6-CH₃ | —C(CH₃)₃ | m.p.: 117–119° C. |
| Ib-9 | phenyl | CH₃ | O | CH₃ | CH₃ | 6-CH₃ | —C(CH₃)₃ | m.p.: 123–125° C. |
| Ib-10 | CH₃ | H | O | CH₃ | CH₃ | 6-CH₃ | CH₃ | m.p.: 110–112° C. |
| Ib-11 | CH₃ | H | O | CH₃ | CH₃ | 6-CH₃ | —C(CH₃)₃ | oil |
| Ib-12 | CH₃ | CH₃ | O | CH₃ | CH₃ | 6-CH₃ | phenyl | m.p.: 150–152° C. |
| Ib-13 | phenyl | CH₃ | O | CH₃ | CH₃ | 6-CH₃ | CH₃ | m.p.: 109–111° C. |
| Ib-14 | CH₃ | H | O | CH₃ | CH₃ | 6-CH₃ | t-C₄H₉ | oil |
| Ib-15 | CH₃ | CH₃ | O | CH₃ | CH₃ | 6-CH₃ | —CH=C(CH₃)₂ | m.p.: 88° C. |
| Ib-16 | CH₃ | CH₃ | O | CH₃ | CH₃ | 6-CH₃ | —CH₂—phenyl | oil |

TABLE 9-continued (Ib)

| Ex. No. | A | B | D | X | Y | $Z_n$ | $R^1$ | Physical constants |
|---|---|---|---|---|---|---|---|---|
| Ib-17 | phenyl | phenyl | O | $CH_3$ | $CH_3$ | 6-$CH_3$ | $CH_3$ | m.p.: 170-172° C. |
| Ib-18 | phenyl | phenyl | O | $CH_3$ | $CH_3$ | 6-$CH_3$ | t-$C_4H_9$ | m.p.: 128-130° C. |
| Ib-19 | | —(CH$_2$)$_5$— | O | $CH_3$ | $CH_3$ | 6-$CH_3$ | $C_2H_5$ | m.p.: 115-116 |
| Ib-20 | | —(CH$_2$)$_5$— | O | $CH_3$ | $CH_3$ | 6-$CH_3$ | $C_3$—$H_7$ | m.p.: 87-88° C. |
| Ib-21 | | —(CH$_2$)$_5$— | O | $CH_3$ | $CH_3$ | 6-$CH_3$ | —C(CH$_3$)$_2$—CH$_2$Cl | m.p.: 138° C. |
| Ib-22 | | —(CH$_2$)$_5$— | O | $CH_3$ | $CH_3$ | 6-$CH_3$ | —C(CH$_3$)$_2$—CH$_2$—OCH$_3$ | m.p.: 114-115° C. |
| Ib-23 | | —(CH$_2$)$_5$— | O | $CH_3$ | $CH_3$ | 6-$CH_3$ | —C(CH$_2$—OCH$_3$)(CH$_2$—OCH$_3$)(CH$_3$) | m.p.: 92-98° C. |
| Ib-24 | | —(CH$_2$)$_5$— | O | $CH_3$ | $CH_3$ | 6-$CH_3$ | —C(CH$_2$—OCH$_3$)(CH$_2$—OCH$_3$)(CH$_2$—OCH$_3$) | m.p.: 140-142° C. |
| Ib-25 | | —(CH$_2$)$_5$— | O | $CH_3$ | $CH_3$ | 6-$CH_3$ | —C(CH$_2$—OCH$_3$)(CH$_2$—OCH$_3$)(C$_2$H$_5$) | m.p.: 121-122° C. |

TABLE 9-continued

(Ib)

| Ex. No. | A | B | D | X | Y | $Z_n$ | $R^1$ | Physical constants |
|---|---|---|---|---|---|---|---|---|
| Ib-26 | —(CH$_2$)$_5$— | | O | CH$_3$ | CH$_3$ | 6-CH$_3$ | C(CH$_2$-OCH$_3$)$_2$(i-C$_3$H$_7$) | m.p.: 110–112° C. |
| Ib-27 | —(CH$_2$)$_5$— | | O | CH$_3$ | CH$_3$ | 6-CH$_3$ | —CH$_2$—C(CH$_3$)$_3$ | m.p.: 148–151° C. |
| Ib-28 | —(CH$_2$)$_5$— | | O | CH$_3$ | CH$_3$ | 6-CH$_3$ | —CH=C(CH$_3$)$_2$ | m.p.: 105–106° C. |
| Ib-29 | —(CH$_2$)$_5$— | | O | CH$_3$ | CH$_3$ | 6-CH$_3$ | cyclopropyl | m.p.: 102–103° C. |
| Ib-30 | —(CH$_2$)$_5$— | | O | CH$_3$ | CH$_3$ | 6-CH$_3$ | cyclohexyl | m.p.: 147–148° C. |
| Ib-31 | —(CH$_2$)$_5$— | | O | CH$_3$ | CH$_3$ | 6-CH$_3$ | phenyl | m.p.: 146° C. |
| Ib-32 | CH$_3$ | H | O | Cl | H | 6-Cl | t-C$_4$H$_9$ | m.p.: 60° C. |
| Ib-33 | CH$_3$ | CH$_3$ | O | Cl | H | 6-Cl | t-C$_4$H$_9$ | m.p.: 121° C. |
| Ib-34 | H | phenyl | O | Cl | Cl | H | t-C$_4$H$_9$ | m.p.: 104° C. |
| Ib-35 | CH$_3$ | CH$_3$ | O | Cl | Cl | H | —CH$_3$ | m.p.: 96° C. |
| Ib-36 | CH$_3$ | H | O | Cl | Cl | H | t-C$_4$H$_9$ | oil |

TABLE 9-continued (Ib)

[Structure: cyclic compound with O=C—R¹ ester group, A and B on one carbon, D in ring, attached to phenyl with X, Y, Z_n substituents]

| Ex. No. | A | B | D | X | Y | Z_n | R¹ | Physical constants |
|---|---|---|---|---|---|---|---|---|
| Ib-37 | CH₃ | C₆H₅ | O | Cl | H | 6-Cl | t-C₄H₉ | m.p.: 141° C. |
| Ib-38 | CH₃ | H | O | Cl | H | 6-Cl | t-C₄H₉ | m.p.: 91° C. |
| Ib-39 | CH₃ | C₆H₅ | O | Cl | Cl | H | t-C₄H₉ | m.p.: 197° C. |
| Ib-40 | CH₃ | —(CH₂)₅— | O | Cl | Cl | H | t-C₄H₉ | m.p.: 101-108° C. |
| Ib-41 | | —(CH₂)₅— | O | Cl | H | 6-Cl | t-C₄H₉ | m.p.: 193° C. |
| Ib-42 | | —(CH₂)₅— | O | Cl | H | 6-F | t-C₄H₉ | m.p.: 117° C. |
| Ib-43 | CH₃ | H | O | Cl | H | 6-F | t-C₄H₉ | m.p.: 91° C. |
| Ib-44 | C₆H₅ | H | O | Cl | H | 6-F | t-C₄H₉ | m.p.: 97° C. |
| Ib-45 | CH₃ | H | O | CH₃ | H | 6-Cl | —CH₃ | m.p.: 100° C. |
| Ib-46 | CH₃ | H | O | CH₃ | H | 6-Cl | C₂H₅ | m.p.: 77° C. |
| Ib-47 | CH₃ | CH₃ | O | CH₃ | H | 6-F | t-C₄H₉ | m.p.: 87° C. |
| Ib-48 | | —(CH₂)₅— | O | CH₃ | CH₃ | 6-CH₃ | | m.p.: 102-104° C. |
| Ib-49 | CH₃ | CF₃ | O | CH₃ | CH₃ | 6-CH₃ | —CH₂—C₆H₅ | oil |
| | | | | | | | t-C₄H₉ | |

TABLE 9-continued

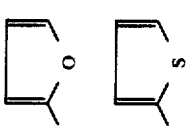

(Ib)

| Ex. No. | A | B | D | X | Y | $Z_n$ | $R^1$ | Physical constants |
|---|---|---|---|---|---|---|---|---|
| Ib-50 | | —(CH$_2$)$_5$— | O | CH$_3$ | CH$_3$ | 6-CH$_3$ | (furanyl) | m.p.: 132° C. |
| Ib-51 | | —(CH$_2$)$_5$— | O | CH$_3$ | CH$_3$ | 6-CH$_3$ | (thienyl) | m.p.: 141° C. |
| Ib-52 | CH$_3$ | i-C$_4$H$_9$ | O | CH$_3$ | CH$_3$ | 6-CH$_3$ | CH$_3$ | m.p.: 59–60° C. |
| Ib-53 | CH$_3$ | i-C$_4$H$_9$ | O | CH$_3$ | CH$_3$ | 6-CH$_3$ | t-C$_4$H$_9$ | oil |
| Ib-54 | (gem-dimethylcyclopropyl) | H | O | CH$_3$ | CH$_3$ | 6-CH$_3$ | CH$_3$ | m.p.: 132–133° C. |
| Ib-55 | (gem-dimethylcyclopropyl) | H | O | CH$_3$ | CH$_3$ | 6-CH$_3$ | t-C$_4$H$_9$ | m.p.: 155–157° C. |
| Ib-56 | CH$_3$ | i-C$_3$H$_7$ | O | CH$_3$ | CH$_3$ | 6-CH$_3$ | CH$_3$ | m.p.: 168° C. |
| Ib-57 | CH$_3$ | i-C$_3$H$_7$ | O | CH$_3$ | CH$_3$ | 6-CH$_3$ | t-C$_4$H$_9$ | oil |
| Ib-58 | | | O | CH$_3$ | CH$_3$ | 6-CH$_3$ | CH$_3$ | m.p.: 154–156° C. |
| Ib-59 | | (benzo-fused) | O | CH$_3$ | CH$_3$ | 6-CH$_3$ | t-C$_4$H$_9$ | m.p.: 134–132° C. |
| Ib-60 | H | —(CH$_2$)$_2$— | O | CH$_3$ | CH$_3$ | 6-CH$_3$ | CH$_3$ | m.p.: 114–117° C. |
| Ib-61 | H | —(CH$_2$)$_2$— | O | CH$_3$ | CH$_3$ | 6-CH$_3$ | t-C$_4$H$_9$ | m.p.: 115–117° C. |
| Ib-62 | | —(CH$_2$)$_9$—CH$_3$ | O | CH$_3$ | CH$_3$ | 6-CH$_3$ | CH$_3$ | oil |
| Ib-63 | | —(CH$_2$)$_9$—CH$_3$ | O | CH$_3$ | CH$_3$ | 6-CH$_3$ | t-C$_4$H$_9$ | oil |

TABLE 9-continued (Ib)

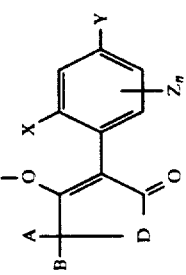

| Ex. No. | A | B | D | X | Y | $Z_n$ | $R^1$ | Physical constants |
|---|---|---|---|---|---|---|---|---|
| Ib-64 | H | H | O | $CH_3$ | $CH_3$ | 6-$CH_3$ | t-$C_4H_9$ | m.p.: 112° C. |
| Ib-65 | | | O | $CH_3$ | $CH_3$ | 6-$CH_3$ | i-$C_3H_7$ | oil |
| Ib-66 | —(CH$_2$)$_5$— | | O | $CH_3$ | $CH_3$ | 6-$CH_3$ | | m.p.: 134–136° C. |
| Ib-67 | —(CH$_2$)$_5$— | | O | $CH_3$ | $CH_3$ | 6-$CH_3$ | $CH_3$ | oil |
| Ib-68 | —CH$_2$—CH—(CH$_2$)$_3$— <br> \|<br>CH$_3$ | | O | $CH_3$ | $CH_3$ | 6-$CH_3$ | t-$C_4H_9$ | oil |
| Ib-69 | —CH$_2$—CH—(CH$_2$)$_3$— <br> \|<br>CH$_3$ | | O | $CH_3$ | $CH_3$ | 6-$CH_3$ | $CH_3$ | m.p.: 169–172° C. |
| Ib-70 | —(CH$_2$)$_4$— | | O | $CH_3$ | $CH_3$ | 6-$CH_3$ | t-$C_4H_9$ | m.p.: 48–65° C. |
| Ib-71 | —(CH$_2$)$_4$— | | O | $CH_3$ | $CH_3$ | 6-$CH_3$ | $CH_3$ | oil |
| Ib-72 | —CH$_2$—CH—(CH$_2$)$_3$— <br> \|<br>t-$C_4H_9$ | | O | $CH_3$ | $CH_3$ | 6-$CH_3$ | t-$C_4H_9$ | m.p.: 189–191° C. |
| Ib-73 | —CH$_2$—CH—(CH$_2$)$_3$— <br> \|<br>t-$C_4H_9$ | | O | $CH_3$ | $CH_3$ | 6-$CH_3$ | $CH_3$ | m.p.: 160–162° C. |
| Ib-74 | —(CH$_2$)$_6$— | | O | $CH_3$ | $CH_3$ | 6-$CH_3$ | t-$C_4H_9$ | m.p.: 91–93° C. |
| Ib-75 | —(CH$_2$)$_6$— | | O | $CH_3$ | $CH_3$ | 6-$CH_3$ | $CH_3$ | m.p.: 125° C. |
| Ib-76 | $C_2H_5$ | $C_2H_5$ | O | $CH_3$ | $CH_3$ | 6-$CH_3$ | t-$C_4H_9$ | m.p.: 77–79° C. |
| Ib-77 | | H | O | $CH_3$ | $CH_3$ | 6-$CH_3$ | $CH_3$ | oil |

TABLE 9-continued (Ib)

| Ex. No. | A | B | D | X | Y | $Z_n$ | $R^1$ | Physical constants |
|---|---|---|---|---|---|---|---|---|
| Ib-78 | cyclohexyl | H | O | $CH_3$ | $CH_3$ | 6-$CH_3$ | t-$C_4H_9$ | m.p.: 100–102° C. |
| Ib-79 | | $-(CH_2)_2-CH(CH_3)-(CH_2)_2-$ | O | $CH_3$ | $CH_3$ | 6-$CH_3$ | $CH_3$ | m.p.: 135–136° C. |
| Ib-80 | | $-(CH_2)_2-CH(CH_3)-(CH_2)_2-$ | O | $CH_3$ | $CH_3$ | 6-$CH_3$ | t-$C_4H_9$ | m.p.: 137–139° C. |
| Ib-81 | | $-(CH_2)_5-$ | O | $CH_3$ | $CH_3$ | 6-$CH_3$ | 4-(t-$C_4H_9$)-$C_6H_4$ | oil |
| Ib-82 | | $-(CH_2)_7-$ | O | $CH_3$ | $CH_3$ | 6-$CH_3$ | $CH_3$ | m.p.: 107–108° C. |
| Ib-83 | | $-(CH_2)_7-$ | O | $CH_3$ | $CH_3$ | 6-$CH_3$ | t-$C_4H_9$ | m.p.: 127–128° C. |
| Ib-84 | | $-(CH_2)_2-CH(C_6H_5)-(CH_2)_2-$ | O | $CH_3$ | $CH_3$ | 6-$CH_3$ | $CH_3$ | m.p.: 52° C. |
| Ib-85 | | $-(CH_2)_2-CH(C_6H_5)-(CH_2)_2-$ | O | $CH_3$ | $CH_3$ | 6-$CH_3$ | t-$C_4H_9$ | m.p.: 125–130° C. |
| Ib-86 | | $-(CH_2)_4-CH(CH_3)-$ | O | $CH_3$ | $CH_3$ | 6-$CH_3$ | $CH_3$ | m.p.: 139–142° C. |

TABLE 9-continued (Ib)

structure: O=C—R¹ attached via O to a ring containing A, B, D, with connection to phenyl bearing X, Y, Z_n

| Ex. No. | A | B | D | X | Y | Z_n | R¹ | Physical constants |
|---|---|---|---|---|---|---|---|---|
| Ib-87 | | —(CH₂)₄—CH—<br>  \|<br>  CH₃ | O | CH₃ | CH₃ | 6-CH₃ | t-C₄H₉ | oil |
| Ib-88 | C₂H₅ | CH₃ | O | CH₃ | CH₃ | 6-CH₃ | CH₃ | m.p.: 140–144° C. |
| Ib-89 | C₂H₅ | CH₃ | O | CH₃ | CH₃ | 6-CH₃ | t-C₄H₉ | oil |
| Ib-90 | t-C₄H₉ | H | O | CH₃ | CH₃ | 6-CH₃ | CH₃ | m.p.: 81–82° C. |
| Ib-91 | t-C₄H₉ | H | O | CH₃ | CH₃ | 6-CH₃ | t-C₄H₉ | m.p.: 78–79° C. |
| Ib-92 | | —CH₂—C(CH₃)₂—CH₂—CH—<br>                                \|<br>                                CH₃ | O | CH₃ | CH₃ | 6-CH₃ | CH₃ | oil |
| Ib-93 | | —CH₂—C(CH₃)₂—CH₂—CH—<br>                                \|<br>                                CH₃ | O | CH₃ | CH₃ | 6-CH₃ | t-C₄H₉ | |
| Ib-94 | H₂C=CH— | CH₃ | O | CH₃ | CH₃ | 6-CH₃ | CH₃ | m.p.: 116° C. |
| Ib-95 | H₂C=CH— | CH₃ | O | CH₃ | CH₃ | 6-CH₃ | t-C₄H₉ | oil |
| Ib-96 | | —(CH₂)₅— | O | Cl | CF₃ | 6-Cl | CH₃ | m.p.: 166–168° C. |
| Ib-97 | | —(CH₂)₅— | O | Cl | CF₃ | 6-Cl | t-C₄H₉ | m.p.: 185° C. |
| Ib-98 | | —(CH₂)₅— | O | Cl | CF₃ | 6-Cl | 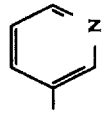 | m.p.: 144–146° C. |
| Ib-99 | H | i-C₃H₇ | O | CH₃ | CH₃ | 6-CH₃ | CH₃ | m.p.: 99–100° C. |
| Ib-100 | H | i-C₃H₇ | O | CH₃ | CH₃ | 6-CH₃ | t-C₄H₉ | oil |
| Ib-101 | CH₃ | CH₃ | CH₃ | CH₃ | CH₃ | 6-CH₃ | t-C₄H₉ | m.p.: 112–113° C. |
| Ib-102 | | —(CH₂)₅— | O | Cl | Cl | H | 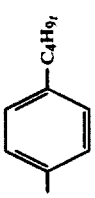 | m.p.: 89° C. |

TABLE 9-continued

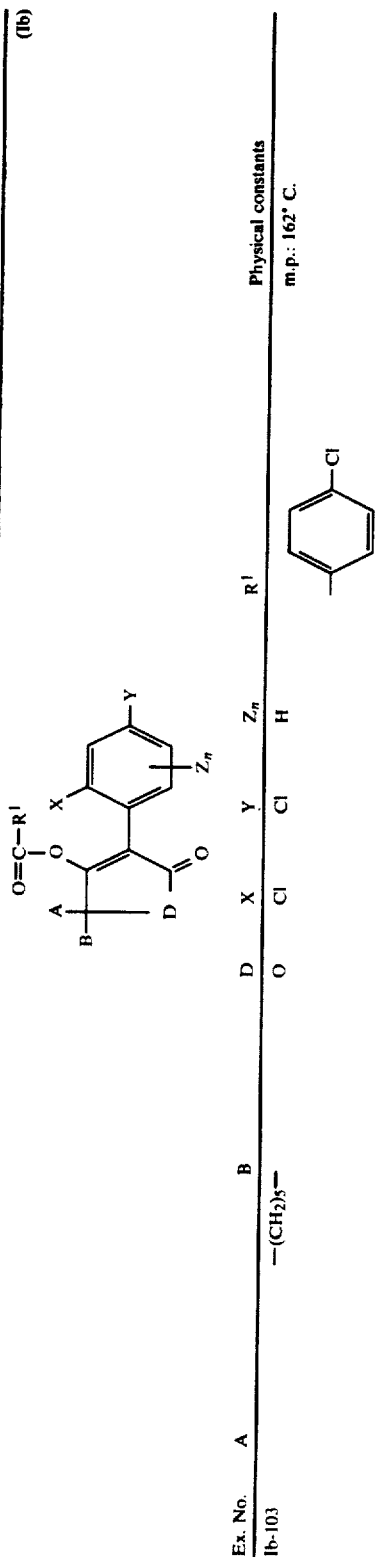
(Ib)

| Ex. No. | A | B | D | X | Y | $Z_n$ | $R^1$ | Physical constants |
|---|---|---|---|---|---|---|---|---|
| Ib-103 | | —(CH$_2$)$_5$— | O | Cl | Cl | H | 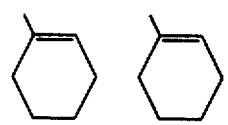 | m.p.: 162° C. |
| Ib-104 | | —(CH$_2$)$_5$— | O | Cl | Cl | H | —C$_7$H$_{14}$—CH=CH—C$_8$H$_{17}$ | oil |
| Ib-105 | | —(CH$_2$)$_5$— | O | Cl | Cl | H | adamantyl | m.p.: 182° C. |
| Ib-106 | | —(CH$_2$)$_5$— | O | Cl | Cl | H | H$_3$C-(3,5-dimethylphenyl)-CH$_3$ | m.p.: 107–110° C. |
| Ib-107 | | —(CH$_2$)$_5$— | O | Cl | Cl | H | C$_4$H$_{9sec}$ | m.p.: 105–106° C. |
| Ib-108 | | —(CH$_2$)$_5$— | O | Cl | Cl | H | —CH$_2$—CH—C$_4$H$_{9n}$ \| C$_2$H$_5$ | oil |
| Ib-109 | | —(CH$_2$)$_5$— | O | CH$_3$ | CH$_3$ | 6-CH$_3$ | —CH—C$_4$H$_{9n}$ \| C$_2$H$_5$ | m.p.: 57–59° C. |
| Ib-110 | (methylcyclohexenyl) | H | O | CH$_3$ | CH$_3$ | 6-CH$_3$ | CH$_3$ | m.p.: 104° C. |
| Ib-111 | (methylcyclohexenyl) | H | O | CH$_3$ | CH$_2$ | 6-CH$_3$ | C$_4$H$_{9t}$ | oil |

TABLE 9-continued (Ib)

[Structure: O=C-R¹ attached via O to a cyclic system with A, B, D positions, connected to phenyl ring bearing X, Y, and Z_n substituents]

| Ex. No. | A | B | D | X | Y | Z_n | R¹ | Physical constants |
|---|---|---|---|---|---|---|---|---|
| Ib-112 | -CH₂-C₆H₅ (phenethyl) | CH₃ | O | CH₃ | CH₃ | 6-CH₃ | CH₃ | m.p.: 88° C. |
| Ib-113 | -CH₂-C₆H₅ (phenethyl) | CH₃ | O | CH₃ | CH₃ | 6-CH₃ | CH₃ | m.p.: 99° C. |
| Ib-114 | -(CH₂)₅- | | O | CH₃ | CH₃ | 3F, 6-CH₃ | CH₃ | m.p.: 94° C. |
| Ib-115 | -(CH₂)₅- | | O | CH₃ | CH₃ | 3F, 6-CH₃ | C₄H₉ᵢ | m.p.: 120–121° C. |
| Ib-116 | cyclohexene | | O | CH₃ | CH₃ | 6-CH₃ | CH₃ | m.p.: 188–189° C. |
| Ib-117 | cycloheptene | | O | CH₃ | CH₃ | 6-CH₃ | C₄H₉ᵢ | m.p.: 131° C. |
| Ib-118 | -CH₂-C₆H₅ | -CH₂-C₆H₅ | O | CH₃ | CH₃ | 6-CH₃ | C₄H₉ᵢ | m.p.: 141–143° C. |
| Ib-119 | | -(CH₂)₅- | O | Cl | Cl | H | -C(CH₃)₂-C₂H₅ | m.p.: 85–87° C. |
| Ib-120 | | -(CH₂)₅- | O | Cl | Cl | H | -C(CH₃)₂CH(CH₃)₂ | m.p.: 123–125° C. |
| Ib-121 | | -(CH₂)₅- | O | Cl | Cl | H | -C(CH₃)₂-CH₂Cl | m.p.: 110–112° C. |
| Ib-122 | | -(CH₂)₅- | O | Cl | Cl | H | cyclopropyl-Cl | oil |
| Ib-123 | | -(CH₂)₅- | O | Cl | CF₃ | 6-F | -C(CH₃)₃ | m.p.: 132–135° C. |

TABLE 10

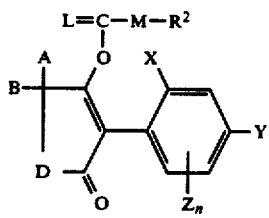

(Ic)

| Ex. No. | A | B | D | X | Y | $Z_n$ | L | M | $R^2$ | Physical constants |
|---|---|---|---|---|---|---|---|---|---|---|
| Ic-1 | CH₃ | CH₃ | O | CH₃ | CH₃ | 6-CH₃ | O | O | C₂H₅ | oil |
| Ic-2 | CH₃ | CH₃ | O | CH₃ | CH₃ | 6-CH₃ | O | O | i-C₄H₉ | oil |
| Ic-3 | CH₃ | CH₃ | O | CH₃ | CH₃ | 6-CH₃ | O | O | s-C₄H₉ | oil |
| Ic-4 | CH₃ | H | O | CH₃ | CH₃ | 6-CH₃ | O | O | C₂H₅ | oil |
| Ic-5 | CH₃ | H | O | CH₃ | CH₃ | 6-CH₃ | O | O | i-C₃H₇ | oil |
| Ic-6 | CH₃ | CH₃ | O | CH₃ | CH₃ | 6-CH₃ | O | O | —CH₂—C(C₂H₅)(n-C₄H₉) | oil |
| Ic-7 | CH₃ | CH₃ | O | CH₃ | CH₃ | 6-CH₃ | O | S | —CH₂C(CH₃)₃ | m.p.: 92–94° C. |
| Ic-8 | phenyl | H | O | CH₃ | CH₃ | 6-CH₃ | O | O | C₂H₅ | oil |
| Ic-9 | phenyl | H | O | CH₃ | CH₃ | 6-CH₃ | O | O | i-C₃H₇ | oil |
| Ic-10 | CH₃ | CH₃ | O | CH₃ | CH₃ | 6-CH₃ | O | O | CH₃ | m.p.: 123–124° C. |
| Ic-11 | CH₃ | CH₃ | O | CH₃ | CH₃ | 6-CH₃ | O | O | t-C₄H₉ | m.p.: 168° C. |
| Ic-12 | —(CH₂)₅— | | O | CH₃ | CH₃ | 6-CH₃ | O | O | CH₃ | m.p.: 146–147° C. |
| Ic-13 | —(CH₂)₅— | | O | CH₃ | CH₃ | 6-CH₃ | O | O | CH₂—CH(C₂H₅)—C₄H₉ | oil |
| Ic-14 | —(CH₂)₅— | | O | CH₃ | CH₃ | 6-CH₃ | O | O | i-C₃H₇ | m.p.: 142–143° C. |
| Ic-15 | —(CH₂)₅— | | O | CH₃ | CH₃ | 6-CH₃ | O | O | phenyl | m.p.: 112–114° C. |
| Ic-16 | —(CH₂)₅— | | O | CH₃ | CH₃ | t-C₄H₉ | | | | m.p.: 128–132° C. |
| Ic-17 | —(CH₂)₅— | | O | CH₃ | CH₃ | 6-CH₃ | O | S | —CH₂C(CH₃)₃ | m.p.: 129–131° C. |
| Ic-18 | —(CH₂)₅— | | O | CH₃ | CH₃ | 6-CH₃ | O | S | i-C₃H₇ | m.p.: 126–127° C. |
| Ic-19 | —(CH₂)₅— | | O | CH₃ | CH₃ | 6-CH₃ | O | O | i-C₃H₇ | oil |
| Ic-20 | —(CH₂)₅— | | | | | | | | | |
| Ic-21 | CH₃ | CH₃ | O | CH₃ | CH₃ | 6-CH₃ | S | S | CH₃ | m.p.: 91° C. |
| Ic-22 | —(CH₂)₅— | | O | CH₃ | CH₃ | 6-CH₃ | O | O | i-C₄H₉ | m.p.: 96–97° C. |
| Ic-23 | —(CH₂)₅— | | O | CH₃ | CH₃ | 6-CH₃ | O | O | i-C₄H₉ | m.p.: 96–97° C. |
| Ic-24 | —CH₂—CH(CH₃)—(CH₂)₃— | | O | CH₃ | CH₃ | 6-CH₃ | O | O | CH₃ | oil |
| Ic-25 | —CH₂—CH(CH₃)—(CH₂)₃— | | O | CH₃ | CH₃ | 6-CH₃ | O | O | i-C₃H₇ | oil |
| Ic-26 | —(CH₂)₄— | | O | CH₃ | CH₃ | 6-CH₃ | O | O | CH₃ | m.p.: 117–119° C. |
| Ic-27 | —(CH₂)₄— | | O | CH₃ | CH₃ | 6-CH₃ | O | O | i-C₃H₇ | m.p.: 120–122° C. |
| Ic-28 | —(CH₂)₂—C(t-C₄H₉)—(CH₂)₂— | | O | CH₃ | CH₃ | 6-CH₃ | O | O | CH₃ | oil |

TABLE 10-continued

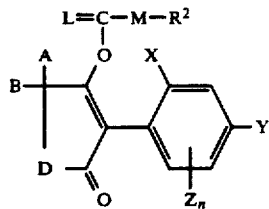
(Ic)

| Ex. No. | A | B | D | X | Y | $Z_n$ | L | M | $R^2$ | Physical constants |
|---|---|---|---|---|---|---|---|---|---|---|
| Ic-29 | —(CH$_2$)$_2$—C(t-C$_4$H$_9$)—(CH$_2$)$_2$— | | O | CH$_3$ | CH$_3$ | 6-CH$_3$ | O | O | i-C$_3$H$_7$ | oil |
| Ic-30 | | —(CH$_2$)$_6$— | O | CH$_3$ | CH$_3$ | 6-CH$_3$ | O | O | CH$_3$ | m.p.: 99–104° C. |
| Ic-31 | | —(CH$_2$)$_6$— | O | CH$_3$ | CH$_3$ | 6-CH$_3$ | O | O | i-C$_3$H$_7$ | m.p.: 43–47° C. |
| Ic-32 | C$_2$H$_5$ | C$_2$H$_5$ | O | CH$_3$ | CH$_3$ | 6-CH$_3$ | O | O | CH$_3$ | m.p.: 43–47° C. |
| Ic-33 | C$_2$H$_5$ | C$_2$H$_5$ | O | CH$_3$ | CH$_3$ | 6-CH$_3$ | O | O | i-C$_3$H$_7$ | oil |
| Ic-34 | cyclohexyl | H | O | CH$_3$ | CH$_3$ | 6-CH$_3$ | O | O | CH$_3$ | oil |
| Ic-35 | cyclohexyl | H | O | CH$_3$ | CH$_3$ | 6-CH$_3$ | O | O | i-C$_3$H$_7$ | oil |
| Ic-36 | —(CH$_2$)$_2$—C(CH$_3$)—(CH$_2$)$_2$— | | O | CH$_3$ | CH$_3$ | 6-CH$_3$ | O | O | CH$_3$ | m.p.: 100–102° C. |
| Ic-37 | —(CH$_2$)$_2$—C(CH$_3$)—(CH$_2$)$_2$— | | O | CH$_3$ | CH$_3$ | 6-CH$_3$ | O | O | i-C$_3$H$_7$ | m.p.: 104° C. |
| Ic-38 | | —(CH$_2$)$_7$— | O | CH$_3$ | CH$_3$ | 6-CH$_3$ | O | O | CH$_3$ | m.p.: 85–88° C. |
| Ic-39 | | —(CH$_2$)$_7$— | O | CH$_3$ | CH$_3$ | 6-CH$_3$ | O | O | i-C$_3$H$_7$ | m.p.: 97° C. |
| Ic-40 | —(CH$_2$)$_2$—C(C$_6$H$_5$)—(CH$_2$)$_2$— | | O | CH$_3$ | CH$_3$ | 6-CH$_3$ | O | O | CH$_3$ | oil |
| Ic-41 | —(CH$_2$)$_2$—C(C$_6$H$_5$)—(CH$_2$)$_2$— | | O | CH$_3$ | CH$_3$ | 6-CH$_3$ | O | O | i-C$_3$H$_7$ | oil |
| Ic-42 | C$_2$H$_5$ | CH$_3$ | O | CH$_3$ | CH$_3$ | 6-CH$_3$ | O | O | CH$_3$ | m.p.: 110–120° C. |
| Ic-43 | C$_2$H$_5$ | CH$_3$ | O | CH$_3$ | CH$_3$ | 6-CH$_3$ | O | O | i-C$_3$H$_7$ | oil |
| Ic-44 | —CH$_2$—C(CH$_3$)$_2$—CH$_2$—CH(CH$_3$)—CH$_2$— | | O | CH$_3$ | CH$_3$ | 6-CH$_3$ | O | O | CH$_3$ | oil |
| Ic-45 | —CH$_2$—C(CH$_3$)$_2$—CH$_2$—CH(CH$_3$)—CH$_2$— | | O | CH$_3$ | CH$_3$ | 6-CH$_3$ | O | O | i-C$_3$H$_7$ | m.p.: 141–145° C. |
| Ic-46 | t-C$_4$H$_9$ | H | O | CH$_3$ | CH$_3$ | 6-CH$_3$ | O | O | CH$_3$ | m.p.: 94–95° C. |
| Ic-47 | —CH=CH$_2$ | CH$_3$ | O | CH$_3$ | CH$_3$ | 6-CH$_3$ | O | O | CH$_3$ | m.p.: 53–56° C. |
| Ic-48 | —CH=CH$_2$ | CH$_3$ | O | CH$_3$ | CH$_3$ | 6-CH$_3$ | O | O | i-C$_3$H$_7$ | m.p.: 63–65° C. |
| Ic-49 | t-C$_4$H$_9$ | H | O | CH$_3$ | CH$_3$ | 6-CH$_3$ | O | O | i-C$_3$H$_7$ | m.p.: 88–89° C. |

TABLE 10-continued (Ic)

$$L=C-M-R^2$$

Structure with substituents A, B, D on left ring; X, Y, Z_n on right phenyl ring.

| Ex. No. | A | B | D | X | Y | $Z_n$ | L | M | $R^2$ | Physical constants |
|---|---|---|---|---|---|---|---|---|---|---|
| Ic-50 | phenyl | phenyl | O | CH$_3$ | CH$_3$ | 6-CH$_3$ | O | O | C$_2$H$_5$ | m.p.: 136° C. |
| Ic-51 | CH$_3$ | CH$_3$ | O | CH$_3$ | CH$_3$ | 6-CH$_3$ | O | O | phenyl | oil |
| Ic-52 | i-C$_4$H$_9$ | CH$_3$ | O | CH$_3$ | CH$_3$ | 6-CH$_3$ | O | O | CH$_3$ | oil |
| Ic-53 | i-C$_4$H$_9$ | CH$_3$ | O | CH$_3$ | CH$_3$ | 6-CH$_6$ | O | O | i-C$_3$H$_7$ | oil |
| Ic-54 | (H$_3$C)(H$_3$C)(H$_3$C)-cyclopropyl-CH$_3$ | CH$_3$ | H | O | CH$_3$ | CH$_3$ | 6-CH$_3$ | O | O | CH$_3$ | m.p.: 125-126° C. |
| Ic-55 | (H$_3$C)(H$_3$C)(H$_3$C)-cyclopropyl-CH$_3$ | CH$_3$ | H | O | CH$_3$ | CH$_3$ | 6-CH$_3$ | O | O | i-C$_3$H$_7$ | m.p.: 105-107° C. |
| Ic-56 | i-C$_3$H$_7$ | CH$_3$ | O | CH$_3$ | CH$_3$ | 6-CH$_3$ | O | O | CH$_3$ | m.p.: 118° C. |
| Ic-57 | i-C$_3$H$_7$ | CH$_3$ | O | CH$_3$ | CH$_3$ | 6-CH$_3$ | O | O | i-C$_3$H$_7$ | m.p.: 130° C. |
| Ic-58 | 2,3-diethylphenyl | | O | CH$_3$ | CH$_3$ | 6-CH$_3$ | O | O | CH$_3$ | m.p.: 130-131° C. |
| Ic-59 | 2,3-diethylphenyl | | O | CH$_3$ | CH$_3$ | 6-CH$_3$ | O | O | i-C$_3$H$_7$ | m.p.: 135-136° C. |
| Ic-60 | —(CH$_2$)$_5$— | | O | Cl | CF$_3$ | 6-Cl | O | O | CH$_3$ | m.p.: 151° C. |
| Ic-61 | —(CH$_2$)$_5$— | | O | Cl | CF$_3$ | 6-Cl | O | O | i-C$_3$H$_7$ | m.p.: 162-163° C. |
| Ic-62 | i-C$_3$H$_7$ | H | O | CH$_3$ | CH$_3$ | 6-CH$_3$ | O | O | CH$_3$ | m.p.: 103-104° C. |
| Ic-63 | i-C$_3$H$_7$ | H | O | CH$_3$ | CH$_3$ | 6-CH$_3$ | O | O | i-C$_3$H$_7$ | m.p.: 65-67° C. |
| Ic-64 | phenyl-(CH$_2$)$_2$— | CH$_3$ | O | CH$_3$ | CH$_3$ | 6-CH$_3$ | O | O | CH$_3$ | oil |
| Ic-65 | phenyl-(CH$_2$)$_2$— | CH$_3$ | O | CH$_3$ | CH$_3$ | 6-CH$_3$ | O | O | i-C$_3$H$_7$ | oil |

TABLE 11

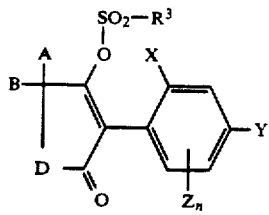

(Id)

| Ex. No. | A | B | D | X | Y | $Z_n$ | $R^3$ | Physical constants |
|---|---|---|---|---|---|---|---|---|
| Id-1 | $CH_3$ | $CH_3$ | O | $CH_3$ | $CH_3$ | 6-$CH_3$ | $CH_3$ | m.p.: 158–160° C. |
| Id-2 | $CH_3$ | $CH_3$ | O | $CH_3$ | $CH_3$ | 6-$CH_3$ | —⟨C₆H₄⟩—$CH_3$ | m.p.: 130–133° C. |
| Id-3 | $CH_3$ | $CH_3$ | O | $CH_3$ | $CH_3$ | 6-$CH_3$ | —$N(CH_3)_2$ | oil |
| Id-4 | —$(CH_2)_5$— | | O | $CH_3$ | $CH_3$ | 6-$CH_3$ | $CH_3$ | m.p.: 133–134° C. |
| Id-5 | —$(CH_2)_5$— | | O | $CH_3$ | $CH_3$ | 6-$CH_3$ | —⟨C₆H₄⟩—$CH_3$ | m.p.: 152° C. |
| Id-6 | —$(CH_2)_5$— | | O | $CH_3$ | $CH_3$ | 6-$CH_3$ | —$N(CH_3)_2$ | m.p.: 100–104° C. |

TABLE 12

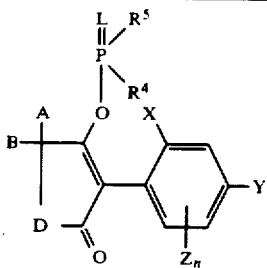

(Ie)

| Ex. No. | A | B | D | X | Y | $Z_n$ | L | $R^4$ | $R^5$ | Physical constants |
|---|---|---|---|---|---|---|---|---|---|---|
| Ie-1 | $CH_3$ | $CH_3$ | O | $CH_3$ | $CH_3$ | 6-$CH_3$ | S | —$OC_2H_5$ | —$SC_2H_5$ | m.p.: 60° C. |
| Ie-2 | $CH_3$ | $CH_3$ | O | $CH_3$ | $CH_3$ | 6-$CH_3$ | S | —$CH_3$ | —$OC_4H_9$-n | m.p.: 64° C. |
| Ie-3 | $CH_3$ | $CH_3$ | O | $CH_3$ | $CH_3$ | 6-$CH_3$ | S | —$C_2H_5$ | —$SC_4H_9$-n | $n_D^{20}$: 1.5425 |
| Ie-4 | $CH_3$ | $CH_3$ | O | $CH_3$ | $CH_3$ | 6-$CH_3$ | S | —$CH_3$ | —$SC_4H_9$-i | m.p.: 63° C. |
| Ie-5 | $CH_3$ | $CH_3$ | O | $CH_3$ | $CH_3$ | 6-$CH_3$ | S | —$C_2H_5$ | —$OC_2H_5$ | m.p.: 104° C. |
| Ie-6 | $CH_3$ | $CH_3$ | O | $CH_3$ | $CH_3$ | 6-$CH_3$ | S | —$OC_2H_5$ | —$OC_2H_5$ | m.p.: 60° C. |
| Ie-7 | $CH_3$ | $CH_3$ | O | $CH_3$ | $CH_3$ | 6-$CH_3$ | S | —$C_2H_5$ | —$NHC_4H_9$-s | m.p.: 108° C. |
| Ie-8 | $CH_3$ | $CH_3$ | O | $CH_3$ | $CH_3$ | 6-$CH_3$ | S | —$C_2H_5$ | —O—⟨C₆H₅⟩ | m.p.: 150° C. |
| Ie-9 | —$(CH_2)_5$— | | O | $CH_3$ | $CH_3$ | 6-$CH_3$ | S | —$C_2H_5$ | —$SC_4H_9$-n | $n_D^{20}$: 1.5550 |
| Ie-10 | —$(CH_2)_5$— | | O | $CH_3$ | $CH_3$ | 6-$CH_3$ | S | —$CH_3$ | —$OC_4H_9$-s | $n_D^{20}$: 1.5367 |
| Ie-11 | —$(CH_2)_5$— | | O | $CH_3$ | $CH_3$ | 6-$CH_3$ | S | —$C_2H_5$ | —$OC_2H_5$ | m.p.: 126° C. |
| Ie-12 | —$(CH_2)_5$— | | O | $CH_3$ | $CH_3$ | 6-$CH_3$ | S | —$OC_2H_5$ | —$NHC_4H_9$-s | m.p.: 114° C. |
| Ie-13 | —$(CH_2)_5$— | | O | $CH_3$ | $CH_3$ | 6-$CH_3$ | S | —$OC_2H_5$ | —NH—$CH_3$ | m.p.: 126° C. |
| Ie-14 | —$(CH_2)_5$— | | O | $CH_3$ | $CH_3$ | 6-$CH_3$ | S | —$OC_2H_5$ | —$OC_2H_5$ | m.p.: 100° C. |
| Ie-15 | —$(CH_2)_5$— | | O | $CH_3$ | $CH_3$ | 6-$CH_3$ | S | —$OC_2H_5$ | —NH—$C_3H_7$-i | |
| Ie-16 | —$(CH_2)_5$— | | O | $CH_3$ | $CH_3$ | 6-$CH_3$ | S | —$C_2H_5$ | —$NHC_4H_9$-s | m.p.: 122° C. |
| Ie-17 | $CH_3$ | $CH_3$ | O | $CH_3$ | $CH_3$ | 6-$CH_3$ | S | —$C_2H_5$ | —$SC_4H_9$ | m.p.: 68° C. |
| Ie-18 | —$(CH_2)_5$— | | O | $CH_3$ | $CH_3$ | 6-$CH_3$ | S | —$CH_3$ | —$SC_4H_9$-t | m.p.: 46° C. |
| Ie-19 | —$(CH_2)_5$— | | O | $CH_3$ | $CH_3$ | 6-$CH_3$ | S | —$OC_2H_5$ | —$SC_3H_7$-n | $n_D^{20}$: 1.5445 |
| Ie-20 | —$(CH_2)_5$— | | O | $CH_3$ | $CH_3$ | 6-$CH_3$ | S | —⟨C₆H₅⟩ | —$SC_4H_9$-s | |

TABLE 12-continued

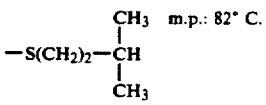

(Ie)

| Ex. No. | A | B | D | X | Y | $Z_n$ | L | $R^4$ | $R^5$ | Physical constants |
|---|---|---|---|---|---|---|---|---|---|---|
| Ie-21 | —(CH$_2$)$_5$— | | O | CH$_3$ | CH$_3$ | 6-CH$_3$ | S | —C$_2$H$_5$ | —SC$_3$H$_7$-i | $n_D^{20}$: 1.5510 |
| Ie-22 | —(CH$_2$)$_5$— | | O | CH$_3$ | CH$_3$ | 6-CH$_3$ | S | —CH$_3$ | —SC$_2$H$_5$ | m.p.: 90° C. |
| Ie-23 | —(CH$_2$)$_5$— | | O | CH$_3$ | CH$_3$ | 6-CH$_3$ | S | —CH$_3$ | —SC$_4$H$_9$-s | $n_D^{20}$: 1.5175 |
| Ie-24 | —(CH$_2$)$_5$— | | O | CH$_3$ | CH$_3$ | 6-CH$_3$ | S | —C$_2$H$_5$ | —SC$_4$H$_9$-t | m.p.: 151° C. |
| Ie-25 | —(CH$_2$)$_5$— | | O | CH$_3$ | CH$_3$ | 6-CH$_3$ | S | —C$_2$H$_5$ | —C$_4$H$_9$-s | $n_D^{20}$: 1.5610 |
| Ie-26 | —(CH$_2$)$_5$— | | O | CH$_3$ | CH$_3$ | 6-CH$_3$ | S | —CH$_3$ | —OC$_4$H$_9$-i | $n_D^{20}$: 1.4965 |
| Ie-27 | —(CH$_2$)$_5$— | | O | CH$_3$ | CH$_3$ | 6-CH$_3$ | S | —CH$_3$ | —OCH$_2$C(CH$_3$)$_3$ | $n_D^{20}$: 1.5300 |
| Ie-28 | —(CH$_2$)$_5$— | | O | CH$_3$ | CH$_3$ | 6-CH$_3$ | S | —CH$_3$ | —OC$_4$H$_9$-n | m.p.: 103° C. |
| Ie-29 | —(CH$_2$)$_5$— | | O | CH$_3$ | CH$_3$ | 6-CH$_3$ | S | —CH$_3$ | —S(CH$_2$)$_2$—CH(CH$_3$)CH$_3$ | m.p.: 82° C. |
| Ie-30 | —(CH$_2$)$_5$— | | O | CH$_3$ | CH$_3$ | 6-CH$_3$ | S | —OC$_2$H$_5$ | —OC$_3$H$_7$-i | |
| Ie-31 | —(CH$_2$)$_5$— | | O | CH$_3$ | CH$_3$ | 6-CH$_3$ | S | —OC$_2$H$_5$ | —OC$_4$H$_9$-s | $n_D^{20}$: 1.5357 |
| Ie-32 | —(CH$_2$)$_5$— | | O | CH$_3$ | CH$_3$ | 6-CH$_3$ | S | —CH$_3$ | —SC$_4$H$_9$-s | m.p.: 98° C. |
| Ie-33 | —(CH$_2$)$_5$— | | O | CH$_3$ | CH$_3$ | 6-CH$_3$ | S | —C$_2$H$_5$ | —S(CH$_2$)$_2$—CH(CH$_3$)CH$_3$ | m.p.: 87° C. |
| Ie-34 | —(CH$_2$)$_5$— | | O | CH$_3$ | CH$_3$ | 6-CH$_3$ | S | —CH$_3$ | —SC$_5$H$_{11}$-n | |
| Ie-35 | —(CH$_2$)$_5$— | | O | CH$_3$ | CH$_3$ | 6-CH$_3$ | S | —CH$_3$ | —SC$_3$H$_7$ | |
| Ie-36 | —(CH$_2$)$_5$— | | O | CH$_3$ | CH$_3$ | 6-CH$_3$ | S | —CH$_3$ | —OC$_2$H$_5$ | |
| Ie-37 | —(CH$_2$)$_5$— | | O | CH$_3$ | CH$_3$ | 6-CH$_3$ | S | —CH$_3$ | —OC$_3$H$_7$-i | |
| Ie-38 | —(CH$_2$)$_5$— | | O | CH$_3$ | CH$_3$ | 6-CH$_3$ | S | —OC$_2$H$_5$ | —OC$_2$H$_5$ | |
| Ie-39 | —(CH$_2$)$_4$— | | O | CH$_3$ | CH$_3$ | 6-CH$_3$ | O | —C$_2$H$_5$ | —OC$_2$H$_5$ | |

TABLE 13

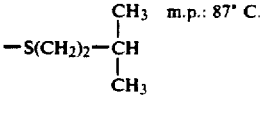

(Ig)

| Ex. No. | A | B | D | X | Y | $Z_n$ | $E^\oplus$ | Physical constants |
|---|---|---|---|---|---|---|---|---|
| Ig-1 | —(CH$_2$)$_5$— | | O | CH$_3$ | CH$_3$ | 6-CH$_3$ | Na$^\oplus$ | m.p.: >260° C. |

Preparation of starting compounds:

Example 1A

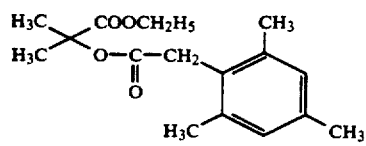

13.2 g (0.1 mol) of ethyl 2-hydroxyisobutyrate are introduced into 200 ml of absolute methylene chloride, 12.14 g (0.12 mol) of triethylamine are added, and a solution of 19.7 g (0.1 mol) of 2,4,6-trimethylphenylacetic acid chloride in 50 ml of absolute methylene chloride is added dropwise at 0°–10° C.

After the solution has been stirred for 16 hours at room temperature, it is washed with aqueous citric acid and aqueous sodium hydrogen carbonate solution, and the organic phase is dried over sodium sulphate and evaporated on a rotary evaporator.

Yield: 26.62 g (91% of theory) of the compound of the formula given above. The compound is obtained in the form of an oil.

Example 2A

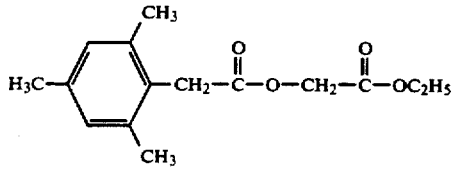

35.6 g (0.2 mol) of 2,4,6-trimethylphenylacetic acid are dissolved in 200 ml of tert.-butanol. 24.6 g (0.22 mol) of potassium tert.-butylate are added to this solution. The solution is stirred for 15 minutes. 34.9 g (0.2 mol) of ethyl bromoacetate are subsequently added dropwise.

After evaporation on a rotary evaporator, the residue is taken up in water/methylene chloride, the mixture is extracted, and the extract is dried over sodium sulphate and evaporated on a rotary evaporator.

Yield: 38.8 g (74% of theory) of the compound methyl O-(2,4,6-trimethylphenylacetyl)-hydroxy-acetate of melting point 154° C. (recrystallised from a mixture of methylene chloride/n-hexane).

The following were prepared analogously:

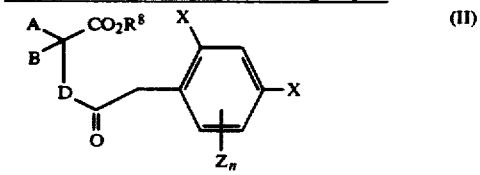

(II)

| Ex. No. | A | B | D | X | Y | $Z_n$ | $R^8$ | m.p. °C. |
|---|---|---|---|---|---|---|---|---|
| 3A | CH₃ | H | O | CH₃ | CH₃ | 6-CH₃ | C₂H₅ | |
| 4A | CH₃ | H | S | CH₃ | CH₃ | 6-CH₃ | C₂H₅ | |
| 5A | CH₃ | CH₃ | O | CH₃ | CH₃ | 6-CH₃ | C₂H₅ | |
| 6A | —(CH₂)₅— | | O | CH₃ | CH₃ | 6-CH₃ | C₂H₅ | |
| 7A | (cyclohexyl) | H | O | CH₃ | CH₃ | 6-CH₃ | C₂H₅ | |

The active compounds are suitable for controlling animal pests, particularly insects and arachnids, encountered in agriculture, in forests, in the protection of stored products and materials and in the hygiene field, while being well tolerated by plants and having favourable toxicity to warm-blooded animals. They are active against normally sensitive and resistant species and against all or some stages of development. The above-mentioned pests include:

From the order of the Isopoda, for example, *Oniscus asellus, Armadillidium vulgare* and *Porcellio scaber.* From the order of the Diplopoda, for example, *Blaniulus guttulatus.* From the order of the Chilopoda, for example, *Geophilus carpophagus* and *Scutigera* spec. From the order of the Symphyla, for example, *Scutigerella immaculata.* From the order of the Thysanura, for example, *Lepisma saccharina.* From the order of the Collembola, for example, *Onychiurus armatus.*

From the order of the Orthoptera, for example, *Blatta orientalis, Periolaneta americana, Leucophaea maderae, Blattella germanica, Acheta domesticus,* Gryllotalpa spp., Locusta migratoria migratorioides, Melanoplus differentialis and *Schistocerca greqaria.* From the order of the Dermaptera, for example, i Forficula auricularia. From the order of the Isoptera, for example, Reticulitermes spp.. From the order of the Anoplura, for example, *Phylloxera vastatrix,* Pemphigus spp., *Pediculus humanus corporis,* Haematopinus spp. and Linognathus spp. From the order of the Mallophaga, for example, Trichodectes spp. and Damalinea spp.

From the order of the Thysanoptera, for example, *Hercinothrips femoralis* and *Thrips tabaci.* From the order of the Heteroptera, for example, Eurygaster spp., *Dysdercus intermedius, Piesma quadrata, Cimex lectularius, Rhodnius prolixus* and Triatoma spp. From the order of the Homoptera, for example, *Aleurodes brassicae, Bemisia tabaci, Trialeurodes vaporariorum, Aphis gossypii, Brevicoryne brassicae, Cryptomyzus ribis, Doralis fabae, Doralis pomi, Eriosoma lanigerum, Hyalopterus arundinis, Macrosiphum avenae,* Myzus spp., *Phorodon humuli, Rhopalosiphum padi,* Empoasca spp., *Euscelis bilobatus, Nephotettix cincticeps, Lecanium corni, Saissetia oleae, Laodelphax striatellus; Nilaparvata lugens, Aonidiella aurantii, Aspidiotus hederae,* Pseudococcus spp. and Psylla spp. From the order of the Lepidoptera, for example, *Pectinophora gossypiella, Bupalus piniarius, Cheimatobia brumata, Lithocolletis blancardella, Hyponomeuta padella, Plutella maculipennis, Malacosoma neustria, Euproctis chrysorrhoea,* Lymantria spp., *Bucculatrix thurberiella, Phyllocnistis citrella,* Agrotis spp., Euxoa spp., Feltia spp., *Earias insulana,* Heliothis spp., *Laphygma exigua, Mamestra brassicae, Panolis flammea, Prodenia litura,* Spodoptera spp., Trichoplusia ni, *Carpocapsa pomonella,* Pieris spp., Chilo spp., *Pyrausta nubilalis, Ephestia kuehniella, Galleria mellonella, Tineola bisselliella, Tinea pellionella, Hofmannophila pseudospretella, Cacoecia podana, Capua reticulana, Choristoneura fumiferana, Clysia ambiguella, Homona magnanima* and *Tortrix viridana.*

From the order of the Coleoptera, for example, *Anobium punctatum, Rhizopertha dominica, Bruchidius obtectus, Acanthoscelides obtectus, Hylotrupes bajulus, Agelastica alni, Leptinotarsa decemlineata, Phaedon cochleariae, Diabrotica* spp., *Psylliodes chrysocephala, Epilachna varivestis,* Atomaria spp., *Oryzaephilus surinamensis,* Anthonomus spp., Sitophilus spp., *Otiorrhynchus sulcatus, Cosmopolites sordidus, Ceuthorrhynchus assimilis, Hypera postica,* Dermestes spp., Trogoderma spp., Anthrenus spp., Attagenus spp., Lyctus spp., *Meligethes aeneus,* Ptinus spp., *Niptus hololeucus, Gibbium psylloides,* Tribolium spp., *Tenebrio molitor,* Agriotes spp., Conoderus spp., *Melolontha melolontha, Amphimallon solstitialis* and *Costelytra zealandica.* From the order of the Hymenoptera, for example, Diprion spp., Hoplocampa spp., Lasius spp., *Monomorium pharaonis* and Vespa spp.

From the order of the Diptera, for example, Aedes spp., Anopheles spp., Culex spp., *Drosophila melanogaster,* Musca spp., Fannia spp., *Calliphora erythrocepnala,* Lucilia spp., Chrysomyia spp., Cuterebra spp., Gastrophilus spp., Hyppobosca spp., Stomoxys spp., Oestrus spp., Hypoderma spp., Tabanus spp., Tannia spp., *Bibio hortulanus, Oscinella frit,* Phorbia spp., *Pegomyia hyoscyami, Ceratitis capitata, Dacus oleae* and *Tipula paludosa.*

From the order of the Siphonaptera, for example, *Xenopsylla cheopis* and Ceratophyllus spp. From the order of the Arachnida, for example, *Scorpio maurus* and *Latrodectus mactans.*

From the order of the Acarina, for example, *Acarus siro,* Argas spp., Ornithodoros spp., *Dermanyssus gallinae, Eriophyes ribis, Phyllocoptruta oleivora,* Boophilus spp., Rhipicephalus spp., Amblyomma spp., Hyalomma spp., Ixodes spp., Psoroptes spp., Chorioptes spp., Sarcoptes spp., Tarsonemus spp., *Bryobia praetiosa,* Panonychus spp. and Tetranychus spp.

The active compounds according to the invention are not only active against plant pests, hygiene pests and stored-product pests, but also in the sector of veterinary medicine against animal parasites (ectoparasites and endoparasites) such as scaly ticks, argasidae, scab mites, trombidae, flies (stinging and sucking), parasitic fly larvae, lice, hair lice, bird lice, fleas and endoparasitically living worms.

The active compounds according to the invention can furthermore be used as defoliants, desiccants, agents for destroying broad-leaved plants and, especially, as weed-killers. By weeds, in the broadest sense, there are to be understood all plants which grow in locations where they are undesired. Whether the substances according to the invention act as total or selective herbicides depends essentially on the amount used.

The active compounds according to the invention can be used, for example, in connection with the following plants:

Dicotyledon weeds of the genera: Sinapis, Lepidium, Galium, Stellaria, Matricaria, Anthemis, Galinsoga, Chenopodium, Urtica, Senecio, Amaranthus, Portulaca, Xanthium, Convolvulus, Ipomoea, Polygonum, Sesbania, Ambrosia, Cirsium, Carduus, Sonchus, Solanum, Rorippa, Rotala, Lindernia, Lamium, Veronica, Abutilon, Emex, Datura, Viola, Galeopsis, Papaver, Centaurea, Trifolium, Ranunculus and Taraxacum.

Dicotyledon cultures of the genera: Gossypium, Glycine, Beta, Daucus, Phaseolus, Pisum, Solanum, Linum, Ipomoea, Vicia, Nicotiana, Lycopersicon, Arachis, Brassica, Lactuca, Cucumis and Cucurbita.

Monocotyledon weeds of the genera: Echinochloa, Setaria, Panicum, Digitaria, Phleum, Poa, Festuca, Eleusine, Brachiaria, Lolium, Bromus, Avena, Cyperus, Sorghum, Agropyron, Cynodon, Monochoria, Fimbristylis, Sagittaria, Eleocharis, Scirpus, Paspalum, Ischaemum, Sphenoclea, Dactyloctenium, Agrostis, Alopecurus and Apera.

Monocotyledon cultures of the genera: Oryza, Zea, Triticum, Hordeum, Avena, Secale, Sorghum, Panicum, Saccharum, Ananas, Asparagus and Allium.

However, the use of the active compounds according to the invention is in no way restricted to these genera, but also extends in the same manner to other plants.

The compounds are suitable, depending on the concentration, for the total combating of weeds, for example on industrial terrain and rail tracks, and on paths and squares with or without tree plantings. Equally, the compounds can be employed for combating weeds in perennial cultures, for example afforestations, decorative tree plantings, orchards, vineyards, citrus groves, nut orchards, banana plantations, coffee plantations, tea plantations, rubber plantations, oil palm plantations, cocoa plantations, soft fruit plantings and hopfields, in lawns, turf and pasture-land, and for the selective combating of weeds in annual cultures.

The active compounds according to the invention also have a powerful fungicidal action and can be employed in practice for combating undesired harmful organisms. The active compounds are therefore also suitable for use as fungicides.

Fungicides in plant protection are employed for combating Plasmodiophoromycetes, Oomycetes, Chytridiomycetes, Zygomycetes, Ascomycetes, Basidiomycetes and Deuteromycetes.

Some causative organisms of fungal diseases which come under the generic names listed above may be mentioned as examples, but not by way of limitation:
Pythium species, such as *Pythium ultimum;*
Phytophthora species, such as *Phytophthora infestans;*
Pseudoperonospora species, such as *Pseudoperonospora humuli* or *Pseudoperonospora cubense;*
Plasmopara species, such as *Plasmopara viticola;*
Peronospora species, such as *Peronospora pisi* or *P. brassicae;*
Erysiphe species, such as *Erysiphe graminis;*
Sphaerotheca species, such as *Sphaerotheca fuliginea;*
Podosphaera species, such as *Podosphaera leucotricha;*
Venturia species, such as *Venturia inaequalis;*
Pyrenophora species, such as *Pyrenophora teres* or *P. graminea* (conidia form: Drechslera, syn: Helminthosporium);
Cochliobolus species, such as *Cochliobolus sativus* (conidia form: Drechslera, syn: Helminthosporium);
Uromyces species, such as *Uromyces appendiculatus.*
Puccinia species, such as *Puccinia recondita;*
Tilletia species, such as *Tilletia caries;*
Ustilago species, such as *Ustilago nuda* or *Ustilago avenae;*
Pellicularia species, such as *Pellicularia sasakii;*
Pyricularia species, such as *Pyricularia oryzae;*
Fusarium species, such as *Fusarium culmorum;*
Botrytis species, such as *Botrytis cinerea;*
Septoria species, such as *Septoria nodorum;*
Leptosphaeria species, such as *Leptosphaeria nodorum;*
Cercospora species, such as *Cercospora canescens;*
Alternaria species, such as *Alternaria brassicae* and
Pseudocercosporella species, such as *Pseudocercosporella herpotrichoides.*

The good toleration, by plants, of the active compounds, at the concentrations required for combating plant diseases, permits treatment of above-ground parts of plants, of vegetative propagation stock and seeds, and of the soil.

The active compounds can be converted into the customary formulations, such as solutions, emulsions, suspensions, powders, foams, pastes, granules, aerosols, natural and synthetic materials impregnated with active compound, and very fine capsules in polymeric substances and in coating compositions for seed, furthermore in formulations used with burning equipment, such as fumigating cartridges, tins and spirals and the like, and in ULV warm- and coldmist formulations.

These formulations are produced in a known manner, for example by mixing the active compounds with extenders, that is liquid solvents, liquefied gases under pressure and/or solid carriers, optionally with the use of surface-active agents, that is emulsifying agents and/or dispersing agents and/or foam-forming agents. In the case of the use of water as an extender, organic solvents can, for example, also be used as auxiliary solvents. As liquid solvents, there are suitable in the main: aromatics, such as xylene, toluene, or alkylnaphthalenes, chlorinated aromatics and chlorinated aliphatic hydrocarbons, such as chlorobenzenes, chloroethylenes or methylene chloride, aliphatic hydrocarbons, such as cyclohexane or paraffins, for example petroleum fractions, alcohols, such as butanol or glycol as well as their ethers and esters, ketones, such as acetone, methyl ethyl ketone, methyl isobutyl ketone or cyclohexanone, strongly polar solvents, such as dimethylformamide and dimethyl sulphoxide, as well as water; by liquefied gaseous extenders or carriers there are meant those liquids which are gaseous at normal temperature and atmospheric pressure, such as aerosol propellants, for example halogenohydrocarbons as well as butane, propane, nitrogen and carbon dioxide; as solid carriers there are suitable: for example ground natural minerals, such as kaolins, clays, talc, chalk, quartz, attapulgite, montmorillonite or diatomaceous earth, and ground synthetic minerals, such as highly disperse silica, alumina and silicates; as solid carriers for granules there are suitable: for example crushed and fractionated natural rocks such as calcite, marble, pumice, sepiolite and dolomite, as well as synthetic granules of inorganic and organic meals, and granules of organic material such as sawdust, coconut shells, maize cobs and tobacco stalks; as emulsifying and/or foam-forming agents there are suitable: for example nonionic and anionic emulsifiers, such as polyoxyethylene fatty acid esters, polyoxyethylene fatty alcohol ethers, for example alkylaryl polyglycol ethers, alkylsulphonates, alkyl sulphates, arylsulphonates as well as albumen hydrolysis products; as dispersing agents there are suitable: for example ligninsulphite waste liquors and methylcellulose.

Adhesives such as carboxymethylcellulose and natural and synthetic polymers in the form of powders, granules or latexes, such as gum arabic, polyvinyl alcohol and polyvinyl acetate, as well as natural phospholipids, such as cephalins and lecithins, and synthetic phospholipids, can be used in the formulations. Further additives can be mineral and vegetable oils.

It is possible to use colorants such as inorganic pigments, for example iron oxide, titanium oxide and Prussian Blue, and organic dyestuffs, such as alizarin dyestuffs, azo dyestuffs and metal phthalocyanine dyestuffs, and trace nutrients such as salts of iron, manganese, boron, copper, cobalt, molybdenum and zinc.

The formulations in general contain between 0.1 and 95 per cent by weight of active compound, preferably between 0.5 and 90%.

The active compounds according to the invention can exist in their commercially available formulations and in the use forms prepared with these formulations in the form of a mixture with other active compounds such as insecticides, attractants, sterilants, acaricides, nematicides, herbicides or fungicides. The insecticides include, for example, inter alia, phosphates, carbamates, carboxylates, chlorinated hydrocarbons, phenylureas, and substances produced by microorganisms.

Furthermore, the active compounds according to the invention can exist, in their commercially available formulations and in the use forms prepared with these formulations, in the form of a mixture with synergists. Synergists are compounds by which the action of the active compounds is increased without it being necessary for the synergist added to be active itself.

The active compound content of the use forms prepared with the commercially available formulations can vary within wide limits. The active compound concentration of the use forms can be from 0.0000001 to up to 95% by weight of active compound, preferably between 0.0001 and 1% by weight.

Application is effected in a conventional manner adapted to suit one of the use forms.

In the biological examples which follow, the compound of the formula

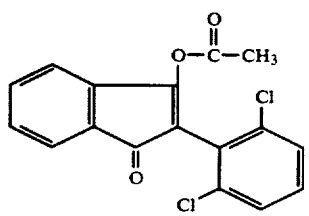

(disclosed in U.S. Pat. No. 3,954,998)

was used as comparison compound of the prior art.

Example A

Phaedon larvae test

Solvent: 7 parts by weight of dimethylformamide
Emulsifier: 1 part by weight of alkylaryl polyglycol ether To prepare a suitable preparation of active compound, 1 part by weight of active compound is mixed with the stated amount of solvent and the stated amount of emulsifier, and the concentrate is diluted with water to the desired concentration.

Cabbage leaves (*Brassica oleracea*) are treated by dipping into the preparation of active compound of the desired concentration and infested with mustard beetle larvae (*Phaedon cochleariae*). while the leaves are moist.

After the desired time, the destruction in % is determined. 100% means that all beetle larvae have been killed; 0% means that none of the beetle larvae have been killed.

In this test, a superior activity compared with the prior art is shown, for example, by the following compounds of the Preparation Examples: 2, 3, 4.

Example B

Nephotettix test

Solvent: 7 parts by weight of dimethylformamide
Emulsifier: 1 part by weight of alkylaryl polyglycol ether To prepare a suitable preparation of active compound, 1 part by weight of active compound is mixed with the stated amount of solvent and the stated amount of emulsifier, and the concentrate is diluted with water to the desired concentration.

Rice seedlings (*Oryza sativa*) are treated by dipping into the preparation of active compound of the desired concentration and infested with larvae of the green rice cicada (*Nephotettix cincticeps*) while the seedlings are moist.

After the desired time, the destruction in % is determined. 100% means that all cicadas have been killed; 0% means that none of the cicadas have been killed.

In this test, a superior activity compared with the prior art is shown, for example, by the following compounds of the Preparation Examples: 2, 3, 4.

Example C

Tetranychus test (OP resistant)

Solvent: 7 parts by weight of dimethylformamide
Emulsifier: 1 part by weight of alkylaryl polyglycol ether To prepare a suitable preparation of active compound, 1 part by weight of active compound is mixed with the stated amount of solvent and the stated amount of emulsifier, and the concentrate is diluted with water to the desired concentration.

Bean plants (*Phaseolus vulgaris*) which are heavily infested with all development stages of the two-spotted spider mite or greenhouse red spider mite (*Tetranychus urticae*), are sprayed with a preparation of active compound of the desired concentration until dripping wet.

After the desired time, the action in % is determined. 100% means that all spider mites have been killed; 0% means that no spider mites have been killed.

In this test, a superior activity compared with the prior art is shown by the following compounds of the Preparation Examples: 2, 3, 4.

Example D

Pre-emergence test/greenhouse

Solvent: 5 parts by weight of acetone
Emulsifier: 1 part by weight of alkylaryl polyglycol ether To produce a suitable preparation of active compound, 1 part by weight of active compound is mixed with the stated amount of solvent, the stated amount of emulsifier is added and the concentrate is diluted with water to the desired concentration.

Seeds of the test plants are sown in normal soil and, after 24 hours, watered with the preparation of the active compound. It is expedient to keep constant the amount of water per unit area. The concentration of the active compound in the preparation is of no importance, only the amount of active compound applied per unit area being decisive. After three weeks, the degree of damage to the plants is rated in % damage in comparison to the development of the untreated control. The figures denote:

0% = no action (like untreated control)
100% = total destruction

In this test, a superior activity art is shown by the following compound of the Preparation Examples: Ib-7.

The prior art substance used here was fluortamone (($\pm$)-5-(methylamino)-2-phenyl-4-[3-(trifluoromethyl)-phenyl]-3-(2H)-furanone.

TABLE D

| | Pre-emergence test/greenhouse | | | | | | |
|---|---|---|---|---|---|---|---|
| Active compound | Active compound application rate | soya | Digitaria | Echino-chloa | Lonium | Panicum | Poa | Setaria |
| Fluortamone known compound | 500 | 50 | 80 | 20 | 80 | 0 | 20 | 30 |
| Compound according to Example Ib-7 | 500 | 0 | 95 | 100 | 100 | 90 | 90 | 95 |

We claim:

1. 3-Aryl-4-hydroxy-$\Delta^3$-dihydrofuranone and 3-aryl-4-hydroxy-$\Delta^3$-dihydrothiophenone derivatives of the formula (I)

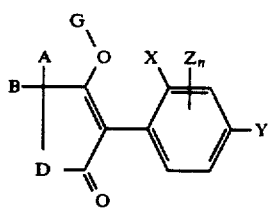

in which

X represents $C_1$-$C_6$-alkyl, halogen, $C_1$-$C_6$-alkoxy or $C_1$-$C_3$-halogenalkyl,
D represents oxygen or sulphur,
Y represents hydrogen, $C_1$-$C_6$-alkyl, halogen, $C_1$-$C_6$-alkoxy or $C_1$-$C_3$-halogenoalkyl,
Z represents $C_1$-$C_6$-alkyl, halogen or $C_1$-$C_6$-alkoxy,
n represents a number from 0 to 3, or the radicals X and Z together with the phenyl radical to which they are bonded form the naphthalene radical of the formula

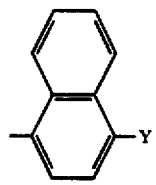

in which Y has the abovementioned meaning.

A and B are identical or different and represent hydrogen, or represent optionally halogen-substituted straight-chain or branched $C_1$-$C_{12}$-alkyl, $C_3$-$C_8$-alkenyl, $C_3$-$C_8$-alkinyl, $C_1$-$C_{10}$-alkoxy-$C_2$-$C_8$-alkyl, $C_1$-$C_8$-polyalkoxy-$C_2$-$C_8$-alkyl, $C_1$-$C_{10}$-alkylthio-$C_2$-$C_8$-alkyl or cycloalkyl which has 3 to 8 ring atoms and which can be interrupted by oxygen and/or sulphur, or represent phenyl, pyridine, imidazole, pyrazole, triazole, indole or thiazole or phenyl-$C_1$-$C_6$-alkyl, each of which is optionally substituted by halogen, $C_1$-$C_6$-alkyl, $C_1$-$C_6$-halogenoalkyl, $C_1$-$C_6$-alkoxy, $C_1$-$C_6$-halogenoalkoxy or nitro, or A and B together with the carbon atom to which they are bonded form a saturated or unsaturated 3- to 8-membered ring which is optionally interrupted by oxygen and/or sulphur and optionally substituted by halogen, $C_1$-$C_6$-alkyl, $C_1$-$C_6$-alkoxy, $C_1$-$C_4$-halogenalkyl, $C_1$-$C_4$-halogenoalkoxy, $C_1$-$C_4$-alkylthio or phenyl, optionally substituted with $C_1$-$C_6$-alkyl, $C_1$-$C_6$-halogenoalkyl, $C_1$-$C_6$-alkoxy, $C_1$-$C_6$-halogenoalkoxy or nitro, G represents hydrogen (a) or the groups

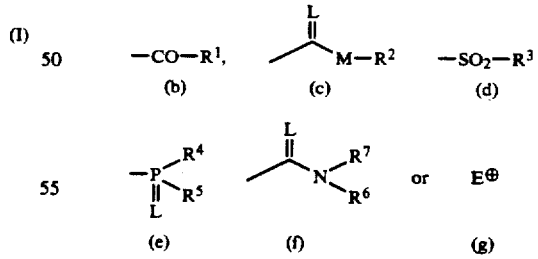

in which $E^\oplus$ represents a metal ion equivalent or an ammonium ion,
L and M represent oxygen and/or sulphur,
$R^1$ represents optionally halogen-substituted $C_1$-$C_{20}$-alkyl, $C_2$-$C_{20}$-alkenyl, $C_1$-$C_8$-alkoxy-$C_2$-$C_8$-alkyl, $C_1$-$C_8$-alkylthio-$C_2$-$C_8$-alkyl, $C_1$-$C_8$-polyalkoxy-$C_2$-$C_8$-alkyl or cycloalkyl which has 3-8 ring atoms and which can be interrupted by oxygen and/or sulphur atoms, or represents phenyl which is optionally substituted by halogen, nitro, $C_1$-$C_6$-alkyl, $C_1$-$C_6$-alkoxy, $C_1$-$C_6$-halogenoalkyl or $C_1$-$C_6$-halogenoalkoxy;

or represents phenyl-$C_1$-$C_6$-alkyl which is optionally substituted by halogen, $C_1$-$C_6$-alkyl, $C_1$-$C_6$-alkoxy, $C_1$-$C_6$-halogenoalkyl or $C_1$-$C_6$-halogenalkoxy.

or represents pyridine, imidazole, pyrazole, triazole, indole or thiazole each of which is optionally substituted by halogen and/or $C_1$-$C_6$-alkyl, or represents phenoxy-$C_1$-$C_6$-alkyl which is optionally substituted by halogen and/or $C_1$-$C_6$-alkyl, or represents hetaryloxy-$C_1$-$C_6$-alkyl which is optionally substituted by halogen, amino and $C_1$-$C_6$-alkyl, $R^2$ represents $C_1$-$C_{20}$-alkyl, $C_2$-$C_{20}$-alkenyl, $C_1$-$C_8$-alkoxy-$C_2$-$C_8$-alkyl or $C_1$-$C_8$-polyalkoxy-$C_2$-$C_8$, each of which is optionally substituted by halogen, or represents phenyl or benzyl, each of which is optionally substituted by halogen, nitro, $C_1$-$C_6$-alkyl, $C_1$-$C_6$-alkoxy or $C_1$-$C_6$-halogenalkyl, $R^3$, $R^4$ and $R^5$ independently of one another represent $C_1$-$C_8$-alkyl, $C_1$-$C_8$-alkoxy, $C_1$-$C_8$-alkylamino, di-($C_1$-$C_8$)-alkylamino, $C_1$-$C_8$-alkylthio, $C_2$-$C_5$-alkenylthio, $C_2$-$C_5$-alkinylthio or $C_3$-$C_7$-cycloalkylthio, each of which is optionally substituted by halogen, or represent phenyl, phenoxy or phenylthio, each of which is optionally substituted by halogen, nitro, cyano, $C_1$-$C_4$-alkoxy, $C_1$-$C_4$-halogenalkoxy, $C_1$-$C_4$-alkylthio, $C_1$-$C_4$-halogenalkylthio, $C_1$-$C_4$-alkyl or $C_1$-$C_4$-halogenoalkyl, $R^6$ and $R^7$ independently of one another represent $C_1$-$C_{20}$-alkenyl, $C_1$-$C_{20}$-alkoxy, $C_2$-$C_8$-alkenyl or $C_1$-$C_{20}$-alkoxy-$C_1$-$C_{20}$-alkyl, each of which is optionally substituted by halogen, or represent phenyl which is optionally substituted by halogen, $C_1$-$C_{20}$-halogenalkyl, $C_1$-$C_{20}$-alkyl or $C_1$-$C_{20}$-alkoxy, or represent benzyl which is optionally substituted by halogen, $C_1$-$C_{20}$-alkyl, $C_1$-$C_{20}$-halogenoalkyl or $C_1$-$C_{20}$-alkoxy, or together represent a $C_2$-$C_6$-alkylene ring which is optionally interrupted by oxygen, with the exception of the following compounds:

3-(2-methoxyphenyl)-4-hydroxy-$\Delta^3$-dihydrofuran-2-one,
3-(2-chlorophenyl)-4-hydroxy-$\Delta^3$-dihydrofuran-2-one,
3-(2-methylphenyl)-4-hydroxy-$\Delta^3$-dihydrofuran-2-one,
3-(2-fluorophenyl)-4-hydroxy-$\Delta^3$-dihydrofuran-2-one, and the enantiometrically pure forms of compounds of the formula (I).

2. 3-Aryl-4-hydroxy-$\Delta^3$-dihydrofuranone and 3-aryl-4-hydroxy-$\Delta^3$-dihydrothiophenone derivatives of the formula (I) according to claim 1, in which X represents $C_1$-$C_4$-alkyl, halogen, $C_1$-$C_4$-alkoxy or $C_1$-$C_2$-halogenoalkyl, Y represents hydrogen, $C_1$-$C_6$-alkyl, halogen, $C_1$-$C_6$-alkoxy or $C_1$-$C_2$-halogenoalkyl, Z represents $C_1$-$C_4$-alkyl, halogen or $C_1$-$C_4$-alkoxy, n represents a number from 0 to 3, or the radicals X and Z together with the phenyl radical to which they are bonded form the naphthalene radical of the formula

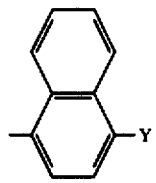

in which Y has the abovementioned meaning,

A and B are identical or different and represent hydrogen, or represent optionally halogen-substituted straight-chain or branched $C_1$-$C_{10}$-alkyl, $C_3$-$C_6$-alkenyl, $C_3$-$C_6$-alkinyl, $C_1$-$C_8$-alkoxy-$C_2$-$C_6$-alkyl, $C_1$-$C_6$-polyalkoxy-$C_2$-$C_6$-alkyl, $C_1$-$C_8$-alkylthio-$C_2$-$C_6$alkyl or cycloalkyl which has 3 to 7 ring atoms and which can be interrupted by 1-2 oxygen and/or sulphur atoms, or represent phenyl, pyridine, imidazole, pyrazole, triazole, indole or thiazole or aryl-$C_1$-$C_4$-alkyl, each of which is optionally substituted by halogen, $C_1$-$C_4$-alkyl, $C_1$-$C_4$-halogenoalkyl, $C_1$-$C_4$-alkoxy or nitro, or A and B together with the carbon atom to which they are bonded form a saturated or unsaturated 3- to 8-membered ring which is optionally interrupted by oxygen and/or sulphur and optionally substituted by halogen, $C_1$-$C_5$-alkyl, $C_1$-$C_5$-alkoxy, $C_1$-$C_3$-halogenoalkyl, $C_1$-$C_4$-halogenoalkoxy, $C_1$-$C_3$-alkylthio or optionally halogen-, alkyl- or alkoxy-substituted aryl, $R^1$ represents optionally halogen-substituted $C_1$-$C_{16}$-alkyl, $C_2$-$C_{16}$-alkenyl, $C_1$-$C_6$-alkoxy-$C_2$-$C_6$-alkyl, $C_1$-$C_{16}$-alkylthio-$C_2$-$C_6$-alkyl, $C_1$-$C_6$-polyalkoxy-$C_2$-$C_6$-alkyl and cycloalkyl which has 3-7 ring atoms and which can be interrupted by 1-2 oxygen and/or sulphur atoms, or represents phenyl which is optionally substituted by halogen, nitro, $C_1$-$C_4$-alkyl, $C_1$-$C_4$-alkoxy, $C_1$-$C_3$-halogenalkyl or $C_1$-$C_3$-halogenalkoxy, or represents phenyl-$C_1$-$C_4$-alkyl which is optionally substituted by halogen, $C_1$-$C_4$-alkyl, $C_1$-$C_4$-alkoxy, $C_1$-$C_3$-halogenoalkyl or $C_1$-$C_3$-halogenoalkoxy, or represents hetaryl which is optionally substituted by halogen and $C_1$-$C_6$-alkyl, or represents phenoxy-$C_1$-$C_5$-alkyl which is optionally substituted by halogen and $C_1$-$C_4$-alkyl, or represents hetaryloxy-$C_1$-$C_5$-alkyl which is optionally substituted by halogen, amino and $C_1$-$C_4$-alkyl, $R^2$ represents optionally halogen-substituted $C_1$-$C_{16}$-alkyl, $C_2$-$C_{16}$-alkenyl, $C_1$-$C_{16}$-alkoxy-$C_2$-$C_6$-alkyl or $C_1$-$C_6$-polyalkoxy-$C_2$-$C_6$-alkyl, or represents phenyl or benzyl, each of which is optionally substituted by halogen, nitro, $C_1$-$C_4$-alkyl, $C_1$-$C_3$-alkoxy or $C_1$-$C_3$-halogenoalkyl, $R^3$, $R^4$ and $R^5$ independently of one another represent $C_1$-$C_6$-alkyl, $C_1$-$C_6$-alkoxy, $C_1$-$C_6$-alkylamino, di-($C_1$-$C_6$)-alkylamino, $C_1$-$C_6$-alkylthio, $C_3$-$C_4$-alkenylthio, $C_2$-$C_4$-alkinylthio or $C_3$-$C_6$-cycloalkylthio, each of which is optionally substituted by halogen, or represent phenyl, phenoxy or phenylthio, each of which is optionally substituted by fluorine, chlorine, bromine, nitro, cyano, $C_1$-$C_3$-alkoxy, $C_1$-$C_3$-halogenoalkoxy, $C_1$-$C_3$-alkylthio, $C_1$-$C_3$-halogenoalkylthio, $C_1$-$C_3$-alkyl or $C_1$-$C_3$-halogenoalkyl, $R^6$ and $R^7$ independently of one another represent $C_1-C_{20}$-alkyl, $C_1-C_{20}$-alkoxy, $C_2-C_8$-alkenyl or $C_1-C_{20}$-alkoxy-$C_1-C_{20}$-alkyl, each of which is optionally substituted by halogen, or represented phenyl which is optionally substituted by halogen, $C_1-C_5$-halogenalkyl, $C_1-C_5$-alkyl or $C_1-C_5$-alkoxy, or represent benzyl which is optionally substituted by halogen, $C_1-C_5$-alkyl, $C_1-C_5$-halogenoalkyl or $C_1-C_5$-alkoxy.

3. 3-Aryl-4-hydroxy-$\Delta^3$-dihydrofuranone and 3-aryl-4-hydroxy-$\Delta^3$-dihydrothiophenone derivatives of the formula (I) according to claim 1, in which X represents methyl, ethyl, propyl, i-proyl, fluorine, chlorine, bromine, methoxy, ethoxy and trifluoromethyl, Y represents hydrogen, methyl, ethyl, propyl, i-propyl, butyl, i-butyl, tert.-butyl, fluorine, chlorine, bromine, methoxy, ethoxy, and trifluoromethyl, Z represents methyl, ethyl, i-propyl, butyl, i-butyl, tert.-butyl, fluorine, chlorine, bromine, ethoxy and ethoxy, n represents a number from 0 to 3, or the radicals X and Z together with the phenyl radical to which they are bonded form the naphthalene radical of the formula

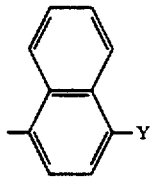

in which Y has the abovementioned meaning,

A and B are identical or different and represent hydrogen or represent optionally halogen-substituted straight-chain or branched $C_1-C_8$-alkyl, $C_3-C_4$-alkenyl, $C_3-C_4$-alkinyl, $C_1-C_6$-alkoxy-$C_2-C_4$-alkyl, $C_1-C_4$-polyalkoxy-$C_2-C_4$-alkyl, $C_1-C_6$-alkylthio-$C_2-C_4$-alkyl or cycloalkyl which has 3 to 6 ring atoms and which can be interrupted by 1-2 oxygen and/or sulphur atoms, or represent aryl, pyrimidine, imidazole, pyrazole, triazole, indole, thiazole or aryl-$C_1-C_3$-alkyl, each of which is optionally substituted by fluorine, chlorine, methyl, ethyl, propyl, iso-propyl, methoxy, ethoxy, trifluoromethyl or nitro, or A and B together with the carbon atom to which they are bonded form a saturated or unsaturated 3- to 8membered ring which is optionally interrupted by oxygen and/or sulphur and optionally substituted by fluorine, chlorine, $C_1-C_2$-alkyl, $C_1-C_2$-alkoxy, trifluoromethyl, $C_1-C_2$-alkylthio or optionally fluorine-, chlorine-, methyl- or methoxy-substituted aryl, $R^1$ represents optionally fluorine- or chlorine-substituted $C_1-C_{14}$-alkyl, $C_2-C_{14}$-alkenyl, $C_1-C_4$-alkoxy-$C_2-C_6$-alkyl, $C_1-C_4$-alkylthio-$C_2-C_6$-alkyl, $C_1-C_4$-polyalkoxy-$C_2-C_4$-alkyl and cycloalkyl which has 3-6 ring atoms and which can be interrupted by 1-2 oxygen and/or sulphur atoms, or represents phenyl which is optionally substituted by fluorine, chlorine, bormine, methyl, ethyl, propyl, i-proypl, methoxy, ethoxy, trifluoromethyl, trifluoromethoxy or nitro, or represents phenyl-$C_1-C_3$-alkyl which is optionally substituted by fluorine, chlorine, bromine, methyl, ethyl, propyl, i-propyl, methoxy, ethoxy, trifluoromethyl or trifluoromethoxy, or represents pyridyl, pyrimidyl, thiazolyl and pyrazolyl, each of which is optionally substituted by fluorine, chlorine, bromine, methyl or ethyl, or represents phenoxy-$C_1-C_4$-alkyl which is optionally substituted by fluorine, chlorine, methyl or ethyl, or represents pyridyloxy-$C_1-C_4$-alkyl, pyrimidyloxy-$C_1-C_4$-alkyl and thiazolyloxy-$C_1-C_4$-alkyl, each of which is optionally substituted by fluorine, chlorine, amino, methyl or ethyl, $R^2$ represents $C_1-C_{14}$-alkyl, $C_2-C_{14}$-alkenyl, $C_1-C_4$-alkoxy-$C_2-C_6$-alkyl or $C_1-C_4$-polyalkoxy-$C_2-C_6$-alkyl, each of which is optionally substituted by fluorine or chlorine, or represents phenyl or benzyl, each of which is optionally substituted by fluorine, chlorine, nitro, methyl, ethyl, propyl, i-propyl, methoxy, ethoxy or trifluoromethyl, $R^3$, $R^4$ and $R^5$ independently of one another represent $C_1-C_4$-alkyl, $C_1-C_4$-alkoxy, $C_1-C_4$-alkylamino, di-($C_1-C_4$-alkyl)-amino or $C_1-C_4$-alkylthio, each of which is optionally substituted by fluorine or chlorine, or represent phenyl, phenoxy or phenylthio, each of which is optionally substituted by fluorine, chlorine, bromine, nitro, cyano, $C_1-C_2$-alkoxy, $C_1-C_4$-fluoroalkoxy, $C_1-C_2$-chloroalkoxy, $C_1-C_2$-alkylthio, $C_1-C_2$-fluoroalkylthio, $C_1-C_2$-chloroalkylthio or $C_1-C_3$-alkyl, $R^6$ and $R^7$ independently of one another represent $C_1-C_{10}$-alkyl, $C_1-C_{10}$-alkoxy or $C_1-C_{10}$-alkoxy-($C_1-C_{10}$)-alkyl, each of which is optionally substituted by fluorine, chlorine or bromine, or represent phenyl which is optionally substituted by fluorine, chlorine, bromine, $C_1-C_{20}$-halogenoalkyl, $C_1-C_{20}$-alkyl or $C_1-C_4$-alkoxy, or represent benzyl which is optionally substituted by fluorine, chlorine, bromine, $C_1-C_4$-alkyl, $C_1-C_4$-halogenoalkyl or $C_1-C_4$-alkoxy.

4. 3-Aryl-4-hydroxy-$\Delta^3$-dihydrofuranone and 3-aryl-4-hydroxy-$\Delta^3$-dihydrothiophenone derivatives of the formula (I) according to claim 1, characterized in that they are one of the following structures (Ia) to (Ig):

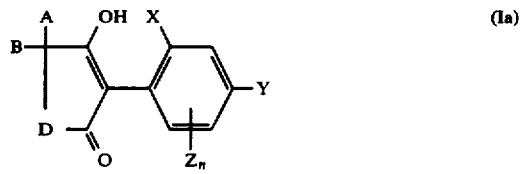

(Ia)

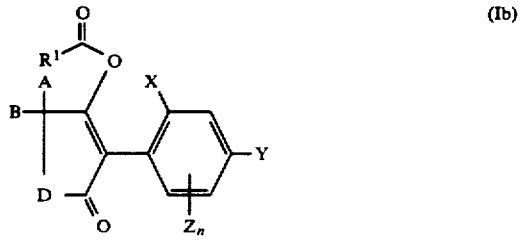

(Ib)

-continued

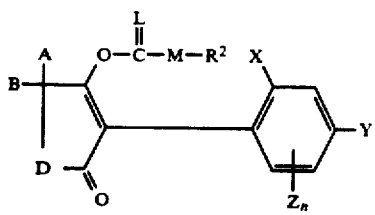 (Ic)

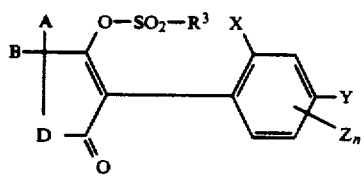 (Id)

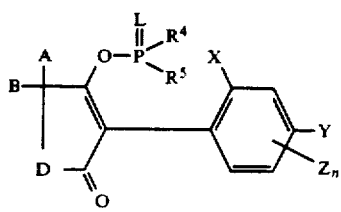 (Ie)

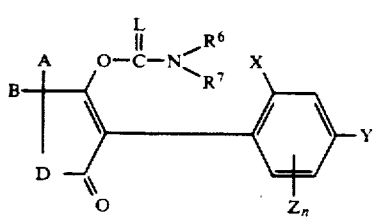 (If)

-continued

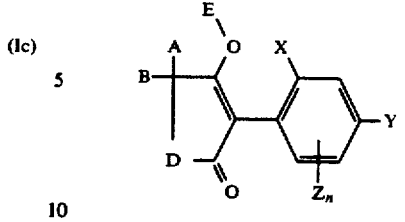 (Ig)

in which A, B, D, E, L, M, X, Y, $Z_n$, $R^1$, $R^2$, $R^3$, $R^4$, $R^5$, $R^6$ and $R^7$ have the meanings given in claim 3.

5. The 3-aryl-4hydroxy-$\Delta^3$-dihydrofuranone and 3-aryl-4-hydroxy-$\Delta^3$-dihydrothiophenone of claim 1 wherein A and B independently represent $C_1$-$C_{12}$-alkyl, phenyl or together with the carbon atom to which they are attached form a saturated or unsaturated 3- to 8-membered ring, D represents oxygen or sulphur, and G represents —CO—$R^3$, X represents $C_1$-$C_6$-alkyl Y represents $C_1$-$C_6$-alkyl, and Z represents $C_1$-$C_6$-alkyl.

6. The 3-aryl-4-hydroxy-$\Delta^3$-dihydrofuranone and 3-aryl-4-hydroxy-$\Delta^3$-dihydrothiophenone of claim 5 wherein A and B together with the carbon atom to which they are attached form a cycloalkyl group.

7. Insecticidal, acaricidal, herbicidal and fungicidal agents, comprising an effective amount of at least one 3-aryl-4-hydroxy-$\Delta^3$-dihydrofuranone and 3-aryl-4-hydroxy-$\Delta^3$-dihydrothiophenone derivative according to claim 1.

8. Method of combating insects and/or arachnids and/or weeds and/or fungi, characterized in that 3-aryl-4-hydroxy-$\Delta^3$-dihydrofuranone and 3-aryl-4-hydroxy-$\Delta^3$-dihydrothiophenone derivatives of claim 1 are allowed to act on insects and/or arachnids and/or weeds and/or fungi and/or their environment.

* * * * *